INVENTORS
John Wicks
Otho D. Grandstaff
BY
Smith, Olsen & Baird
Attys.

INVENTORS
John Wicks
Otho D. Grandstaff
BY Smith, Olsen & Baird
Attys

INVENTORS
John Wicks
Otho D. Grandstaff
BY Smith, Olsen & Baird
Attys.

TELEPHONE SYSTEM

Filed Jan. 29, 1949

15 Sheets-Sheet 4

INVENTORS
John Wicks
Otho D. Grandstaff
BY
Smith, Olsen & Baird
Attys.

Aug. 28, 1951

J. WICKS ET AL 2,566,010

TELEPHONE SYSTEM

Filed Jan. 29, 1949

15 Sheets-Sheet 5

INVENTORS
John Wicks
BY Otho D. Grandstaff
Smith, Olsen & Baird
Attys.

Aug. 28, 1951 J. WICKS ET AL 2,566,010

TELEPHONE SYSTEM

Filed Jan. 29, 1949 15 Sheets-Sheet 6

INVENTORS
John Wicks
Otho D. Grandstaff

BY Smith, Olsen & Baird

Attys.

INVENTORS
John Wicks
Otho D. Grandstaff
BY Smith, Olsen & Baird
Attys.

INVENTORS
John Wicks
Otho D. Grandstaff
BY
Smith, Olsen & Baird
Attys.

Aug. 28, 1951 J. WICKS ET AL 2,566,010

TELEPHONE SYSTEM

Filed Jan. 29, 1949 15 Sheets-Sheet 9

INVENTORS
John Wicks
Otho D. Grandstaff

BY Smith, Olsen & Baird

Attys.

INVENTORS
John Wicks
Otho D. Grandstaff
BY
Smith, Olsen & Baird
Attys.

INVENTORS
John Wicks
Otho D. Grandstaff
BY
Smith, Olsen & Baird
Attys.

Aug. 28, 1951

J. WICKS ET AL

TELEPHONE SYSTEM 2,566,010

Filed Jan. 29, 1949

15 Sheets-Sheet 12

INVENTORS
John Wicks
Otho D. Grandstaff
BY
Smith, Olsen & Baird
Attys.

INVENTORS
John Wicks
Otho D. Grandstaff
BY
Smith, Olsen & Baird
Attys.

INVENTORS
John Wicks
Otho D. Grandstaff
BY Smith, Olsen & Baird
Attys.

Aug. 28, 1951 J. WICKS ET AL 2,566,010

TELEPHONE SYSTEM

Filed Jan. 29, 1949 15 Sheets-Sheet 15

INVENTORS
John Wicks
Otho D. Grandstaff

BY Smith, Olsen + Baird
Attys.

Patented Aug. 28, 1951

2,566,010

UNITED STATES PATENT OFFICE 2,566,010

TELEPHONE SYSTEM

John Wicks, Biloxi, Miss., and Otho D. Grandstaff, Oak Park, Ill., assignors to Automatic Electric Laboratories, Inc., Chicago, Ill., a corporation of Delaware Original application May 22, 1947, Serial No. 749,758. Divided and this application January 29, 1949, Serial No. 73,482

4 Claims. (Cl. 179—16.4)

The present invention relates to telephone systems and more particularly to toll switching systems of the type disclosed in U. S. Patent No. 2,155,176, John Wicks, granted April 18, 1939. This application is a division of the copending application of John Wicks and Otho D. Grandstaff, Serial No. 749,758, filed May 22, 1947, now Patent No. 2,517,516, granted August 1, 1950.

In the toll switching system disclosed in the Wicks patent, the toll lines inter-connecting the different exchanges are terminated by repeater circuits, each of which is provided with a tone unit individual thereto of the connection and arrangement disclosed in U. S. Patent No. 2,159,081, Otho D. Grandstaff, granted May 23, 1939. Each of these tone units comprises both a transmitter and a receiver of unmodulated audio frequency signals and fixed frequency modulated audio frequency carrier signals that are employed for the purposes of digit control, seizure control, ring control, supervisory control and release control.

In the present toll switching system, improved repeater circuits are provided, each of which has individually associated therewith a tone unit of the improved connection and arrangement disclosed in the copending application of Otho D. Grandstaff, Serial No. 733,194, filed March 29, 1947, now Patent No. 2,482,478, granted September 20, 1949.

It is a general object of the present invention to provide in a toll switching system of the type disclosed in the Wicks patent, improved circuit and operating facilities in order to accommodate the handling with ease of heavier toll traffic by the operators at the various toll switchboards in the different exchanges in the system.

Another object of the invention is to provide in a telephone system of the type noted, an improved impedance balancing network in the repeater circuits inter-connected by the toll line in order to prevent singing of the voice current repeaters included in the toll line.

Further features of the invention pertain to the particular arrangement of the circuit elements of the system, whereby the above-outlined and additional operating features thereof are attained.

*The general arrangement of the telephone system*

Figure 1:
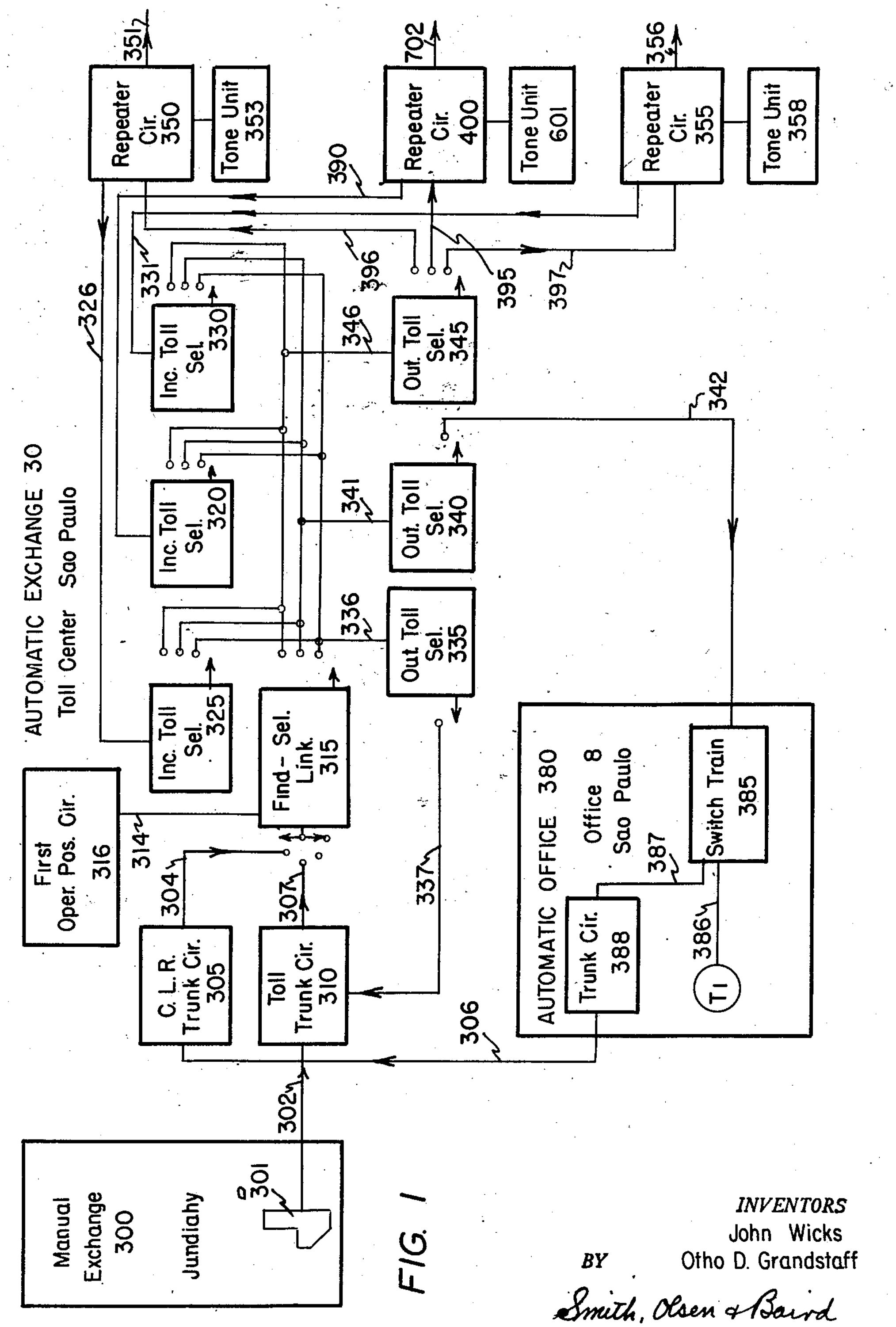
Figure 2:
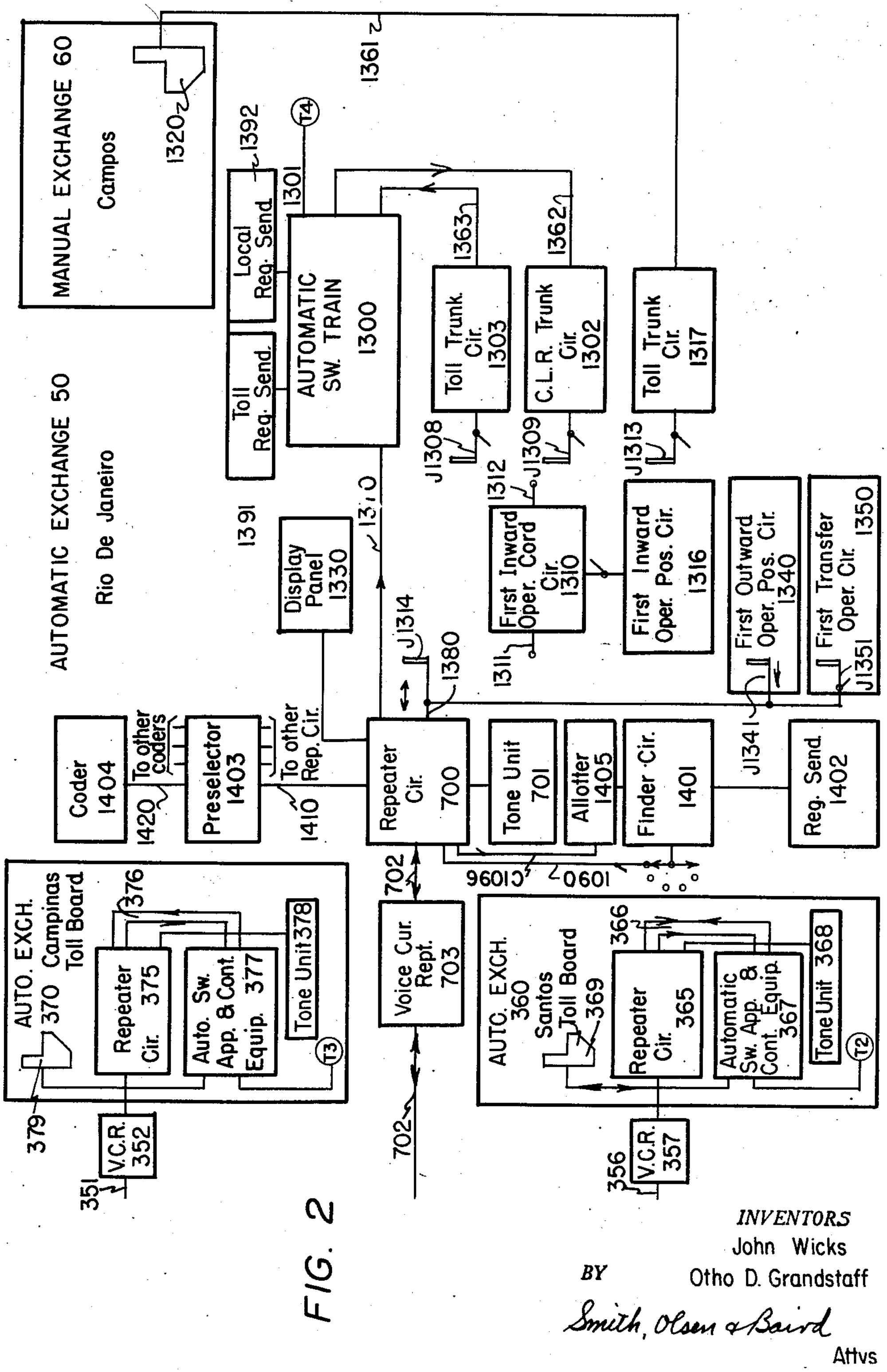
Figures 14, 15:
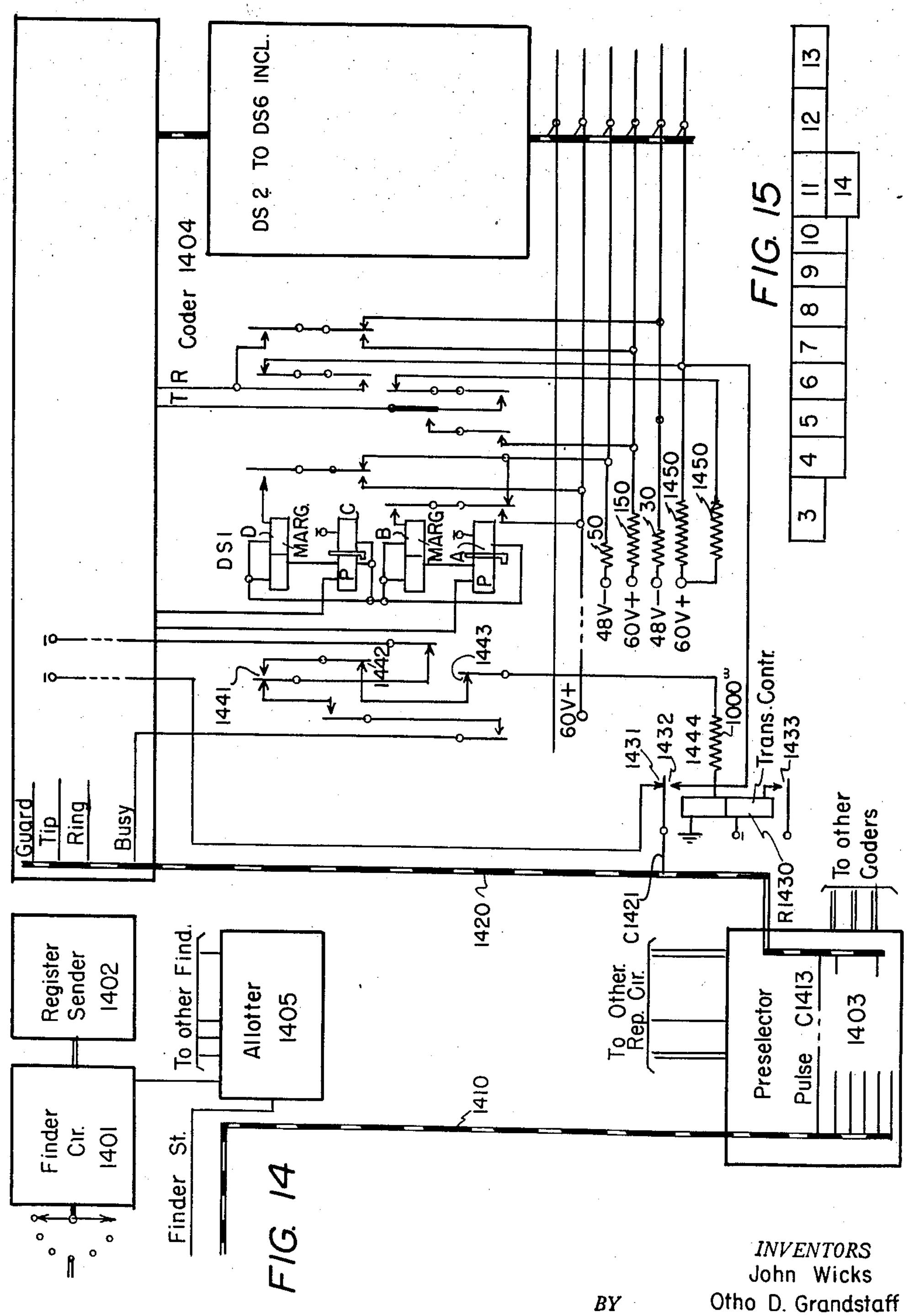
Figure 16:
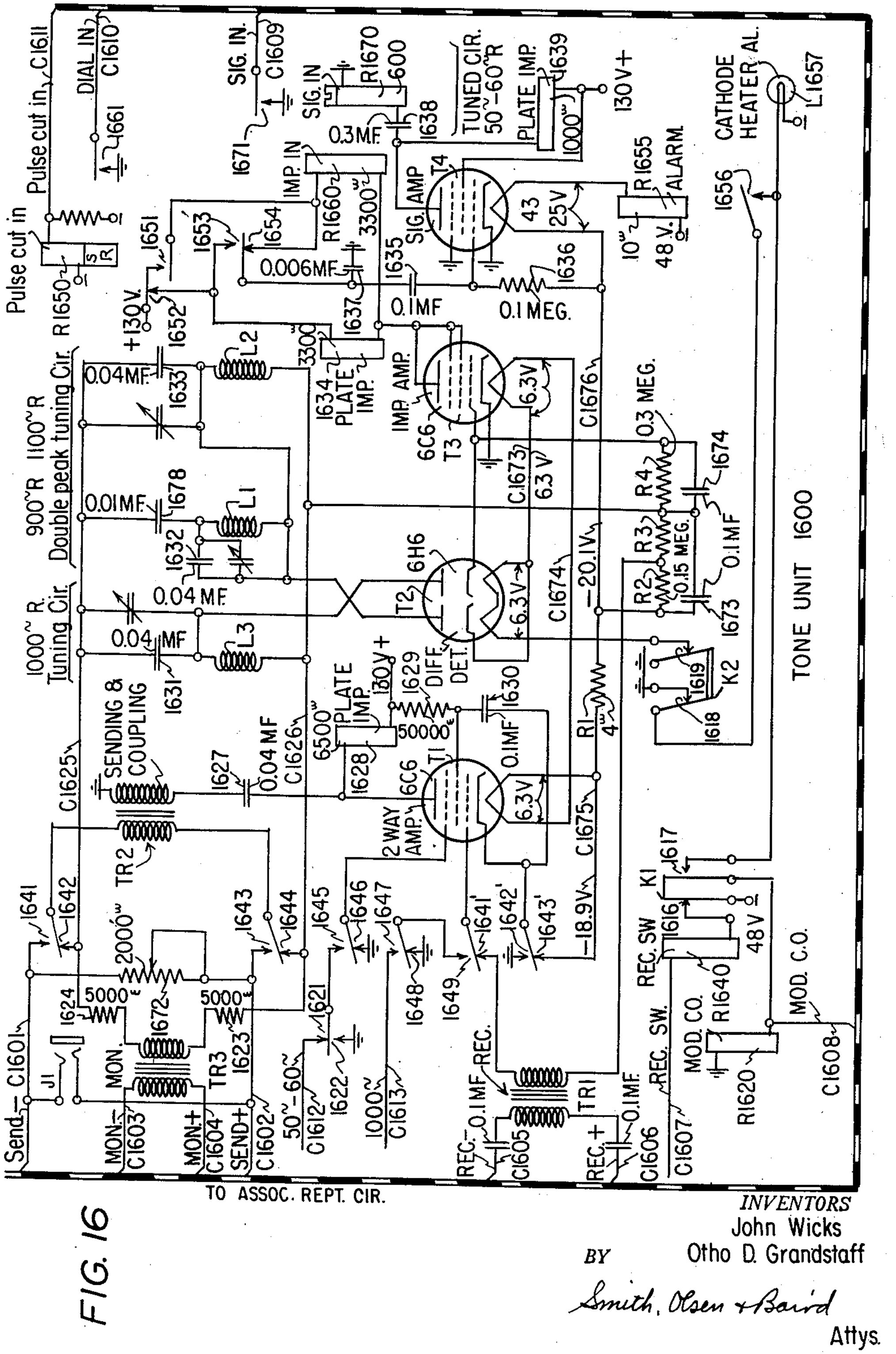

The invention, both as to its organization and method of operation, together with further objects and advantages thereof, will best be understood by reference to the following specification taken in connection with the accompanying drawings in which Figures 1 and 2 taken together, when arranged in end-to-end relation with Fig. 1 on the left and Fig. 2 on the right, constitute a schematic diagram of the area served by a telephone system embodying the present invention and illustrate the general arrangement of the apparatus incorporated in several of the exchanges and offices thereof; Figs. 3 to 14, inclusive, taken together illustrate the details of certain of the apparatus incorporated in two of the remotely disposed automatic exchanges included in the telephone system, which apparatus has incorporated therein the features of the invention as briefly outlined above; Fig. 15 illustrates the mode of combining Figs. 3 to 14, inclusive, to form a unified diagram; and Fig. 16 illustrates the details of one of the tone units incorporated in the apparatus illustrated in Figs. 3 to 14, inclusive.

Figure 4:
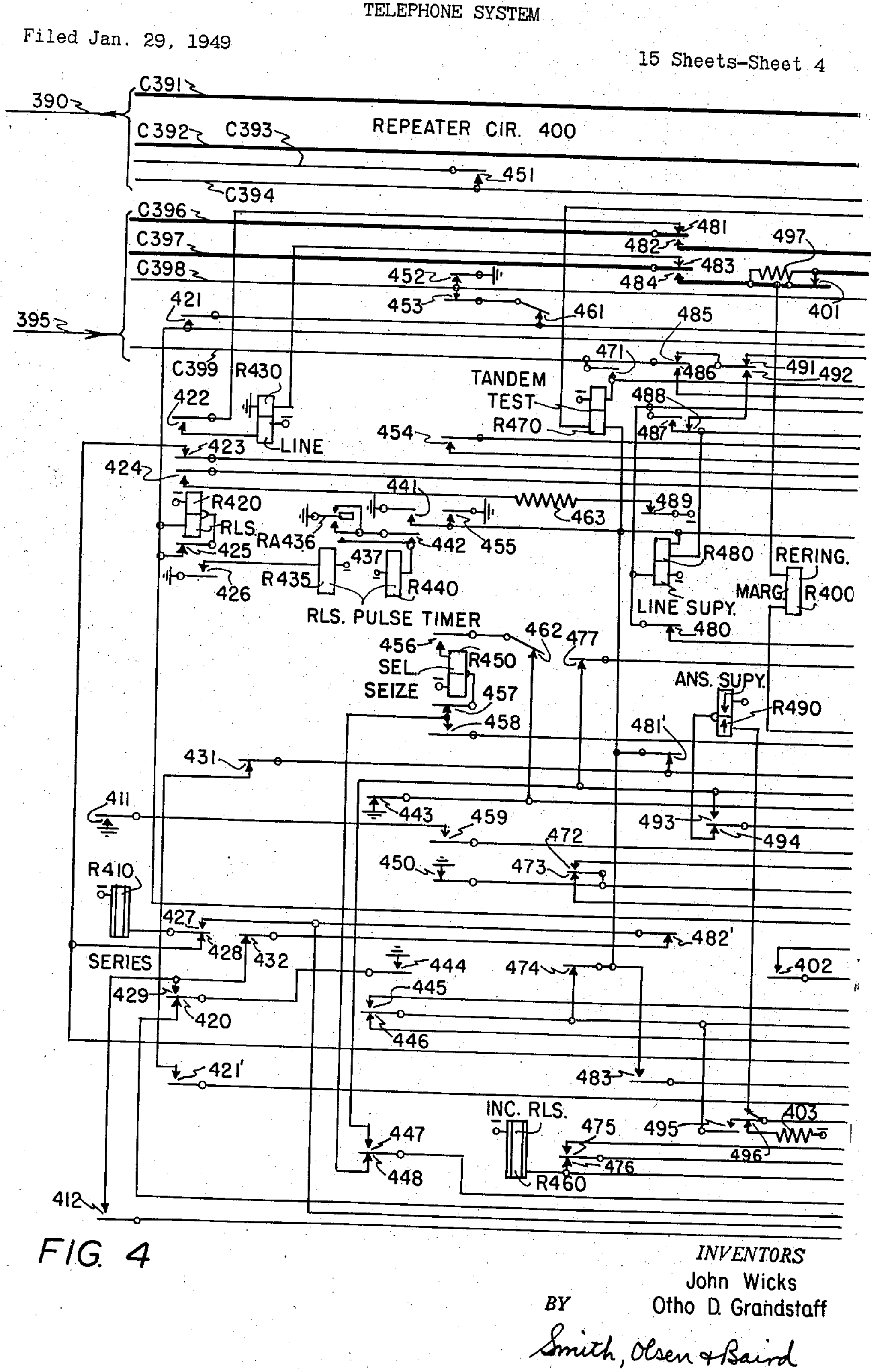
Figure 5:
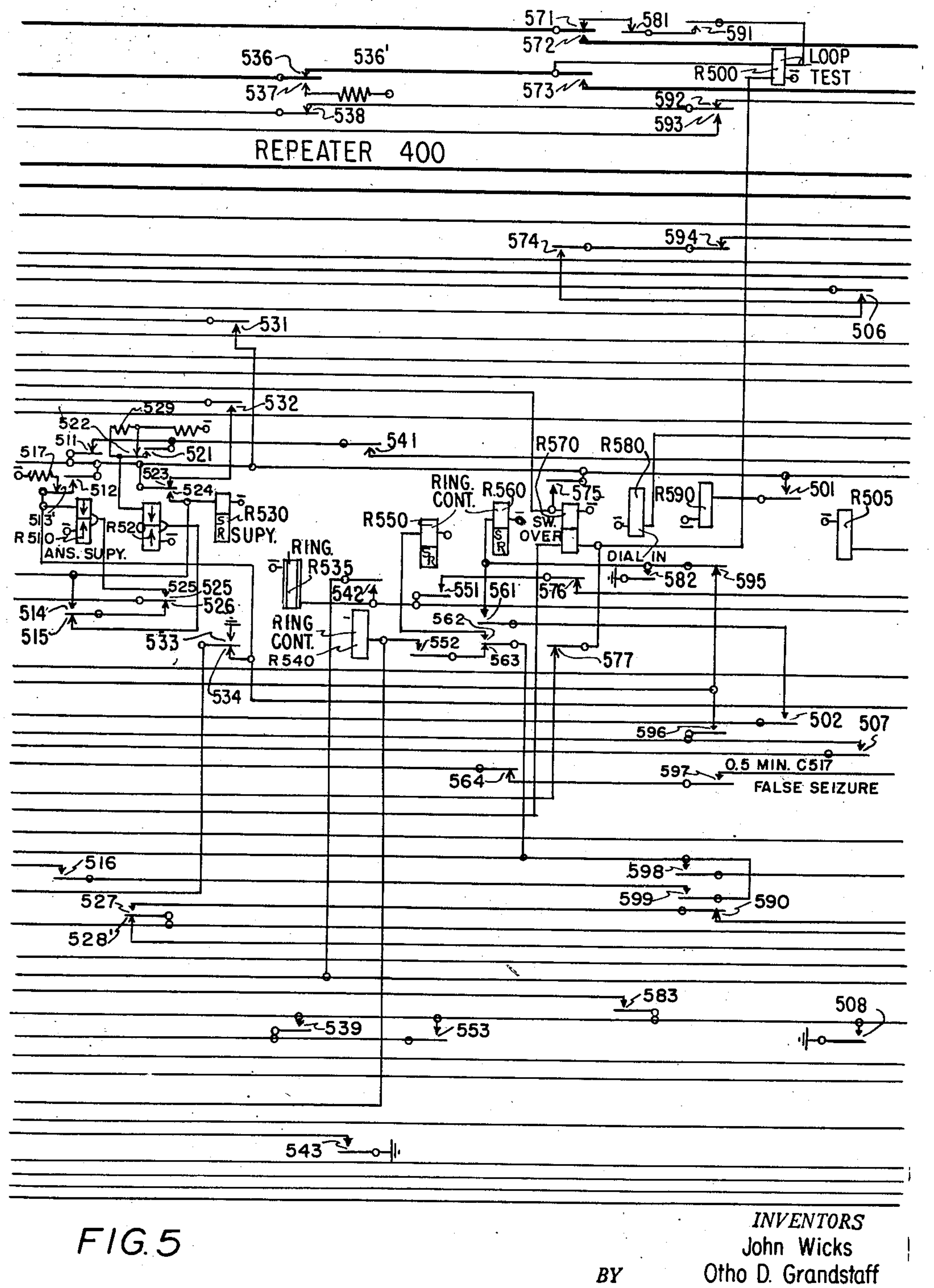
Figure 6:
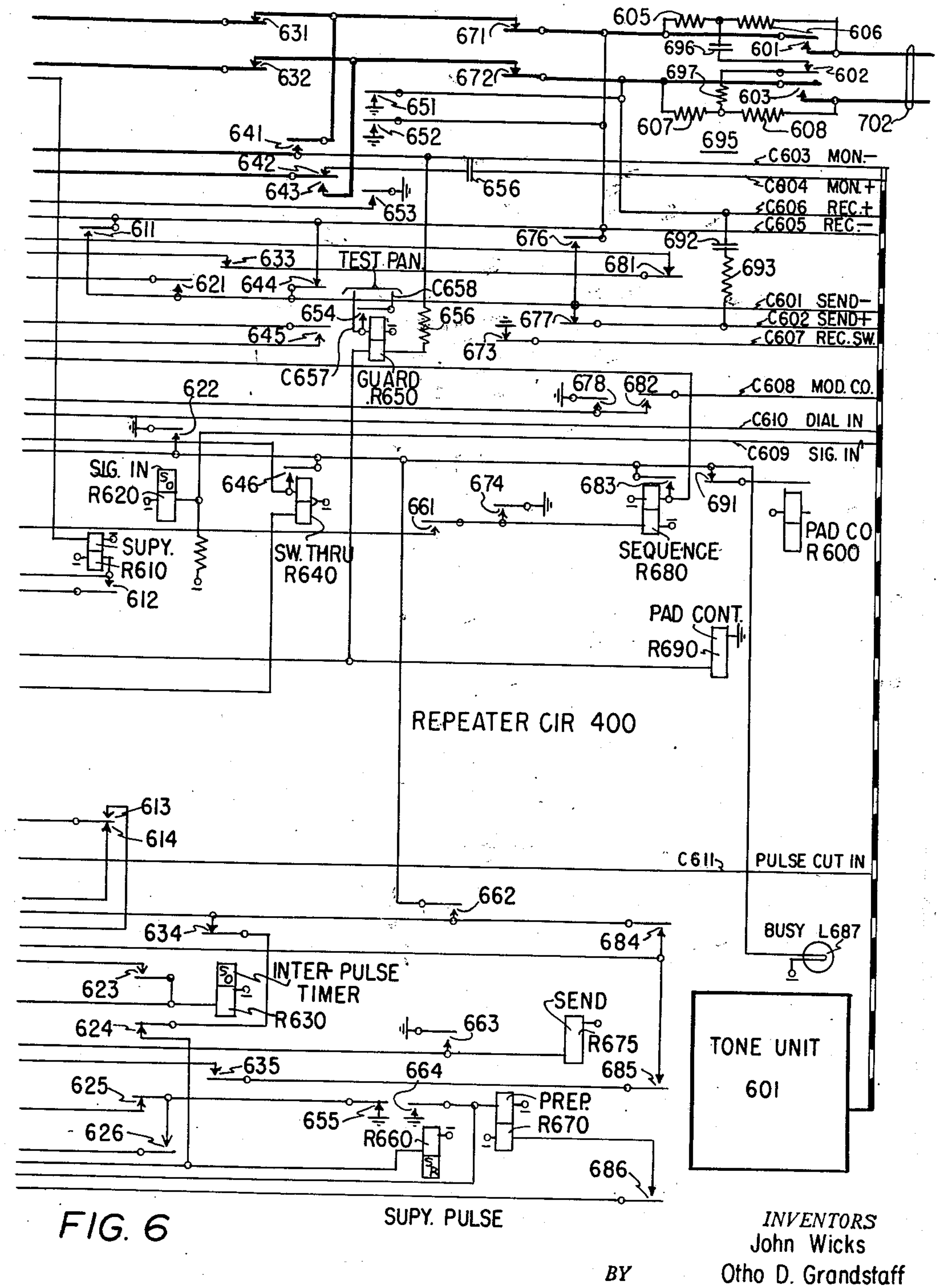
Figure 7:
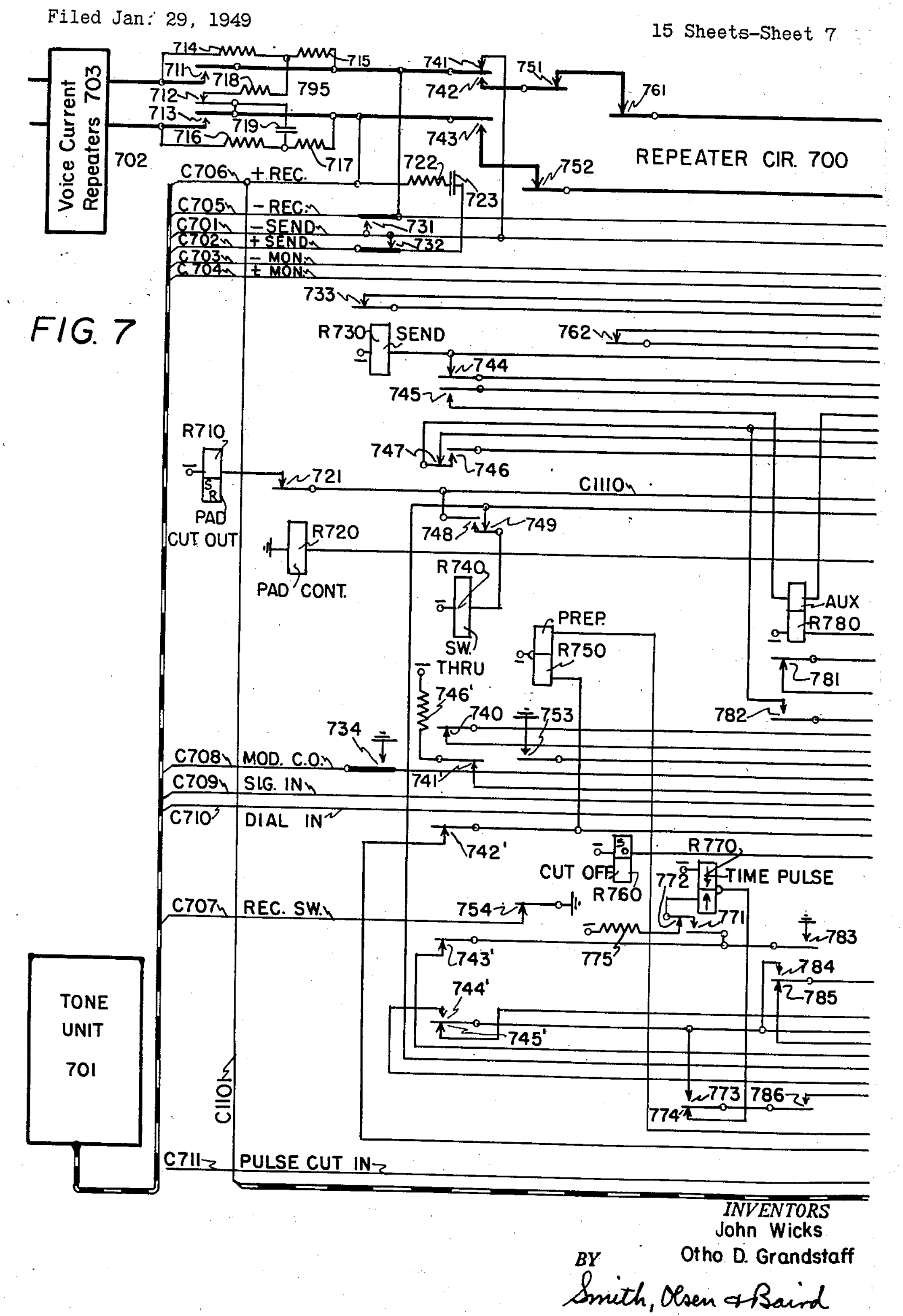
Figure 8:
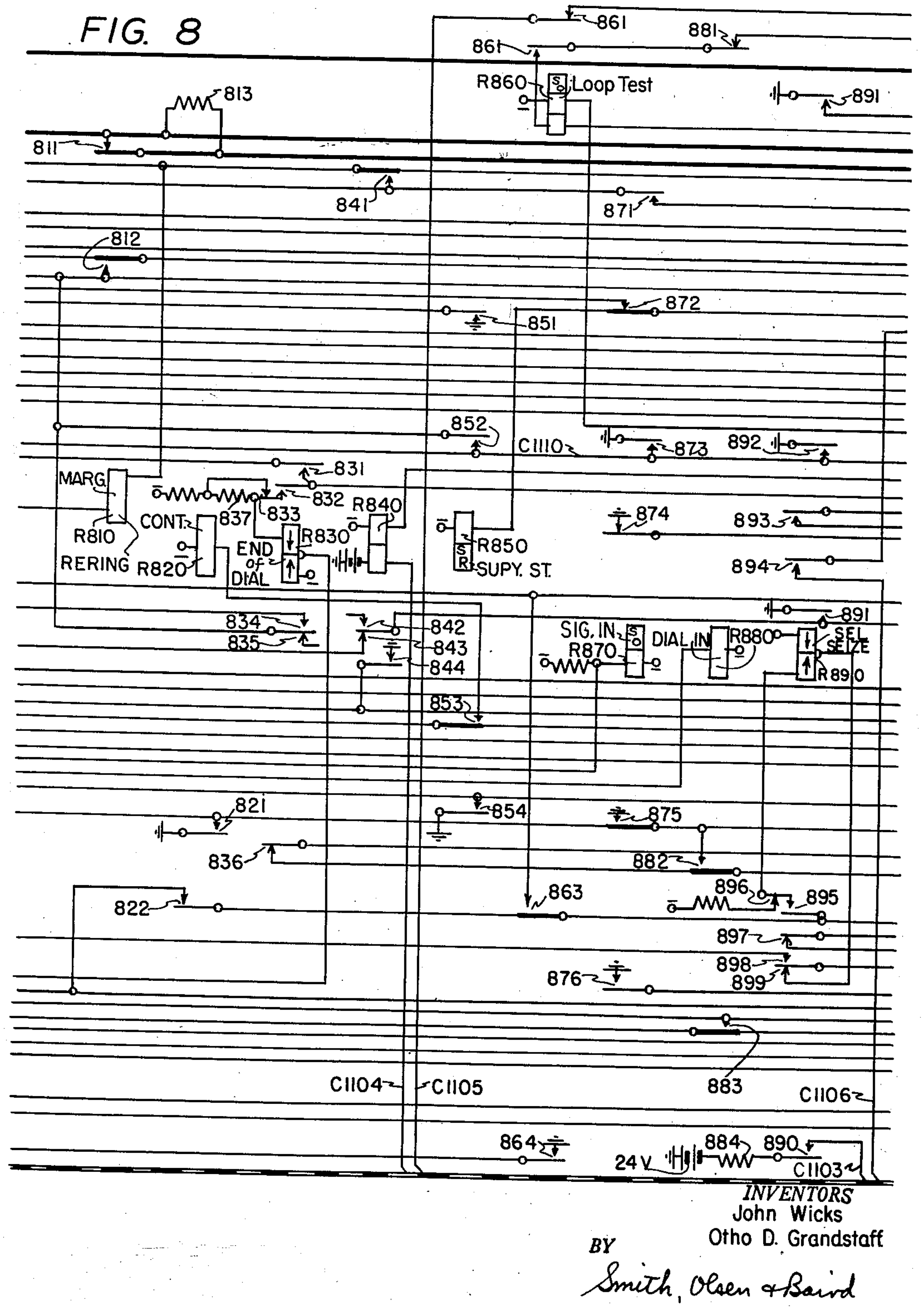
Figure 9:
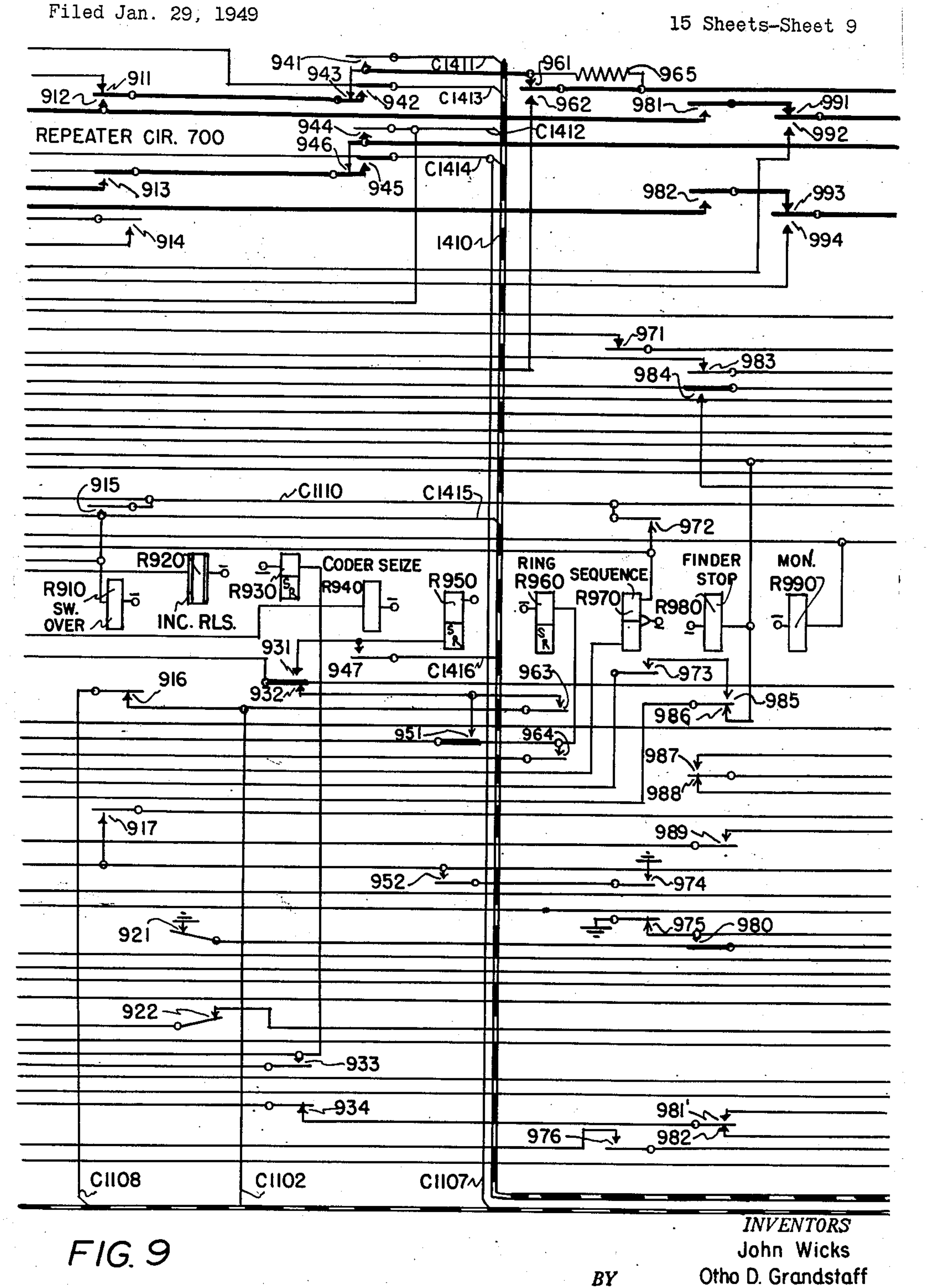
Figure 10:
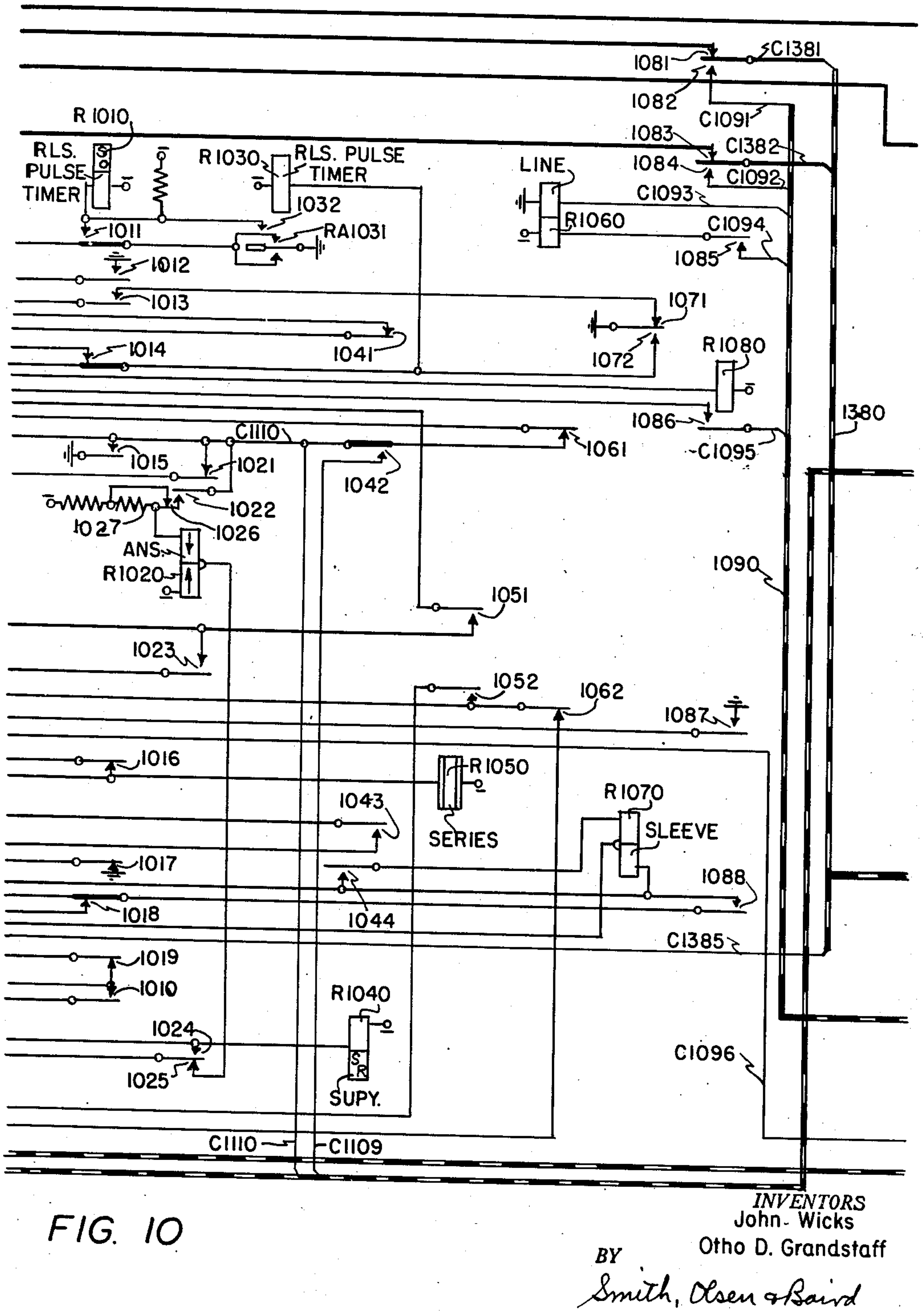
Figure 11:
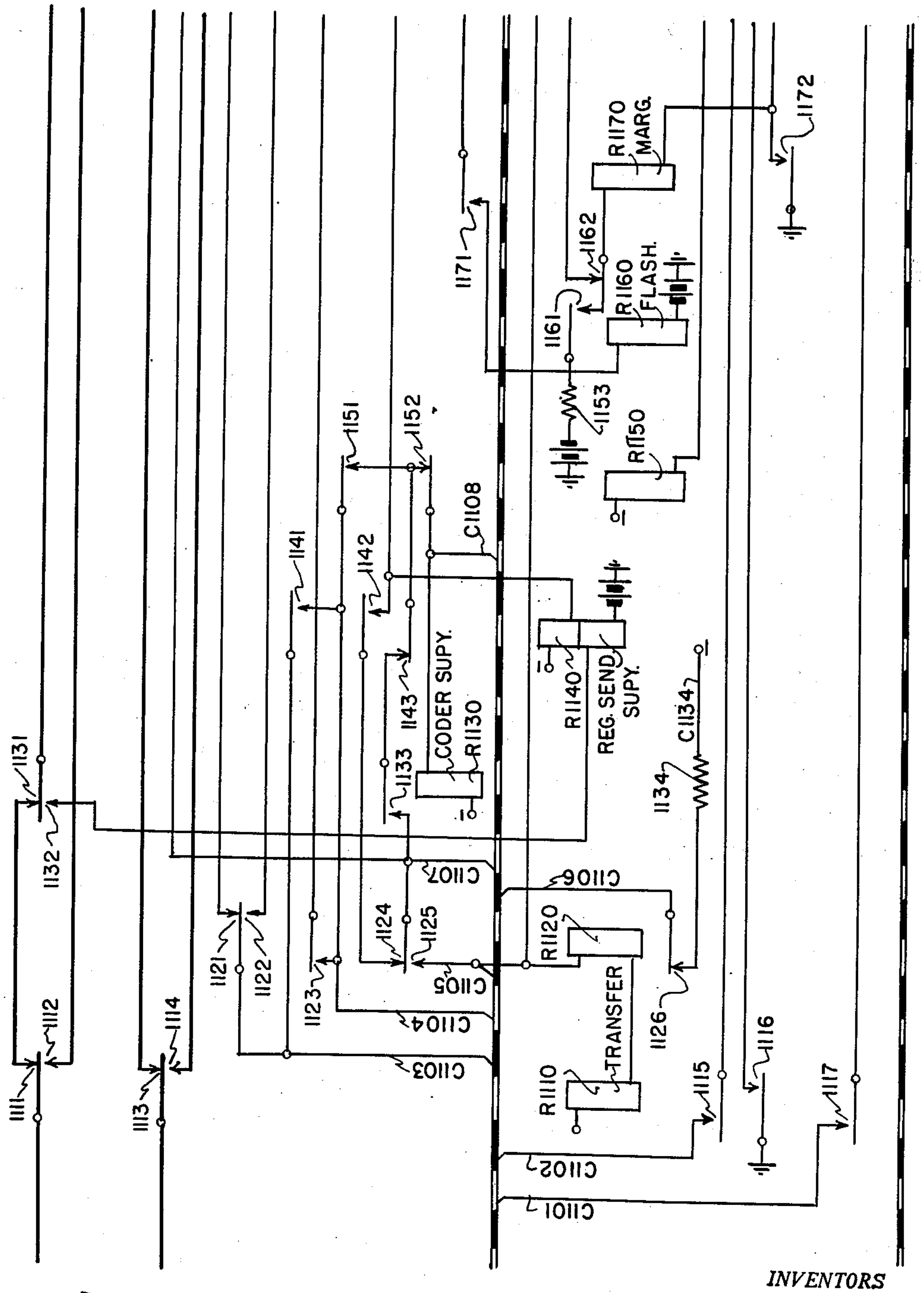
Figure 12:
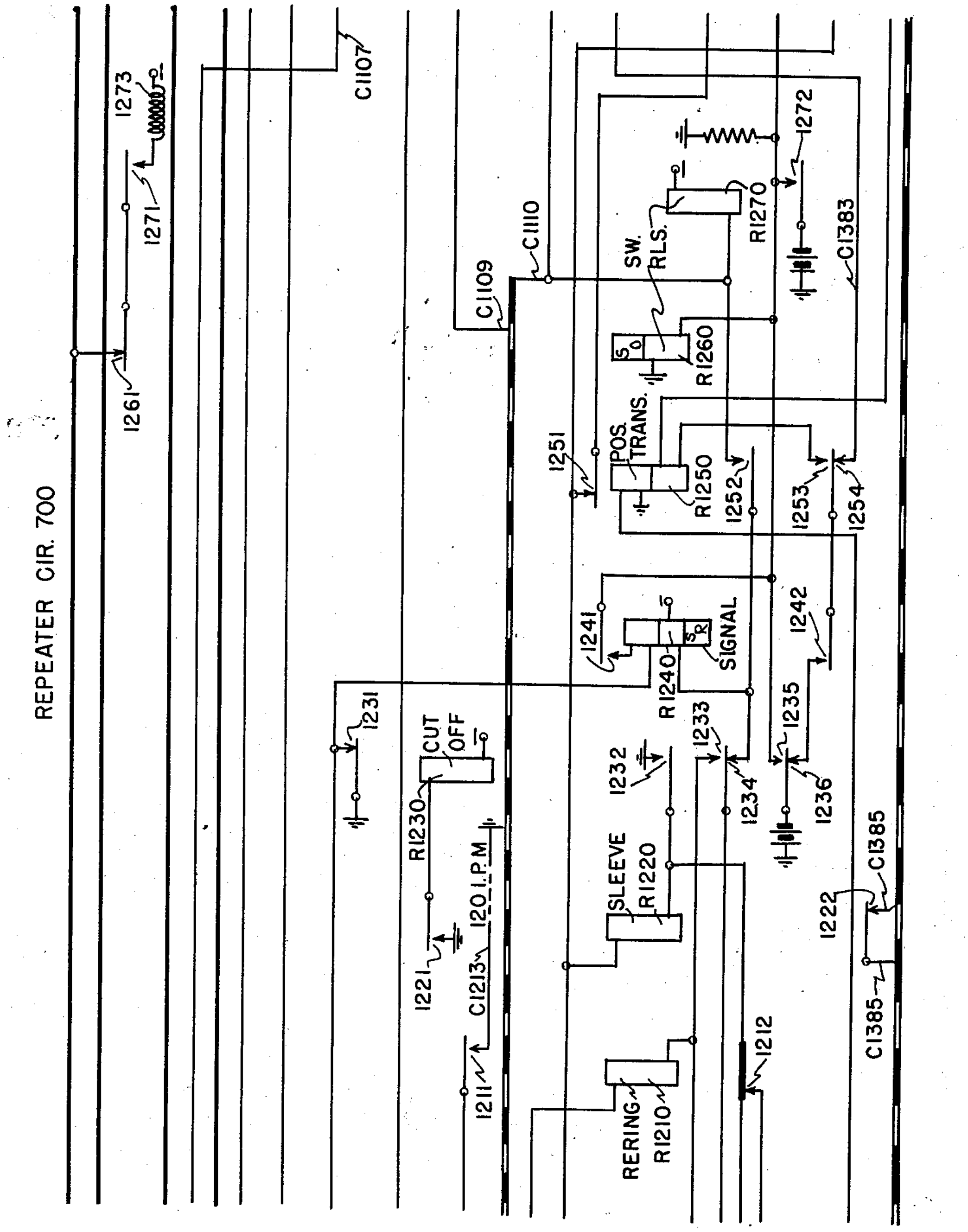
Figure 13:
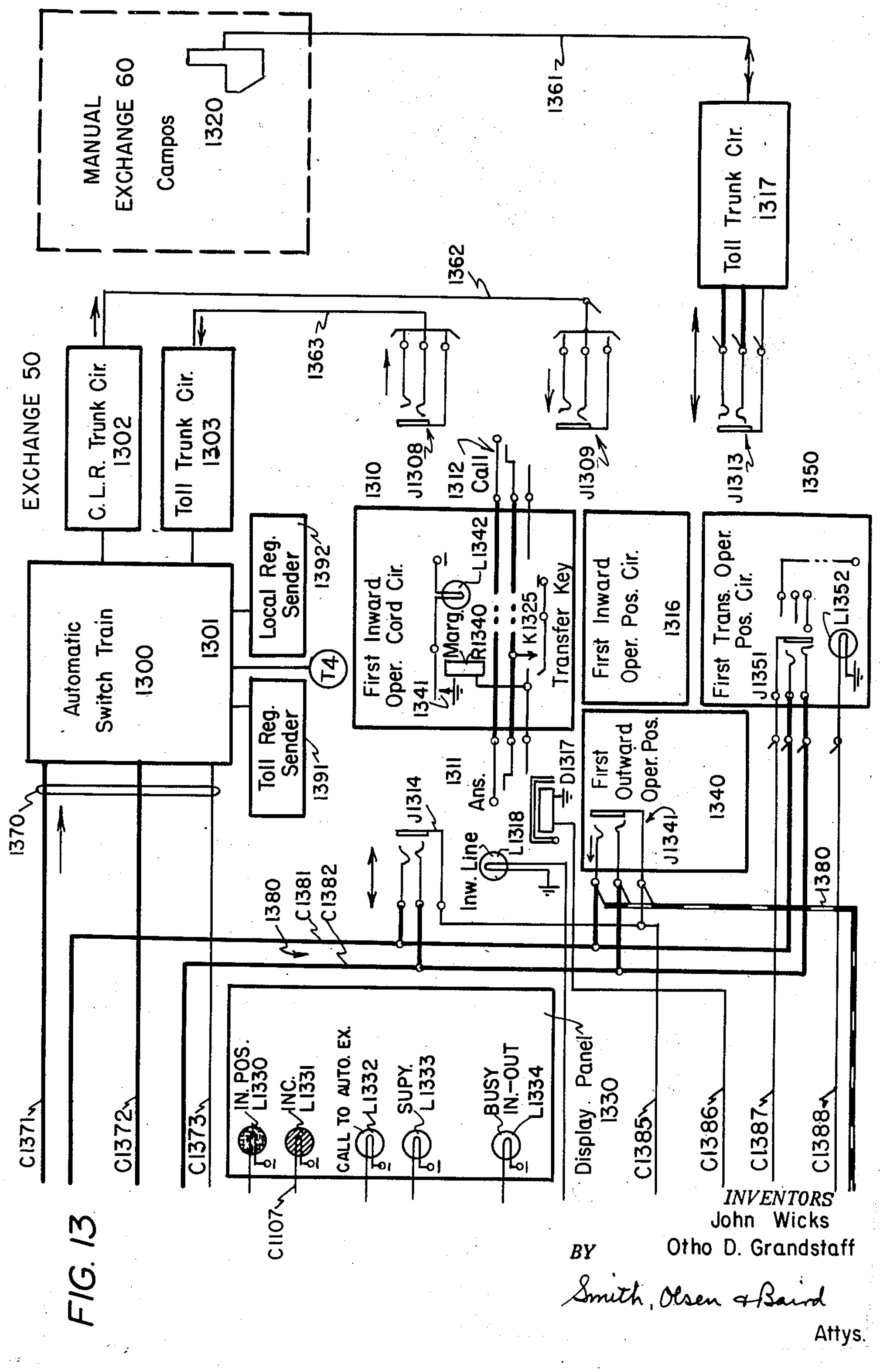

More particularly, Figs. 4 to 6, inclusive, illustrate the details of one of the repeater circuits incorporated in one of the automatic exchanges; Figs. 7 to 13, inclusive, illustrate the details of one of the repeater circuits incorporated in another of the automatic exchanges; and Fig. 14 illustrates a fragmentary portion of one of the coders associated with the repeater circuit illustrated in Figs. 7 to 13, inclusive.

Referring now more particularly to Figs. 1 and 2, the telephone system there illustrated was one applied to meet the specific requirements of the system of toll lines inter-connecting a group of cities in Brazil, South America, and including the cities of Sao Paulo and Rio de Janeiro. Since these two cities comprise the principal cities of Brazil, each serves as a concentration point for toll traffic; and as these two cities are within about two hundred miles of each other considerable toll traffic passes therebetween. In the general area of Sao Paulo are a number of cities, including Santos, Campinas and Jundiahy; and in the general area of Rio de Janeiro are a number of cities, including Campos. Sao Paulo comprises an automatic exchange 30 constituting a toll center; and a number of automatic offices, including the automatic office 380, each serving a group of subscriber substations. The automatic office 380 comprises office No. 8 in Sao Paulo and serves a group of subscriber substations, including the subscriber substation T1, as previously noted. The switching apparatus incorporated in the automatic exchange 30, constituting a toll center, as well as the switching apparatus incorporated in the automatic office 380, is of the well known Strowger type. Santos comprises an automatic exchange 360 serving a group of subscriber substations, including the subscriber substation T2, and automatic switching apparatus of the well known Strowger type. Campinas comprises an automatic exchange 370 serving a group of subcriber substations, including the subscriber substation T3, and automatic switching apparatus of the well known Strowger type. Jundiahy comprises a manual exchange 300 and serves a group of subscriber substations, not shown.

Rio de Janeiro comprises an automatic exchange 50 constituting both a toll center and an office serving a group of subscriber substations, including the subscriber substation T4. Also, the automatic exchange 50 comprises automatic switching apparatus of the well known International Standard Electric 7-A type, utilizing revertive impulse control. Campos comprises a manual exchange 60 and services a group of subscriber substations, not shown.

The automatic exchange 30 is connected to the automatic exchange 50 by a group of two-way toll lines, including the toll line 702. The toll line 702 embodies a number of voice current repeaters 703 distributed therealong; and the opposite ends thereof are terminated in repeater circuits 400 and 700, respectively disposed in the automatic exchange 30 and in the automatic exchange 50. A tone unit 601 in the automatic exchange 30 is individually associated with the repeater circuit 400 and a tone unit 701 in the automatic exchange 50 is individually associated with the repeater circuit 700.

The automatic exchange 30 is connected to the automatic exchange 360 by a group of two-way toll lines, including the toll line 356. The toll line 356 embodies a number of voice current repeaters 357 distributed therealong; and the opposite ends thereof are terminated in repeater circuits 355 and 365, respectively disposed in the automatic exchange 30 and in the automatic exchange 360. A tone unit 358 in the automatic exchange 30 is individually associated with the repeater circuit 355 and a tone unit 368 in the automatic exchange 360 is individually associated with the repeater circuit 365.

The automatic exchange 30 is connected to the automatic exchange 370 by a group of two-way toll lines, including the toll line 351. The toll line 351 embodies a number of voice current repeaters 352 distributed therealong; and the opposite ends thereof are terminated in repeater circuits 350 and 375, respectively disposed in the automatic exchange 30 and in the automatic exchange 370. A tone unit 353 in the automatic exchange 30 is individually associated with the repeater circuit 350 and a tone unit 378 in the automatic exchange 370 is individually associated with the repeater circuit 375.

The automatic exchange 30 is connected to the manual exchange 300 by a group of two-way toll lines, including the toll line 302. One end of the toll line 302 terminates in a manual toll board 301 disposed in the manual exchange 300, and the other end of the toll line 302 terminates in a toll trunk circuit 310 disposed in the automatic exchange 30.

The automatic exchange 30 is connected to the automatic office 380 by a group of outgoing trunk lines, including the outgoing line 342, and by a group of incoming trunk lines, including the incoming trunk line 306. The outgoing trunk line 342 is accessible to the automatic switching apparatus in the automatic exchange 30 and terminates in the switch train 385 disposed in the automatic office 380. One end of the incoming trunk line 306 terminates in a trunk circuit 388 in the automatic office 380 and is accessible via a trunk 387 to the switch train 385; and the other end of the incoming trunk line 306 terminates in a CLR trunk circuit 305 in the automatic exchange 30. In passing, it is noted that the switch train 385 in the automatic office 380 has access to and is accessible to the subscriber line 386 extending to the subscriber substation T1.

The automatic exchange 50 is connected to the manual exchange 60 by way of a group of two-way toll lines, including the toll line 1361. One end of the toll line 1361 terminates at a manual toll board 1320 disposed in the manual exchange 60, and the other end of the toll line 1361 terminates in a toll trunk circuit 1317 disposed in the automatic exchange 50.

The automatic exchange 30 further comprises a Strowger dial toll board, the first operator position circuit of which is indicated at 316; which first operator position circuit 316 has access by way of an associated cable 314 to a number of finder-selector links, including the finder-selector link 315. The finder-selector link 315 comprises a rotary finder having access to trunks 304 and 307, respectively extending to the CLR trunk circuit 305 and to the toll trunk circuit 310, and a Strowger selector. Individually associated with the repeater circuits 350, 400 and 355, respectively terminating the toll lines 351, 702 and 356 in the automatic exchange 30, are trunks 326, 390 and 331 respectively terminating in incoming toll selectors 325, 320 and 330. Also, the automatic switching apparatus in the automatic exchange 30 comprises a first group of outgoing toll selectors, including the outgoing toll selector 335, a second group of outgoing toll selectors, including the outgoing toll selector 340, and a third group of outgoing toll selectors, including the outgoing toll selector 345. The selector of each of the finder-selector links 315, etc., and each of the incoming toll selectors 325, 320, 330, etc., has access to each of the outgoing toll selectors 335, 340, 345, etc., via respectively associated trunks 336, 341, 346, etc. The outgoing toll selector 335, etc., has access to a trunk 337 extending to the toll trunk circuit 310 and, consequently, to the toll line 302 extending between the automatic exchange 30 and the manual exchange 300. The outgoing toll selector 340, etc., has access to the outgoing trunk line 342 extending to the switch train 385 in the automatic office 380. The outgoing toll selector 345, etc., has access to trunks 396, 395 and 397 respectively extending to the repeater circuits 350, 400 and 355; and, consequently, to the respective toll lines 351, 702 and 356 extending between the manual exchange 300 and the respective automatic exchanges 370, 50 and 360.

The automatic exchange 360 further comprises a Strowger dial toll board indicated at 369, and provided with automatic switching apparatus and control equipment indicated at 367. The automatic switching apparatus 367 has access to and is accessible to the subscriber line extending to the subscriber substation T2. Also, the switching apparatus 367 is accessible to and has access to the repeater circuit 365 via connections 366; and, consequently, with respect to the toll line 356 extending between the automatic exchange 360 and the automatic exchange 30. The automatic exchange 370 further comprises a Strowger dial toll board indicated at 379, and provided with automatic switching apparatus and control equipment indicated at 377. The automatic switch apparatus 377 has access to and is accessible to the subscriber line extending to the subscriber substation T3. Also, the switching apparatus 377 has access to and is accessible to the repeater circuit 375 via connections 376; and, consequently, with respect to the toll line 351 extending between the automatic exchange 370 and the automatic exchange 30.

The automatic exchange 50 further comprises a manual dial toll board of the well known Western Electric Company No. 3 type, the first inward operator position circuit of which is indicated at 1316, the first outward operator position circuit of which is indicated at 1340, and the first transfer operator position circuit of which is indicated at 1350. The first inward operator position circuit 1316 is provided with an associated group of cord circuits, one of which is indicated at 1310, and provided with an answer plug 1311 and a call plug 1312. Further, the first outward operator position circuit 1340 and the first transfer operator position circuit 1350 are provided with associated groups of cord circuits, not shown, each terminating in answer and call plugs. Also, associated with the manual dial toll board is a display panel 1330 that is connected to the repeater circuit 700, etc., in order to display supervisory signals from the repeater circuit 700, etc. Further the repeater circuit is provided with two trunks 1370 and 1380. The trunk 1370 is an incoming trunk and extends to the automatic switch train 1300 and is accessible thereto; while the trunk 1380 is a two-way trunk and terminates in jacks J1314, J1341 and J1351, respectively disposed at the first inward operator position circuit 1316, at the first outward operator position circuit 1340, and at the first transfer operator position circuit 1350, disposed at the manual dial toll board in the automatic exchange 50. Also, the automatic switch train 1300 has access to and is accessible to the subscriber line 1301 extending to the subscriber substation T4. Further, the automatic switch train 1300 has access to a group of outgoing trunks, including the outgoing trunk 1362, and is accessible to a group of incoming trunks, including the incoming trunk 1363. The outgoing trunk 1362 is terminated in a CLR trunk circuit 1302 and the incoming trunk 1363 terminates in a toll trunk circuit 1303. The toll trunk circuit 1303, etc., the CLR trunk circuit 1302, etc., and the toll trunk circuit 1317, etc., respectively terminate in jacks J1308, J1309 and J1313 disposed at the first inward operator position circuit 1316 and multipled to similar jacks, not shown, disposed at the first outward operator position circuit 1340 and at the first transfer operator position circuit 1350.

Further, a group of toll register senders, including the toll register sender 1391, and a group of local register senders, including the local register sender 1392, are commonly associated with the automatic switch train 1300 in the automatic exchange 50. Further, in the automatic exchange 50 there is disposed a preselector 1403 having access to a group of coders, including the coder 1404, and to the repeater circuit 700, etc. Specifically, the preselector 1403 has access to the coder 1404 via a cable 1420 and access to the repeater circuit 700 via a cable 1410. Also, the automatic exchange 50 comprises a group of finder circuits, including the finder circuit 1401, and an associated group of register senders, including the register sender 1402, as well as an associated allotter 1405. The allotter 1405 is commonly associated with repeater circuit 700, etc., and with the finder circuit 1401, etc.; while the finder circuit 1401, etc., has access to the repeater circuit 700, etc., via a cable 1090, etc. Finally, the finder circuit 1401 is individually associated with the register sender 1402.

*The apparatus incorporated in the telephone system*

In the automatic office 380 the switch train 385 is of the well known Strowger type, as previously noted, while the trunk circuit 388 may be of any suitable type.

In the automatic exchange 360 the toll switchboard 369 is of the well known Strowger dial type, as previously noted, and may be identical to the Strowger dial toll board provided in the automatic exchange 30. Similarly, the automatic switch and control equipment 367 disposed in the automatic exchange 360 is of the well known Strowger type, as previously noted, and may be identical to the corresponding automatic switch and control equipment disposed in the automatic exchange 30. Further, the repeater circuit 365 disposed in the automatic exchange 360 is identical to the repeater circuit 355 disposed in the automatic exchange 30; which, in turn, is identical to the repeater circuit 400 described in detail hereinafter. Finally, the tone unit 368 disposed in the automatic exchange 360 is identical to the tone unit 358 disposed in the automatic exchange 30; which, in turn, is identical to the tone unit 1600 described in detail hereinafter.

In the automatic exchange 370 the toll switchboard 379 is of the well known Strowger dial type, as previously noted, and may be identical to the Strowger dial toll board provided in the automatic exchange 30. Similarly, the automatic switch and control equipment 377 disposed in the automatic exchange 370 is of the well known Strowger type, as previously noted, and may be identical to the corresponding automatic switch and control equipment disposed in the automatic exchange 30. Further, the repeater circuit 375 disposed in the automatic exchange 370 is identical to the repeater circuit 350 disposed in the automatic exchange 30; which, in turn, is identical to the repeater circuit 400 described in detail hereinafter. Finally, the tone unit 378 disposed in the automatic exchange 370 is identical to the tone unit 353 disposed in the automatic exchange 30; which, in turn, is identical to the tone unit 1600 described in detail hereinafter.

Figure 3:
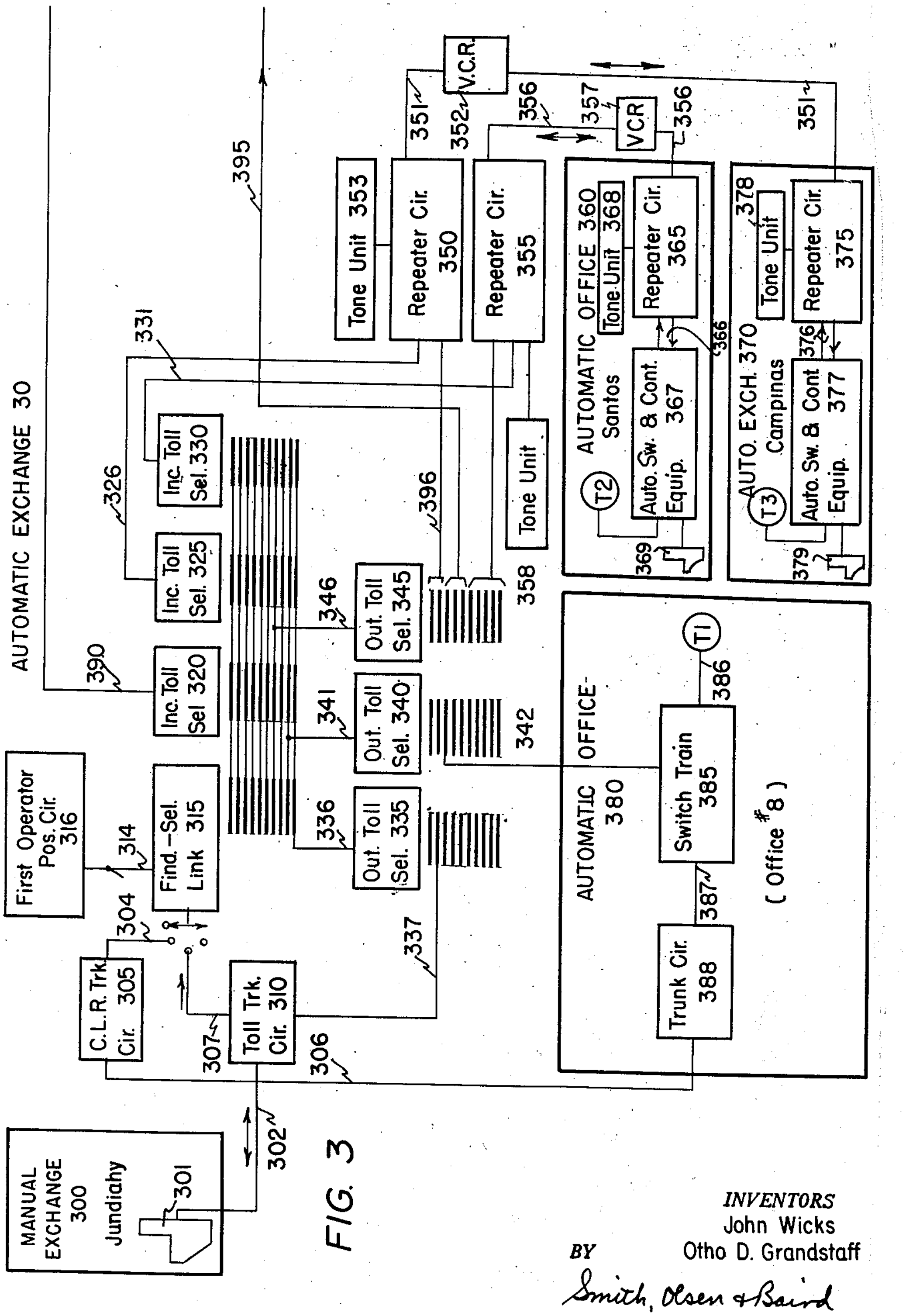

In the automatic exchange 30, preferably the CLR trunk circuits 305, etc., are identical and are of the form illustrated in Fig. 3 of the previously mentioned Wicks patent; and the toll trunk circuits 310, etc., are identical and are of the form illustrated in Fig. 4 of the previously mentioned Wicks patent. Also, in the automatic exchange 30 the various operator position circuits 316, etc., at the Strowger dial toll board therein are identical and are of the form illustrated in Fig. 5 of the previously mentioned Wicks patent. Similarly, the finder-selector links 315, etc., are identical and are preferably of the form illustrated in Figs. 5 and 6 of the previously mentioned Wicks patent. Preferably, the incoming toll selectors 325, 320, 330, etc., are identical and are of the form illustrated in Fig. 6 of the previously mentioned Wicks patent; the outgoing toll selectors 345, etc., are identical and are of the form illustrated in Fig. 8 of the previously mentioned Wicks patent; the outgoing toll selectors 340, etc., are identical and are of the form illustrated in Fig. 9 of the previously mentioned Wicks patent; and the outgoing toll selectors 335, etc., are identical and are of the form illustrated in Fig. 10 of the previously mentioned Wicks patent. As previously noted, the repeater circuits 350, 355, etc., are identical to the repeater circuit 400 illustrated in Figs. 4 to 6, inclusive, and described in detail hereinafter; while the tone units 353, 601, 358, etc., are identical to the tone unit 1600 illustrated in Fig. 16 and described in detail hereinafter.

In the automatic exchange 50 the automatic switch trail 1300 is of the International Standard Electric 7-A type, as previously noted; the manual dial toll board is of the well known Western Electric Company No. 3 type as previously noted, cord circuit 1310 and the position circuit 1316 being of the forms respectively in Figs. 20 and 21 of the previously mentioned Wicks patent. Preferably, the toll register senders 1391, etc., and the local register senders 1392, etc., are of the usual types; and the toll trunk circuits 1303, etc., the CLR trunk circuits 1302, etc., and the toll trunk circuits 1317, etc., may be of any suitable types. Further, the tone units 701, etc. are identical to the tone unit 1600, illustrated in Fig. 16 and described in detail hereinafter. Preferably, the repeater circuits disposed in the automatic exchange 50 are identical to the repeater circuit 700, illustrated in Figs. 7 to 13, inclusive, and described in detail hereinafter. Preferably, the preselector 1403 is of the form illustrated in Fig. 15 of the previously mentioned Wicks patent; and the coders 1404, etc., are identical and, as indicated in Fig. 14, are substantially of the form illustrated in Fig. 16 (parts 1, 2 and 3) of the previously mentioned Wicks patent. Preferably, the finder circuits 1401, etc., are identical and are of the form illustrated in Fig. 17 of the previously mentioned Wicks patent; the register senders 1402, etc., are identical and are of the form illustrated in Fig. 18 (parts 1 and 2) of the previously mentioned Wicks patent; and the allotter 1405 is of the form illustrated in Fig. 17 of the previously mentioned Wicks patent.

The repeater circuit 400 disposed in the automatic exchange 30 comprises, as shown in Figs. 4 to 6, inclusive, a relay group including a series relay R410, a release relay R420, a line relay R430, two release pulse timer relays R435 and R440, a selector seize relay R450, an incoming release relay R460, a tandem test relay R470, a line supervisory relay R480, an answer supervisory relay R490, a re-ring relay R400, an answer supervisory relay R510, a supervisory control relay R520, a supervisory relay R530, a ring relay R535, three ring control relays R540, R550 and R560, a switch-over relay R570, a dial-in relay R580, a control relay R590, a loop test relay R500, a control relay R505, a supervisory relay R610, a signal-in relay R620, an interpulse timer relay R630, a switch-through relay R640, a guard relay R650, a supervisory pulse relay R660, a prepare relay R670, a send relay R675, a sequence relay R680, a pad control relay R690 and a pad cutout relay R600, as well as a toll pad 695.

The repeater circuit 700 as disposed in the automatic exchange 50 comprises, as shown in Figs. 7 to 13, inclusive, a relay group including a pad cutout relay R710, a pad control relay R720, a send relay R730, a switch-through relay R740, a prepare relay R750, a cutoff relay R760, a time pulse relay R770, an auxiliary relay R780, a re-ring relay R810, a control relay R820, an end-of-dial relay R830, a supervisory relay R840, a supervisory start relay R850, a loop test relay R860, a signal-in relay R870, a dial-in relay R880, a selector seize relay R890, a switch-over relay R910, an incoming release relay R920, a control relay R930, a coder seizing relay R940, a control relay R950, a ring relay R960, a sequence relay R970, a finder stop relay R980, a monitor relay R990, a release pulse timer relay R1010, an answer relay R1020, a release pulse timer relay R1030, a supervisory relay R1040, a series relay R1050, a line relay R1060, a sleeve relay R1070, a start relay R1080, two transfer relays R1110 and R1120, a coder supervisory relay R1130, a register sender supervisory relay R1140, a control relay R1150, a flash relay R1160, two re-ring relays R1170 and R1210, a sleeve relay R1220, a cutoff relay R1230, a signal relay R1240, a position transfer relay R1250 and two switch release relays R1260 and R1270, as well as a toll pad 785.

As previously noted, the coder 1404 disposed in the automatic exchange 50, shown in skeleton diagram in Fig. 14, is substantially of the form illustrated in Fig. 16 (parts 1, 2 and 3) of the previously mentioned Wicks patent; however, the coder 1404 is slightly modified in that it includes an additional relay, the transfer control relay R1430, which is utilized in carrying out an additional feature incorporated in the coder 1404 and explained more fully hereinafter. Otherwise, the coder is of the form mentioned and comprises the six identical digit storage devices DS1 to DS6, inclusive; the digit storage device DS1 being illustrated as including the four individual relays A, B, C, and D.

The tone unit 1600 is of the type disclosed in the previously mentioned copending application of Otho D. Grandstaff, and essentially comprises, as illustrated in Fig. 16, a receiving transformer TR1, a sending and coupling transformer TR2, a monitoring transformer TR3, a two-way amplifier T1 in the form of a vacuum tube of the well known pentode 6C6 type, a differential detector T2 in the form of a vacuum tube of the well known dual diode 6H6 type, an impulse amplifier T3 in the form of a vacuum tube of the well known pentode 6C6 type and a signal amplifier T4 in the form of a vacuum tube of the well known pentode 43 type, as well as a relay group including a modulation cutoff relay R1620, a receiving switch relay R1640, a pulse cut-in relay R1650, an alarm relay R1655, an impulse-in relay R1660, and a signal-in relay R1670; together with a plate impedance 1628 associated with the tube T1, a plate impedance 1634 associated with the tube T3, and a plate impedance 1639 associated with the tube T4. Further, the tone unit 1600 comprises circuit elements described in detail hereinafter and inter-connecting the elements mentioned, as well as a group of conductors extending to the associated repeater circuit, and including a sending −conductor C1601, a sending +conductor C1602, a monitoring −conductor C1603, a monitoring +conductor C1604, a receiving −conductor C1605, a receiving +conductor C1606, a receiving switch conductor C1607, a modulation cutoff conductor C1608, a signal-in conductor C1609, a dial-in conductor C1610, and a pulse cut-in conductor C1611; together with a 60 cycle conductor C1612 extending to an associated 60 cycle generator, not shown, and a 1000 cycle conductor C1613 extending to an associated 1000 cycle generator, not shown.

The essential details of a Strowger dial toll board and a cooperating Strowger switch train are disclosed in U. S. Patent No. 2,167,710, granted on August 1, 1939, to Thomas F. Crocker; while the essential details of a Western Electric Company No. 3 manual dial toll board and a cooperating International Standard Electric 7-A switch train are disclosed in U. S. Patent No. 1,125,579, granted on January 19, 1915, to Frank R. McBerty.

*The operation of the tone unit 1600*

In the tone unit 1600, the tubes T1 and T3 are each provided with a cathode heater having a nominal rating of 6.3 volts, at which voltage 0.3 ampere is drawn; the tube T2 is provided with a two-section cathode heater having a nominal rating of 6.3 volts, at which voltage 0.3 ampere is drawn; and the tube T4 is provided with a cathode heater having a nominal rating of 25 volts, at which voltage 0.3 ampere is drawn. The cathode heaters of the tubes T1, T2, T3, and T4 are connected in series circuit with a 4 ohm resistor R1 and the winding of the alarm relay R1655 across a 48 volt exchange battery, the positive pole of which is grounded. More particularly the circuit mentioned extends from ground by way of the contacts 1619 of a normally operated key K2, the cathode heater of the tube T2, a conductor C1673, the cathode heater of the tube T3, a conductor C1674, the cathode heater of the tube T1, a conductor C1675, the resistor R1, a conductor C1676, the cathode heater of the tube T4, and the winding of the alarm relay R1655 to the negative pole of the 48 volt exchange battery. Accordingly, the series circuit above traced is normally completed, whereby the cathode heaters heat the associated cathodes of the tubes mentioned rendering them electron emissive and effecting operation of the alarm relay R1655. Of course, it will be understood that in the event any one of the tubes mentioned is removed from its socket or develops a burned out or broken cathode heater, the above traced series circuit is interrupted, causing the alarm relay R1655 to restore in order to complete, at the contacts 1656, a circuit including the contacts 1618 of the key K2 for illuminating a cathode heater alarm lamp L1657, thereby to indicate the failure mentioned. Moreover, the potential drop along the above-traced series cathode heater circuit is employed at various points for grid biasing purposes, explained more fully hereinafter; and, in passing, it is noted that a negative potential of 6.3 volts appears upon the conductor C1673, a negative potential of 18.9 volts appears upon the conductor C1675, and a negative potential of 20.1 volts appears upon the conductor C1676.

The tube T1 is employed as a two-way amplifier, being utilized as an outgoing amplifier and modulator in the transmission of signals to the associated repeater circuit. The screen grid of the tube T1 is supplied with positive potential from a 130 volt source of plate current, the negative pole of which is grounded, through an associated 50,000 ohm resistor 1629 and is by-passed to the cathode of the tube T1 by a 0.1 mf. condenser 1630 connected therebetween; and the suppressor grid of the tube T1, employed as a modulation grid, is connected either to ground potential or to the 60 cycle conductor C1612, depending upon the operated or restored condition of the modulation cutoff relay R1620 and the receiving switch relay R1640 as explained more fully hereinafter.

For the reception of signals, the primary winding of the receiving transformer TR1 is connected to the receiving −conductor C1605 and to the receiving +conductor C1606 through the two illustrated 0.1 mf. condensers; the secondary winding of the receiving transformer TR1 is normally connected by way of the contacts 1641' of the normally operated receiving switch relay R1640 to the control grid of the tube T1 in order to control the potential applied thereto; a negative potential of 20.1 volts being normally applied to the control grid of the tube T1 from the conductor C1676 by way of a 0.15 megohm resistor R2, the secondary winding of the receiving transformer TR1 and the contacts 1641' of the receiving switch relay R1640. The cathode of the tube T1 is normally connected by way of the contacts 1643' of the normally operated receiving switch relay R1640 to the conductor C1675 having negative 18.9 volt potential applied thereto. Accordingly, the control grid of the tube T1 has a negative biasing potential of 1.2 volts applied thereto with respect to the cathode by virtue of the 1.2 volt drop across the resistor R1.

With the receiving switch relay R1640 in its normal operated position, the suppressor grid of the tube T1 is normally connected by way of the contacts 1646 thereof to ground potential, as previously noted; and the secondary winding of the sending and coupling transformer TR2 is connected, at the contacts 1642 and 1644 of the operated receiving switch relay R1640, across the leads C1625 and C1626. The primary winding of the monitoring transformer TR3 is connected by way of the two 5000 ohm resistors 1623 and 1624 across the leads C1625 and C1626; while the secondary winding of the monitoring transformer TR3 is connected directly to the monitoring −conductor C1603 and the monitoring +conductor C1604 extending to the associated repeater circuit. Thus, audible signals amplified by the tube T1 and impressed through the sending and coupling transformer TR2 across the leads C1625 and C1626 are supplied through the monitoring transformer TR3 to the monitoring − and monitoring +conductors C1603 and C1604 extending to the associated repeater circuit, for a purpose more fully explained hereinafter. Further, the plate of the tube T1 is connected by way of the associated 6500 ohm plate impedance 1628 to the positive terminal of the 130 volt source of plate current supply, and is also connected by way of a 0.04 mf. coupling condenser 1627 to one terminal of the primary winding of the sending and coupling transformer TR2, the other terminal of the primary winding mentioned being grounded.

An inductance coil L3 is connected across the leads C1625 and C1626 in series with a 0.04 mf. tuning condenser 1631, which condenser is shunted by the indicated trimmer condenser of such capacity as to render the couple series-resonant at 1000 cycles. Finally, the junction between the inductance coil L3 and the tuning condenser 1631 is connected to the right-hand plate of the tube T2, whereby a relatively high potential is placed on the right-hand plate of the tube T2 by the voltage drop across the inductance coil L3 when a 1000 cycle current is being received and amplified by the tube T1. In order to enable the system to respond to impulses of 100 cycles plus or minus an amount equal to about 60 cycles, so as to allow for the reception of 60 cycle modulated, 1000 cycle pulses, and to cut off sharply when frequencies higher or lower than the allowable band are received, an arrangement is provided including inductance coils L1 and L2 and 0.04 mf. tuning condensers 1632 and 1633. The inductance coils L1 and L2 and the condensers 1632 and 1633 are arranged to form a double-peak tuning circuit which peaks at 900 cycles and at 1100 cycles. The 900 cycle and 1100 cycle peaks are produced in addition to the 1000 cycle peak that is produced by the inductance coil L3 and the associated tuning condenser 1631. More particularly, the inductance coil L2 is arranged in series with the tuning condenser 1633, which condenser is shunted by the indicated trimmer condenser of such capacity as to render the couple series-resonant at 1100 cycles, provided substantially no current is permitted to flow through an associated 0.01 mf. shunt condenser 1678; which series-resonant couple, including the inductance coil L2 and the tuning condenser 1633, is connected directly across the leads C1625 and C1626. Finally, the junction between the inductance coil L2 and the tuning condenser 1633 is connected to the left-hand plate of the tube T2. More particularly, the inductance coil L1 is arranged in parallel with the tuning condenser 1632, which tuning condenser is shunted by the indicated trimmer condenser of such capacity as to render the couple parallel or shunt-resonant at 1100 cycles. In turn, the shunt-resonant couple, including the inductance coil L1 and the tuning condenser 1632, is connected between the left-hand plate of the tube T2 and one terminal of the shunt condenser 1678; the other terminal of the shunt condenser 1678 being connected directly to the lead 1625. Current of 1100 cycles is substantially prevented from flowing through the shunt condenser 1678 by the shunt-resonant effect of the inductance coil L1 and the associated tuning condenser 1632, as this couple is shunt-resonant at 1100 cycles. When current is received at some other frequency, however, the shunt-resonant effect is not present in the couple, including the inductance L1 and the associated tuning condenser 1632, whereby current is permitted to pass through the shunt condenser 1678 by way of the inductance coil L1 and the associated tuning condenser 1632. The capacity of the shunt condenser 1678 is so chosen that it, connected in multiple with the tuning condenser 1633 through the system composed of the inductance coil L1 and its associated tuning condenser 1632, causes the inductance coil L2 to have a resonant peak at 900 cycles in addition to the previously described peak at 1100 cycles. The manner in which the triple-peak tuning arrangement operates to control the tube T3 by way of the tube T2 is pointed out in detail hereinafter.

More particularly, the cathode of the tube T3 is connected directly toground potential while the control grid of the tube T3 is connected directly to the right-hand cathode of the tube T2, the left-hand cathode of the tube T2 being connected directly to the conductor C1673. Also, the control grid of the tube T3 is connected to the right-hand terminal of an 0.3 megohm resistor R4, the left-hand terminal of which is connected directly to the lead C1626. Also, the left-hand terminal of the resistor R4 is connected to the right-hand terminal of an 0.15 megohm resistor R3, the left-hand terminal of the resistor R3 being connected to the right-hand terminal of the resistor R2 previously mentioned. In other words, the resistors R2, R3 and R4 are connected in series circuit relation between the conductor C1676 and the control grid of the tube T3. Since the resistors R2 and R3 each comprise 0.15 megohm and the resistor R4 comprises 0.3 megohm, the center tap of this composite resistor is connected to the lead C1626, as previously explained. Further, the resistors R2 and R3 are by-passed by an associated 0.1 mf., storage condenser 1673, and the resistor R4 is by-passed by an associated 0.1 mf. storage condenser 1674. Accordingly, a negative bias of 20.1 volts is normally provided the control grid of the tube T3 by virtue of the connection through the resistors R4, R3 and R2 to the conductor C1676 having the potential mentioned impressed thereon; the conductor C1676 being included in the previously traced cathode heaters circuit. By virtue of the connection of the lead C1626 to the center tap of the grid resistor, including the sections R2, R3 and R4, associated with the tube T3 and the connection of the left-hand terminal of the resistor R2 to the conductor C1676, a negative potential of 20.1 volts is normally maintained on the right-hand plate and the left-hand plate of the tube T2 through the inductance coils L3 and L2 respectively. The right-hand cathode of the tube T2 is also supplied with a biasing potential of negative 20.1 volts by virtue of the above described connection including the resistors R4, R3 and R2 to the conductor C1676, whereby there is normally no potential difference between the right-hand cathode and the right-hand plate of the tube T2. On the other hand, the left-hand cathode of the tube T2 is connected directly to the conductor C1673 having negative 6.3 volts appearing thereon, whereby there is normally a negative 13.8 volts potential difference between the left-hand plate and the left-hand cathode of the tube T2. Specifically, the left-hand plate is biased with respect to the left-hand cathode of the tube T2 by the rather substantial adverse potential of 13.8 volts, whereby no current passes through the left-hand portion of the tube T2 until this rather substantial adverse bias of 13.8 volts is overcome.

During the reception of a signal, the building up of 1000 cycle potential across the inductance coil L3 causes current to flow through the right-hand plate and the right-hand cathode of the tube T2 in series with the resistor R4. Thus, half-wave rectified current passes through the resistor R4 and, together with the associated smoothing condenser 1674, renders the right-hand terminal thereof more positive than the left-hand terminal thereof, thereby off-setting to this extent the negative bias normally applied to the control grid of the tube T3. On the other hand, when the signal contains a sufficient component of 900 cycle or 1100 cycle potential to cause a sufficient potential to be built up across the inductance coil L2 to overcome the 13.8 volt bias normally present between the left-hand plate and the left-hand cathode of the tube T2, current flows between the left-hand plate and the left-hand cathode of the tube T2. Thus, half-wave rectified current passes through the resistors R1, R2 and R3 causing the midpoint of the composite resistor, including the resistors R2, R3 and R4, and specifically the junction between the resistors R3 and R4, to become more negative than the right-hand terminal of the resistor R4 by virtue of the potential drop through the resistors R2 and R3. Therefore, when a signal other than a wanted signal is received, and which falls in the neighborhood of 900 cycles or 1100 cycles, the current flowing through the inductance coil L2 and obtained through the resistors R2 and R3, together with the associated smoothing condenser 1673, renders the control grid of the tube T3 more negative than it normally is, thereby preventing a response of the tube T3 to the signal, notwithstanding the fact that sufficient current may be flowing through the resistor R4 otherwise to secure a response of the tube T3.

The plate, the suppressor grid and the screen grid of the tube T3 are connected together to produce a triode of the desired characteristics and are, in turn, connected both to one terminal of the associated 3300 ohm plate impedance 1634 and to one terminal of the 3300 ohm winding of the impulse-in relay R1660. The other terminal of the plate impedance 1634 is normally connected, by way of the contacts 1652 of the normally restored pulse cut-in relay R1650, to the positive terminal of the 130 volt plate current supply; and the other terminal of the impulse-in relay R1660 is normally connected, by way of the contacts 1654 of the normally restored pulse cut-in relay R1650 and the 0.1 mf. coupling condenser 1635, to the control grid of the tube T4, the junction between the contacts 1654 and the coupling condenser 1635 being connected by way of the 0.006 mf. by-pass condenser 1637 to ground potential. The previously mentioned grid bias of negative 20.1 volts applied to the control grid of the tube T3 is sufficient to block the flow of current from the 130 volt source of plate current through the plate impedance 1634 under normal conditions. However, when a signal is received which causes the potential on the control grid of the tube T3 to be brought down to a negative value of about 16 volts, current starts to flow through the tube since the screen grid and the suppressor grid are connected to the plate of the tube T3 to secure a triode action of the desired characteristics, as previously noted. As the potential of the control grid of the tube T3 is rendered still less negative the current traversing the plate impedance 1634 is increased. In passing, it is noted that the pulse cut-in relay R1650 may be operated over the associated pulse cut-in conductor C1611, thereby to interrupt, at the contacts 1652, the previously traced circuit, including the plate impedance 1634, between the 130 volt source of plate current and the plate of the tube T3; and to complete, at the contacts 1651, an obvious substituted circuit, including the winding of the impulse-in relay R1660, between the 130 volt source of plate current and the plate of the tube T3. Also, upon operating, the pulse cut-in relay R1650 interrupts, at the contacts 1654, the previously traced connection, including the winding of the impulse-in relay R1660, between the plate of the tube T3 and the coupling condenser 1635; and completes, at the contacts 1653, a substitute circuit, including the plate impedance 1634, between the plate of the tube T3 and the coupling condenser 1635.

When the pulse cut-in relay R1650 occupies its operated position and a signal is received, the potential of the control grid of the tube T3 is rendered less negative, as previously explained, whereby the plate current of the tube T3 traverses the winding of the impulse-in relay R1660; and when this plate current reaches a value of about 4.5 milliamperes the impulse-in relay R1660 is sufficiently energized to operate; about 9 milliamperes being preferable for maintaining operated the impulse-in relay R1660 during the reception of dial pulses. Upon operating, the impulse-in relay R1660 completes, at the contacts 1661, an obvious path for applying ground potential to the dial-in conductor C1610 extending to the associated repeater circuit. Since the inductance coil L3 and the associated tuning condenser 1631 comprise a resonant couple having the maximum response at 1000 cycles, but not sharply peaked, the double-peak inductance coil L2 associated with the left-hand plate and left-hand cathode of the tube T2 offers an opposing effect to afford definite frequency cut-off points above and below the desired 1000 cycle resonant point while there is a rather flat frequency response over the selected band. This band is about 120 cycles wide in order to provide for the reception of 60 cycle modulated 1000 cycle signal impulses. By arranging that the response curves of the inductance coils L3 and L2 intermingle, the inductance coil L2 peaks at 900 cycles and at 1100 cycles but still builds up an appreciable voltage at 1000 cycles. The voltage built up across the double-peak inductance coil L2 at the 1000 cycle signal frequency and over the upper portion of the signal-strength range is sufficient to reduce considerably the positive grid-swing tendency of the control grid of the tube T3, thereby tending to secure a uniform response over a wide range of input voltage. The weak signals, however, are not handicapped by the opposing effect of the inductance coil L2 as the adverse bias is not then overcome.

However, in order positively to prevent damage to the various tubes employed in the tone unit 1600, the control grid of the tube T3 is arranged to cause rectification when strong 1000 cycle signals are received. More particularly, when strong 1000 cycle signals are received, the current traversing the right-hand portion of the tube T2 becomes sufficiently large to cause the potential drop across the resistor R4 to become sufficiently large so that the control grid of the tube T3 is rendered positive with respect to the associated cathode thereof, whereby rectification at the control grid of the tube T3 takes place. This control grid rectification in the tube T3 causes a potential drop across the resistors R4, R3 and R2 that is proportional to the strength of the incoming 1000 cycle signal. The voltage drop across the resistor R2 adds to the voltage drop across the resistor R1, thereby increasing the negative bias applied to the control grid of the tube T1. This increased negative bias applied to the control grid of the tube T1 on strong 1000 cycle signals reduces the output thereof and the consequent response thereof to the strong 1000 cycle signals, whereby the current through the right-hand section of the tube T2 is proportionally reduced, rendering less positive the bias applied to the control grid of the tube T3. Thus, this arrangement prevents overloading of the tubes T1, T2 and T3 in response to the reception of strong 1000 cycle signals.

The cathode and the suppressor grid of the tube T4 are connected directly to ground potential while the control grid of the tube T4 is provided with a normal negative biasing potential of 20.1 volts through a 0.1 megohm resistor 1636 connected thereto and to the conductor C1676 having the negative potential mentioned thereon. More particularly, the control grid of the tube T4 is connected to the junction between the resistor 1636 and the coupling condenser 1635. The plate of the tube T4 is connected directly by way of the 1000 ohm plate impedance 1638 to the 130 volt source of plate supply; and the screen grid of the tube T4 is connected directly to the 130 volt plate supply. At this biasing potential substantial plate current flows through the plate circuit of the tube T4 and the plate impedance 1639 from the 130 volt source of plate current; the tube T4 being connected to provide the usual form of pentode operation. The coupling condenser 1635 serves to couple the plate of the tube T3 to the control grid of the tube T4 in order to transmit the 60 cycle signal impulse to the tube T4. After amplification by the tube T4 the signal impulses pass to the 600 ohm winding of the signal-in relay R1670 by way of a 0.3 mf. coupling condenser 1638. The capacity of the coupling condenser 1638 and the inductance of the winding of the signal-in relay R1670 are so chosen that this circuit containing them constitutes a series-resonant circuit at 60 cycles, whereby this couple responds vigorously to 60 cycle current but does not respond when the 1000 cycle dial impulses, following each other at about ten to fourteen impulses per second, are received. When the series-resonant circuit, including the coupling condenser 1638 and the winding of the signal-in relay R1670, responds vigorously to the 60 cycle current mentioned, the signal-in relay R1670 operates in order to complete, at the contacts 1671, an obvious path for applying ground potential to the signal-in conductor C1609 extending to the associated repeater circuit. The by-pass condenser 1637 is arranged to by-pass to ground high frequency currents in the plate circuit of the tube T3 in order to prevent these frequency currents from being impressed upon the control grid of the tube T4.

Considering now the operation of the tone unit 1600 in conjunction with the associated repeater circuit, when the tone unit 1600 is in its normal position the modulation cutoff relay R1620 is normally restored and the receiving switch relay R1640 is normally operated, the receiving switch relay R1640 being operated in a circuit including the grounded receiving switch conductor C1607 extending to the associated repeater circuit and the contacts 1616 of the normally restored key K1. Also, the pulse cut-in relay R1650 is in its normally restored condition whereby the impulse-in relay R1660 is disconnected from and the plate impedance 1634 is connected into the plate circuit of the tube T3. This is the condition of the tone unit 1600 when it receives a 60 cycle modulated 1000 cycle seizing pulse from the associated repeater circuit when the associated toll line is taken for use in the distant exchange. This pulse comes into the tone unit 1600 through the receiving — and receiving +conductors C1605 and C1606 and passes through the receiving transformer TR1 to the grid-cathode circuit of the two-way amplifier tube T1. The signal is amplified by the tube T1 and passes through the coupling condenser 1627 through the primary winding of the sending and coupling transformer TR2. From the secondary winding of the sending and coupling transformer TR2 the signal passes through the contacts 1642 and 1644 of the operated receiving switch relay R1640 and is impressed between the leads C1625 and C1626. This signal then passes through the inductance coils L3 and L2 and through the differential detector tube T2 to the grid-cathode circuit of the impulse amplifier tube T3. The signal is amplified by the impulse amplifier tube T3 and passes by way of the coupling condenser 1635 to the grid-cathode circuit of the signal amplifier tube T4. The signal is amplified by the signal amplifier tube T4 and passes through the coupling condenser 1638 and the winding of the signal-in relay R1670, causing the latter relay to respond to the flow of alternating current therethrough. The signal-in relay R1670 responds since the winding thereof, together with the coupling condenser 1638, constitutes a couple resonant at the 60 cycles of the modulating signal, as previously noted. Upon responding, the signal-in relay R1670 operates to complete, at the contacts 1671, the previously mentioned path for applying ground potential to the signal-in conductor C1609 extending to the associated repeater circuit; which ground potential is maintained upon the signal-in conductor C1609 as long as the signal-in relay R1670 remains operated, which condition prevails for the duration of the reception of the 60 cycle modulated signal. At the conclusion of the 60 cycle modulated seizing pulse the signal-in relay R1670 restores in order to interrupt, at the contacts 1671, the application of ground potential to the signal-in conductor C1609 extending to the associated repeater circuit.

When the associated repeater circuit responds to the seizing pulse it applies ground potential to the pulse cut-in conductor C1611, whereby the pulse cut-in relay R1650 in the tone unit 1600 is operated. Upon operating, the pulse cut-in relay R1650 substitutes the impulse-in relay R1660 for the plate impedance 1634 in the plate circuit of the impulse amplifier tube T3, as previously explained. Consequently, when the dial pulses of unmodulated 1000 cycle current are transmitted from the associated repeater circuit to the tone unit 1600, these pulses pass through the circuit in the tone unit 1600, in the manner previously explained, whereby the current in the plate circuit of the impulse amplifier tube T3 effects operation of the impulse-in relay R1660. More particularly, the impulse-in relay R1660 is operated momentarily upon the receipt of each of these dial pulses and restores between the reception of adjacent dial pulses. Each time the impulse-in relay R1660 operates and then restores it completes and then interrupts, at the contacts 1661, an obvious path for applying ground potential to the dial-in conductor C1610 extending to the associated repeater circuit. The dial pulses in the plate circuit of the tube T3 are received at about ten to fourteen per second and pass through the plate impedance 1634, the contacts 1653 and the coupling condenser 1635 into the control grid-cathode circuit of the signal amplifier tube T4. These dial pulses are amplified by the signal amplifier tube T4 and pass into the 60 cycle resonant circuit including the coupling condenser 1638 and the winding of the signal-in relay R1670. However, the resonant circuit mentioned does not respond appreciably to the amplified dial pulses and, accordingly, the signal-in relay R1670 does not operate.

After the train of dial pulses has been received by the tone unit 1600 the associated repeater circuit interrupts the application of ground potential upon the pulse cut-in conductor C1611 in order to cause the pulse cut-in relay R1650 to restore shortly thereafter, it being of the slow-to-release type. Upon restoring, the pulse cut-in relay R1650 again removes the impulse-in relay R1660 from and replaces the plate impedance 1634 in the plate circuit of the impulse amplifier tube T3, thereby positively preventing further response by the impulse-in relay R1660 while permitting the signal-in relay R1670 to respond to any further received current at 1000 cycle carrier frequency which is modulated at the predetermined 60 cycle rate, as previously explained.

When the tone circuit 1600 is to be used to transmit a seizing pulse by way of the associated repeater circuit over the associated toll line, the receiving switch relay R1640 is restored; the modulation cutoff relay R1620 being normally restored, as previously noted. Upon restoring, the receiving switch relay R1640 transfers the control grid of the two-way amplifier tube T1 from the secondary winding of the receiving transformer TR1 to the 1000 cycle control conductor C1613, and transfers the suppressor or modulation grid of the two-way amplifier tube T1 from ground potential to the 60 cycle control conductor C1612. More particularly, upon restoring, the receiving switch relay R1640 interrupts, at the contacts 1641', the previously traced connection between the control grid of the two-way amplifier tube T1 and the secondary winding of the receiving transformer TR1; and completes, at the contacts 1649 and 1647, the previously mentioned connection between the control grid of the two-way amplifier tube T1 and the 1000 cycle control conductor C1613. Also, the receiving switch relay R1640 interrupts, at the contacts 1646, the previously traced path for applying ground potential to the suppressor or modulation grid of the two-way amplifier tube T1; and completes, at the contacts 1645, the previously mentioned connection, including the contacts 1621, for connecting the suppressor or modulation grid of the two-way amplifier tube T1 to the 60 cycle control conductor C1612. Also, the receiving switch relay R1640 interrupts, at the contacts 1642 and 1644, the previously traced connection between the secondary winding of the sending and coupling transformer TR2 and the leads C1625 and C1626; and completes, at the contacts 1641 and 1643, an alternative connection between the secondary winding of the sending and coupling transformer TR2 and the sending − and sending +conductors C1601 and C1602 extending to the associated repeater circuit. At this point, it is noted that a 2000 ohm adjustable resistor 1672 is connected between the sending − and the sending +conductors C1601 and C1602 extending to the associated repeater circuit in order to control the output level of the signal from the tone unit 1600. At this time a 1000 cycle variation is produced in the plate current of the two-way amplifier tube T1 and passes through the plate impedance 1628. At the same time the suppressor or modulation grid of the two-way amplifier tube T1 connected to the 60 cycle control conductor C1612 causes, on each negative half cycle of the potential on the control conductor C1612, the current flow in the plate circuit of the two-way amplifier tube T1 to cease altogether; while on each positive half cycle of the potential on the control conductor C1612, the plate current in the two-way amplifier tube T1 is permitted to flow unimpeded. In this manner 60 uniformly separated pulses of 1000 cycle current are caused to flow through the plate circuit of the two-way amplifier tube T1 through the plate impedance 1628; which pulses are permitted to pass through the coupling condenser 1627 to the primary winding of the sending and coupling transformer TR2. Since the secondary winding of the sending and coupling transformer TR2 is connected, by way of the above traced path, to the sending − and sending +conductors C1601 and C1602 extending to the associated repeater circuit, the 60 cycle modulated 1000 cycle current is transmitted over the sending − and sending +conductors C1601 and C1602 to the associated repeater circuit and thence over the associated toll line. At the conclusion of the transmission of the seizing pulse, the receiving switch relay R1640 is reoperated by the associated repeater circuit in order to return the tone unit 1600 to the normally existing receiving condition previously explained.

In order to prepare for the transmission of an unmodulated 1000 cycle signal from the tone unit 1600 to the associated repeater circuit, battery potential is applied in the associated repeater circuit to the modulation cutoff conductor C1608, thereby to effect operation of the modulation cutoff relay R1620 in the tone unit 1600. Upon operating, the modulation cutoff relay R1620 interrupts, at the contacts 1621, a further point in the previously traced path for connecting the suppressor grid of the two-way amplifier tube T1 to the 60 cycle control conductor C1612; and prepares, at the contacts 1622, a path traced hereinafter for connecting directly to ground potential the suppressor grid of the two-way amplifier tube T1. Subsequently, when the associated repeater circuit is in readiness to receive the unmodulated 1000 cycle signal from the tone unit 1600, ground potential is removed from the receiving switch conductor C1607, thereby to cause the receiving switch relay R1640 in the tone unit 1600 to restore. Upon restoring, the receiving switch relay R1640 completes, at the contacts 1647 and 1649, the previously traced path for connecting the control grid of the two-way amplifier tube T1 to the 1000 cycle control conductor C1613; and completes, at the contacts 1645, the previously mentioned path, including the contacts 1622, for connecting to ground potential the suppressor grid of the two-way amplifier tube T1. Also, upon restoring, the receiving switch relay R1640, recompletes, at the contacts 1641 and 1643, the previously traced connection between the secondary winding of the sending and coupling transformer TR2 and the sending − and sending +conductors C1601 and C1602 extending to the associated repeater circuit. At this time unmodulated 1000 cycle current flowing in the plate circuit of the two-way amplifier tube T1 passes through the coupling condenser 1627 and the primary winding of the sending and coupling transformer TR2; whereby the secondary winding of the sending and coupling transformer TR2 projects an unmodulated 1000 cycle signal over the sending − and sending +conductors C1601 and C1602 to the associated repeater circuit. It will be understood that the unmodulated 1000 cycle signal transmitted from the tone unit 1600 to the associated repeater circuit is connected and disconnected in the associated repeater circuit to the toll line associated with the repeater circuit mentioned at a rate of about ten to fourteen times per second, in order to form dial pulses to be transmitted over the toll line mentioned to the distant exchange. After the transmission of one or more series of unmodulated 1000 cycle dial pulses from the associated repeater circuit over the associated toll line to the distant exchange, the associated repeater circuit subsequently effects restoration of the modulation cutoff relay R1620 and operation of the receiving switch relay R1640 in the tone unit 1600, whereby the tone unit is again returned to the normally existing receiving condition.

Thereafter when the switching apparatus associated with the repeater circuit in the distant exchange extends the connection, an end of dialing signal is returned over the toll line to the repeater circuit associated with the tone unit 1600, which end of dialing signal is in the form of a 60 cycle modulated 1000 cycle signal, which signal received by the tone unit 1600 effects operation of the signal-in relay R1670, all in the manner previously explained. Also, it is noted that this 60 cycle modulated 1000 cycle signal is first received by the receiving transformer TR1 and amplified by the two-way amplifier tube T1 and then applied by the sending and coupling transformer TR2 between the leads C1625 and C1626. Since the primary winding of the monitoring transformer TR3 is connected by way of the resistors 1624 and 1623 across the leads C1625 and C1626, this audible signal passing through the primary winding of the monitoring transformer TR3 causes a corresponding audible signal to be transmitted from the secondary winding of the monitoring transformer TR3 over the monitoring — and monitoring +conductors C1603 and C1604 extending to the associated repeater circuit. Accordingly, in the event the monitoring — and monitoring +conductors C1603 and C1604 extending to the associated repeater circuit are at this time connected to an associated operator position, the operator thereat may hear through her headset the audible signal mentioned. This arrangement gives the operator, at the operator position associated with the repeater circuit that is in turn associated with the tone unit 1600, monitoring supervision of the connection as it is extended over the associated toll line, without interfering in any way with the subsequent reception of supervisory signals over the toll line associated with the repeater circuit with which the tone unit 1600 is associated. For example, following the reception of the end of dialing signal above mentioned, the repeater circuit associated with the toll line in the distant exchange may transmit a supervisory signal indicating a busy condition in the distant exchange, which supervisory or busy signal is in the form of a 60 cycle modulated 1000 cycle signal. This busy signal, returned over the toll line associated with the repeater circuit with which the tone unit 1600 is associated, is received by the tone unit in order to cause operation of the signal-in relay R1670 therein, in the manner previously explained, as well as to cause this audible signal to be returned via the monitoring transformer TR3 to the operator position associated with the repeater circuit with which the tone unit 1600 is associated; all without interference.

In the event it is desirable during repair or test of the tone unit 1600 to open the cathode heaters circuit, the key K2 may be restored for this purpose. When the key K2 is thus restored there is interrupted, at the contacts 118 thereof, a further point in the previously traced circuit for illuminating the cathode heaters alarm lamp L1657, thereby to prevent illumination thereof incident to the restoration of the alarm relay R1655. Subsequently, the key K2 is returned to its normal operated position in order to close the cathode heaters circuit and to bring about reoperation of the alarm relay R1655.

In the event that it is desired to test the transmission level of the tone unit 1600, the key K1 may be actuated and a test plug associated with the test equipment may be inserted into the jack J1 connected across the sending — and sending +conductors C1601 and C1602. When the key K1 is thus operated there is interrupted, at the contacts 1616 thereof, the previously traced circuit for maintaining operated the receiving switch relay R1640 in order to cause the latter relay to restore; and there is completed, at the contacts 1617 thereof, a series circuit for operating the modulation cutoff relay R1620 and for illuminating the cathode heaters alarm lamp L1657. When the modulation cutoff relay R1620 is thus operated and the receiving switch relay R1640 is thus restored, the tone unit 1600 is placed in its transmitting position, whereby an unmodulated 1000 cycle signal is transmitted over the sending — and sending +conductors C1601 and C1602; which signal effects operation of the test equipment associated with the jack J1. At this time the resistor 1672 should be so adjusted that the output level of the unmodulated 1000 cycle signal received by the test equipment associated with the jack J1 is —10 db from 0.006 watt. At this time the test equipment may be removed from the associated jack J1 and the key K1 returned to its normal position, whereby the modulation cutoff relay R1620 restores and the receiving switch relay R1640 reoperates. At this time the tone unit 1600 is returned to its normal existing receiving condition.

Finally, it is noted that the connection between the control grid of the two-way amplifier tube T1 and the 1000 cycle control conductor C1613 includes the contacts 1647 and 1649 of the receiving switch relay R1640 in series-circuit relationship; which connection when interrupted, at the contacts 1647 and 1649, causes one of the contact springs of the contacts 1647 to be grounded at the contacts 1648. This arrangement reduces the intercontact capacity which might otherwise be sufficient to cause a slight local 1000 cycle voltage to be impressed upon the control grid of the two-way amplifier tube T1, even with the receiving switch relay R1640 in its operated position. This tendency is, of course, positively prevented by the grounded contacts 1648 disposed intermediate the contacts 1647 and 1649 of the receiving switch relay R1640.

In view of the foregoing, it is apparent that there has been provided an improved tone unit capable of receiving unmodulated 1000 cycle dial pulses, as well as 60 cycle modulated 1000 cycle supervisory signals; and capable of transmitting an unmodulated 1000 cycle signal for dialing purposes, as well as 60 cycle modulated 1000 cycle supervisory signals. Also, the tone unit comprises an improved arrangement for preventing damage as a consequence of overloading of the various tubes incorporated therein in response to the reception of strong 1000 cycle signals; as well as an improved arrangement for permitting monitoring over a toll line associated with a repeater circuit with which the tone unit is associated while the tone unit is conditioned to receive supervisory signals from the associated repeater circuit over the associated toll line, without interference.

*A call from Sao Paulo to Jundiahy*

Assuming that a connection is to be extended from the subscriber substation T1 in the automatic office 380 (office No. 8) in Sao Paulo to a subscriber substation in the manual exchange 300 in Jundiahy, the subscriber at the calling subscriber substation T1 initiates the call, whereby the subscriber line 386 extending thereto is operatively associated with the switch train 385 in the automatic office 380. The subscriber at the calling subscriber substation T1 then dials the single digit 0 in order to cause the switch train 385 to select a trunk extending to an idle trunk circuit, such, for example, as the trunk 387 extending to the trunk circuit 388. When the switch train 385 seizes the trunk 387, the trunk circuit 388 operates in order to create a calling condition upon the trunk line 306 extending between the automatic office 380 in Sao Paulo and the automatic exchange 30 (the toll center) in Sao Paulo, whereby the associated CLR trunk circuit 305 is controlled to cause the call to be extended to an idle operator position at the Strowger dial toll board in the automatic exchange 30. Assuming that the first operator position circuit 316 at the Strowger dial toll board in the automatic exchange 30 is idle at this time and is connected by way of the associated cable 314 to the associated finder-selector link 315, the CLR trunk circuit 305 may cause operation of the rotary finder of the finder-selector link 315 to find the trunk 304 extending to the CLR trunk circuit 305; thereby to complete a connection between the calling subscriber substation T1 in the automatic office 380 and the first operator position circuit 316 at the Strowger dial toll board in the automatic exchange 30.

Upon learning that the subscriber at the calling subscriber substation T1 in the automatic office 380 in Sao Paulo desires to converse with a subscriber in the manual exchange 300 in Jundiahy, the operator at the first position circuit 316 at the Strowger dial toll board in the automatic exchange 30 in Sao Paulo dials three appropriate digits. The selector of the finder-selector link 315 responds to the first digit, selecting first the corresponding group of trunks and then an idle trunk therein, such, for example, as the trunk 336 extending to the outgoing toll selector 335. The outgoing toll selector 335 responds to the second and third digits, respectively selecting the corresponding level and rotary position of the group of trunks, and then selecting an idle trunk therein, such, for example, as the trunk 337 extending to the toll trunk circuit 310 terminating the toll line 302 extending between the automatic exchange 30 and the manual exchange 300. Thereafter the toll trunk circuit 310 is controlled in order to project ringing current over the toll line 302, whereby the operator at the manual toll board 301 in the manual exchange 300 answers the call and converses with the operator at the first position circuit 316 at the Strowger dial toll board in the automatic exchange 30 concerning the completion of the connection to the called subscriber substation in the manual exchange 300. Thereafter, the operator at the first position circuit 316 at the Strowger dial toll board in the automatic exchange 30 and the operator at the manual toll board 301 in the manual exchange 300 disconnect from the established connection.

The subscriber at the calling subscriber substation T1 in the automatic office 380 has switchhook supervision and may signal the operator at the first position circuit 316 at the Strowger dial toll board in the automatic exchange 30, in order to cause her to re-enter the connection. Similarly, the operator at the manual toll board 301 in the manual exchange 300 has ring-down supervision and may signal the operator at the first position circuit 316 at the Strowger dial toll board in the automatic exchange 30 to cause her to re-enter the connection.

At the conclusion of the established connection, when the subscriber at the calling subscriber substation T1 in the automatic office 380 replaces the receiver of the telephone instrument thereat upon its associated switchhook, release supervision is given to the operator at the first position circuit 316 at the Strowger dial toll board in the automatic exchange 30, whereby the operator mentioned effects the release of the CLR trunk circuit 305 in the automatic exchange 30 in order to bring about the release of the trunk circuit 388 and the switch train 385 in the automatic office 380. The operator mentioned then causes ringing current to be projected over the toll line 302 in order to give ring-off supervision to the operator at the manual toll board 301 in the manual exchange 300, whereby the last-mentioned operator takes down the connection to the called subscriber substation in the manual exchange 300. Further, the operator at the first position circuit 316 at the Strowger dial toll board in the automatic exchange 30 effects the release of the finder-selector link 315 and the consequent release of the outgoing toll selector 335, whereby the toll line 302 extending between the automatic exchange 30 and the manual exchange 300 is marked as idle both to the automatic switching apparatus in the automatic exchange 30 and to the manual toll board 301 in the manual exchange 300.

*A call from Jundiahy to Sao Paulo*

Assuming that a connection is to be extended from a subscriber substation in the manual exchange 300 in Jundiahy to the subscriber substation T1 in the automatic office 380 (office No. 8) in Sao Paulo, the subscriber at the calling subscriber substation mentioned initiates the call, whereby the operator at the manual toll board 301 in the manual exchange 300 answers the call and is advised with reference to the extension thereof.

Upon learning that the subscriber at the calling subscriber substation in the manual exchange 300 in Jundiahy desires to converse with the subscriber at the called subscriber substation T1 in the automatic office 380 in Sao Paulo, the operator at the manual toll board 301 selects an idle toll line, such, for example, as the toll line 302, and causes ringing current to be projected thereover. The projection of ringing current over the toll line 302, extending between the manual exchange 300 in Jundiahy and the automatic exchange 30 (at the toll center) in Sao Paulo causes the associated toll trunk circuit 310 to be controlled in order to cause the call to be extended to an idle operator position at the Strowger dial toll board in the automatic exchange 30 Assuming that the first operator position circuit 316 at the Strowger dial toll board in the automatic exchange 30 is idle at this time and is connected by way of the associated cable 314 to the associated finder-selector link 315, the toll trunk circuit 310 may cause operation of the rotary finder of the finder-selector link 315 to find the trunk 307 extending to the toll trunk circuit 310, thereby to complete a connection between the manual toll board 301 in the manual exchange 300 and the first operator position circuit 316 at the Strowger dial toll board in the automatic exchange 30.

Upon learning that the connection is to be extended to the subscriber substation T1 in the automatic office 380 in Sao Paulo, the operator, at the first position circuit 316 at the Strowger dial toll board in the automatic exchange 30 in Sao Paulo, dials two appropriate digits for routing purposes, followed by four appropriate digits identifying the line terminal of the subscriber line 386 extending to the called subscriber substation T1 in the automatic office 380. The selector of the finder-selector link 315 responds to the first routing digit selecting first the corresponding group of trunks and then an idle trunk therein, such, for example, as the trunk 341 extending to the outgoing toll selector 340. The outgoing toll selector 340 responds to the second routing digit selecting first the corresponding group of trunk lines and then an idle trunk line therein, such, for example, as the trunk line 342 extending between the automatic exchange 30 and the automatic office 380 and associated with the switch train 385 in the automatic office 380. The switch train 385 in the automatic office 380 then responds to the four digits identifying the line terminal of the subscriber line 386 extending to the called subscriber substation T1 in the automatic office 380, whereby the switch train 385 selects the subscriber line 386 and tests the idle or busy condition thereof. Assuming that the subscriber substation T1 in the automatic office 380 is idle at this time, the toll transmission selector in the switch train 385 in the automatic office 380 effects the reversal of polarity over the trunk line 342 extending between the automatic exchange 30 and the automatic office 380, whereby the outgoing toll selector 340 is controlled to project momentarily ringing current over the trunk line 342 in order to cause operation of the switch train 385, whereby ringing current is projected over the subscriber line 386 to the called subscriber substation T1 in the automatic office 380. Also, at this time call supervision is rendered to the first operator position circuit 316 at the Strowger dial toll board in the automatic exchange 30; and, when the subscriber at the called subscriber substation T1 in the automatic office 380 answers the call, answer supervision is rendered to the first operator position circuit 316 mentioned and a connection is established between the first operator position 316 at the Strowger dial toll board in the automatic exchange 30 and the called subscriber substation T1 in the automatic office 380. Thereafter, the operator at the first position circuit 316 at the Strowger dial toll board in the automatic exchange 30 and the operator at the manual toll board 301 in the manual exchange 300 disconnect from the established connection, whereby a connection is completed between the calling subscriber substation in the manual exchange 300 and the called subscriber substation T1 in the automatic office 380.

The subscriber at the called subscriber substation T1 in the automatic office 380 has switchhook supervision and may signal the operator at the first position circuit 316 at the Strowger dial toll board in the automatic exchange 30, in order to cause her to re-enter the connection. Similarly, the operator at the manual toll board 301 in the manual exchange 300 has ring-down supervision and may signal the operator at the first position circuit 316 at the Strowger dial toll board in the automatic exchange 30 to cause her to re-enter the connection.

At the conclusion of the established connection, when the subscriber at the called subscriber substation T1 in the automatic office 380 replaces the receiver of the telephone instrument thereat upon its associated switchhook, release supervision is given to the operator at the first position circuit 316 at the Strowger dial toll board in the automatic exchange 30, whereby the operator mentioned effects the release of the selector of the finder-selector link 315 and the consequent release of the outgoing toll selector 340 in the automatic exchange 30, in order to bring about the release of the switch train 385 in the automatic office 380. Further, the operator at the first position circuit 316 at the Strowger dial toll board in the automatic exchange 30 effects the release of the toll trunk circuit 310; and the operator at the manual toll board 301 in the manual exchange 300 takes down the connection to the calling subscriber substation in the manual exchange 300. At this time the toll line 302 extending between the manual exchange 300 and the automatic exchange 30 is marked as idle both to the manual toll board 301 in the manual exchange 300 and to the automatic switching apparatus in the automatic exchange 30; and the trunk line 342 extending between the automatic exchange 30 and the automatic office 380 is marked as idle to the automatic switching apparatus in the automatic exchange 30 having access thereto.

*A call from Rio de Janeiro to Campos*

Assuming that a connection is to be extended from the subscriber substation T4 in the automatic exchange 50 in Rio de Janeiro to a subscriber substation in the manual exchange 60 in Campos, the subscriber at the calling subscriber substation T4 initiates the call, whereby the subscriber line 1301 extending thereto is operatively associated with the automatic switch train 1300 in the automatic exchange 50 and a local register sender, such, for example, as the local register sender 1392, is operatively connected to the automatic switch train 1300. The subscriber at the calling subscriber substation T4 then dials the digit or digits designating the manual dial toll board in the automatic exchange 50, whereby the digit or digits mentioned are registered in the local register sender 1392 in order to control operation of the automatic switch train 1300, whereby the call is routed over an idle one of the trunks, such, for example, as the trunk 1362 extending to the CLR trunk circuit 1302 terminating in the jack J1309 associated with the manual dial toll board mentioned. At this time a call signal is transmitted to the manual dial toll board mentioned, whereby an operator at one of the outward position circuits, such, for example, as the first outward position circuit 1340, answers the call by inserting the answer plug of an idle one of the cord circuits thereat into the associated jack multiplied to the jack J1309. For explanatory purposes, it may be assumed that the jack J1309 is at the first outward operator position circuit 1340, whereby the first outward operator position circuit 1340 is operatively connected to the calling subscriber substation T4 and is advised with reference to the further extension of the connection.

Upon learning that the subscriber at the calling subscriber substation T4 in the automatic exchange 50 in Rio de Janeiro desires to converse with a subscriber in the manual exchange 60 in Campos, the operator at the first outward position circuit 1340 at the manual dial toll board in the automatic exchange 50 in Rio de Janeiro inserts the call plug of the cord circuit mentioned into the jack terminating an idle one of the toll lines extending between the automatic exchange 50 in Rio de Janeiro and the manual exchange 60 in Campos. For example, the call plug of the cord circuit mentioned may be inserted into the jack multiplied with the jack J1313 extending to the toll line circuit 1317 associated with the tol line 1361 extending between the automatic exchange 50 and the manual exchange 60. For explanatory purposes, it may be assumed that the call plug of the cord circuit mentioned is inserted into the jack J1313, whereupon the operator at the first outward position circuit 1340 operates her ring key, thereby to signal, via the jack J1313, the toll trunk circuit 1317 and the toll line 1361, the operator at the manual toll board 1320 in the manual exchange 60. The operator at the manual toll board 1320 in the manual exchange 60 then answers the call and converses with the operator at the first outward position circuit 1340 at the manual dial toll board in the automatic exchange 50 and is advised concerning the completion of the connection to the called subscriber substation in the manual exchange 60. Thereafter, the operator at the first outward position circuit 1340 at the manual dial toll board in the automatic exchange 50 and the operator at the manual toll borad 1320 in the manual exchange 60 disconnect from the established connection.

At the conclusion of the established connection, when the subscriber at the calling subscriber substation T4 in the automatic exchange 50 replaces the receiver of the telephone instrument thereat upon its associated switchhook, release supervision is given to the operator at the first outward position circuit 1340 at the manual dial toll board in the automatic exchange 50, whereby the operator thereat withdraws the answer plug of the cord circuit mentioned from the jack J1309, in order to bring about the release of the CLR trunk circuit 1302 and the automatic switch train 1300 in the automatic exchange 50. The operator mentioned then causes a ring-off signal to be transmitted over the toll line 1361 to the operator at the manual toll board 1320 in the manual exchange 60, whereby the last-mentioned operator takes down the connection to the called subscriber substation in the manual exchange 60. Further, the operator at the first outward position circuit 1340 at the manual dial toll board in the automatic exchange 50 withdraws the call plug of the cord circuit mentioned from the jack J1313, whereby the toll line 1361 extending between the automatic exchange 50 and the manual exchange 60 is marked as idle to the manual dial toll board in the automatic exchange 50 and to the manual toll board 1320 in the manual exchange 60.

*A call from Campos to Rio de Janeiro*

Assuming that a connection is to be extended from a subscriber susbtation in the manual exchange 60 in Campos to the subscriber substation T4 in the automatic exchange 50 in Rio de Janeiro, the subscriber at the calling subscriber substation mentioned initiates the call, whereby the operator at the manual toll board 1320 in the manual exchange 60 answers the call and is advised with reference to the extension thereof.

Upon learning that the subscriber at the calling subscriber substation in the manual exchange 60 in Campos desires to converse with the subscriber at the called subscriber substation T4 in the automatic exchange 50 in Rio de Janeiro, the operator at the manual toll board 1320 selects an idle toll line, such, for example, as the toll line 1361 and causes ringing current to be projected thereover. The projection of ringing current over the toll line 1361 extending between the manual exchange 60 in Campos and the automatic exchange 50 in Rio de Janeiro causes the associated toll trunk circuit 1317 to operate, in order to transmit to the manual dial toll board in the automatic exchange 50 a call signal. An operator at one of the inward position circuits, such, for example, as the first inward position circuit 1316, answers the call by inserting the answer plug of an idle one of the cord circuits thereat into the jack J1313 extending to the toll trunk circuit 1317. For example, the operator mentioned may utilize the cord circuit 1310, whereby the answer plug 1311 thereof is inserted into the jack J1313, whereby the first inward operator position circuit 1316 at the manual dial toll board in the automatic exchange 50 is operatively connected to the manual toll board 1320 in the manual exchange 60 and is advised with reference to the further extension of the connection.

Upon learning that the subscriber at the calling subscriber substation in the manual exchange 60 in Campos desires to converse with the subscriber at the called subscriber substation T4 in the automatic exchange 50 in Rio de Janeiro, the operator at the first inward position circuit 1316 at the manual dial toll board in the automatic exchange 50 in Rio de Janeiro inserts the call plug 1312 of the cord circuit 1310 into a jack extending to a toll trunk circuit associated with an idle trunk, such, for example, as the jack J1308 extending to the toll trunk circuit 1303 associated with the trunk 1363. When the trunk 1363 is thus seized the automatic switch train 1300 in the automatic exchange 50 is operatively associated therewith and a toll register sender, such, for example, as the toll register sender 1391, is operatively connected to the automatic switch train 1300. The operator at the first inward position circuit 1316 mentioned then operates her key sender, thereby to cause the digits designating the line terminal of the subscriber line 1301 extending to the called subscriber substation T4 in the automatic exchange 50 to be registered in the toll register sender 1391, in order to control operation of the automatic switch train 1300, whereby the called subscriber substation T4 is selected and the idle or busy condition thereof is tested. Assuming that the called subscriber substation T4 is idle this time, ringing current is projected over the subscriber line 1301 extending thereto; and when the subscriber thereat answers the call the first inward operator position circuit 1316 at the manual dial toll board in the automatic exchange 50 is rendered answer supervision. Thereafter, the operator at the first inward position circuit 1316 at the manual dial toll board in the automatic exchange 50 and the operator at the manual toll board 1320 in the manual exchange 60 disconnect from the established connection.

At the conclusion of the established connection, when the subscriber at the called subscriber substation T4 in the automatic exchange 50 replaces the receiver of the telephone instrument thereat upon its associated switchhook, release supervision is given to the operator at the first inward position circuit 1316 at the manual dial toll board in the automatic exchange 50, whereby the operator thereat withdraws the call plug 1312 and the answer plug 1311, respectively, from the jacks J1308 and J1313 respectively associated with the toll trunk circuit 1303 and the toll trunk circuit 1317. The toll trunk circuit 1303 is thus released, bringing about the release of the automatic switch train 1300 in the automatic exchange 50. Also, the operator at the manual toll board 1320 in the manual exchange 60 takes down the connection to the calling subscriber substation in the manual exchange 60. At this time the toll line 1361 extending between the manual exchange 60 and the automatic exchange 50 is marked as idle both to the manual toll board 1320 in the manual exchange 60 and to the manual dial toll board in the automatic exchange 50.

*A call from Sao Paulo to Rio de Janeiro*

Assuming that a call has been extended to the first operator position circuit 316 at the Strowger dial toll board in the automatic exchange 30 in Sao Paulo, that is to be extended to a subscriber substation, such, for example, as the subscriber substation T4 in the automatic exchange 50 in Rio de Janeiro, the call may have been routed to the first operator position circuit 316 via the finder of the finder-selector link 315; whereupon the operator mentioned dials the first two digits 4 and 6 assigned to the automatic exchange 50, and then a plurality of digits comprising the directory number of the called subscriber substation T4. The selector of the finder-selector link 315 responds to the first digit 4 to select the group of outgoing toll selectors, including the outgoing toll selector 345, and then operates automatically to select an idle outgoing tol seector in the group mentioned. Assuming that the selector of the finder-selector link 315 seizes the trunk 346 extending to the outgoing toll selector 345, the outgoing toll selector 345 responds to the second digit 6 to select the group of trunks, including the trunk 395, etc., extending to the group of repeater circuits 400, etc., and then operates automatically to select an idle trunk in the group mentioned. Assuming that the outgoing toll selector 345 selects the trunk 395 extending to the repeater circuit 400, the trunk 395 is marked as idle to the outgoing toll selector 345 by the application of battery potential upon the control conductor C398 thereof. The path mentioned extends from battery by way of the upper winding of the release relay R420 in the repeater circuit 400, the contacts 425, 633, 681, 461 and 453 to the control conductor C398 of the trunk 395. When the outgoing toll selector 345 seizes the trunk 395 ground potential therein is applied to the control conductor C398, thereby to complete a substantially identical path to that previously traced for energizing the upper winding of the release relay R420 in order to cause the latter relay to operate shortly thereafter. Upon operating, the release relay R420 interrupts, at the contacts 425, an obvious path for short-circuiting the lower winding thereof, whereby the upper and lower windings of the release relay R420 are energized in series circuit relation from the control conductor C398 of the trunk 395. Also, the release relay R420 completes, at the contacts 422, a loop circuit, including the contacts 481 and 483, between the upper and lower windings of the line relay R430 and the line conductors C396 and C397 of the trunk 395, thereby to cause the latter relay to operate. Further, the release relay R420 completes, at the contacts 426, an obvious circuit for operating the release pulse timer relay R435. Upon operating, the release pulse timer relay R435 sets its armature RA436 into vibration and closes the contacts 437, whereby the winding of the release pulse timer relay R440 is energized intermittently by the vibratory action of the armature RA436, causing the release pulse timer relay R440 to operate shortly thereafter, the latter relay being of the slow-to-operate type. At this point it is noted that the incoming release relay R460 normally occupies is operated position, an operating circuit therefor, including the contacts 476, 625 and 655, being normally completed.

Upon operating, the release pulset imer relay R440 completes, at the contacts 442, a holding circuit for energizing the winding thereof by way of the armature RA436 of the release pulse timer relay R435; and completes, at the contacts 441 and 445, a circuit, including the contacts 474, 684, 634 and 624, for operating the supervisory pulse relay R660. Also, the release pulse timer relay R440 completes, at the contacts 441, a multiple circuit, including the contacts 691, for operating the pad cutout relay R600. Upon operating, the pad cutout relay R600 interrupts, at the contacts 602, a termination circuit, including the windings 606, 608 and 697 of the pad 695, and the condenser 696, between the line conductors of the toll line 702; and completes, at the contacts 601 and 603, direct paths for short-circuiting the windings 605, 606 and 607, 608 respectively of the pad 695. Finally, the release pulse timer relay R440 completes, at the contacts 441, an obvious multiple circuit for illuminating the busy lamp L687 in order to indicate that the repeater circuit 400 is busy at this time.

Upon operating, the supervisory pulse relay R660 completes, at the contacts 663, an obvious circuit for operating the send relay R675; and completes, at the contacts 664, an obvious circuit for energizing the upper winding of the prepare relay R670 in order to cause the latter relay to operate. Also, the supervisory pulse relay R660 completes, at the contacts 664, a multiple circuit, including the contacts 427, for operating the series relay R410. Upon operating, the prepare relay R670 interrupts, at the contacts 673, the application of ground potential upon the receiving switch conductor C607 extending to the tone unit 601, thereby to bring about the restoration of the receiving switch relay in the tone unit 601, whereupon the tone unit 601 is placed in sending condition, in the manner previously explained. Also, the prepare relay R670 completes, at the contacts 674, an obvious circuit for energizing the lower winding of the sequence relay R680 in order to cause the latter relay to operate; and completes, at the contacts 674, a multiple circuit, including the contacts 661, for operating the control relay R505. Upon operating, the send relay R675 completes, at the contacts 678, a path, including the contacts 682, for applying ground potential to the modulation cutoff conductor C608 extending to the tone unit 601, thereby to insure that the modulation cutoff relay in the tone unit 601 is maintained in its restored position, whereby the tone unit 601 is rendered operative to send 60 cycle modulated 1000 cycle current over the sending −conductor C601 and the sending +conductor C602 extending therefrom. Also, the send relay R675 interrupts, at the contacts 677, a normally completed path between the sending —conductor C601 and the sending +conductor C602; and completes, at the contacts 676, a path, including the resistor 693, the condenser 692 and the contacts 601 and 603, between the sending —conductor C601 and the sending +conductor C602 and the line conductors of the toll line 702, whereby 60 cycle modulated 1000 cycle current is transmitted from the tone unit 601 individually associated with the repeater circuit 400 over the line conductors of the toll line 702 extending from the automatic exchange 30 to the automatic exchange 50. This 60 cycle modulated 1000 cycle current transmitted over the line conductors of the toll line 702 is repeated by the voice current repeaters 703, etc. to the repeater circuit 700 in the automatic exchange 50, in order to effect seizure of the repeater circuit 700, in a manner more fully explained hereinafter. Also, upon operating, the sequence relay R680 completes, at the contacts 683, a holding circuit, including the contacts 441, for energizing the upper winding thereof; and completes, at the contacts 686, a holding circuit, including the contacts 412, 429 and 444, for energizing the lower winding of the prepare relay R670. Also, the supervisory pulse relay R660 completes, at the contacts 662, a holding circuit, including the contacts 624, 634 and 441, for energizing the winding thereof.

Upon operating, the control relay R505 completes, at the contacts 508, a circuit for energizing the winding of the inter-pulse timer relay R630, thereby to cause the latter relay to operate shortly thereafter, it being of the slow-to-operate type. Further, the control relay R505 completes, at the contacts 506, a path, including the contacts 491 and 485, for connecting battery by way of the upper winding of the tandem test relay R470 to the control conductor C399 of the trunk 395, thereby to permit the tandem test relay R470 to operate in the special event that the preceding circuit includes a repeater circuit. In the present example, the circuit preceding the trunk 395 does not include a repeater circuit since the connection is extended from the first operator position circuit 316 at the Strowger dial toll board in the automatic exchange 30, whereby the tandem test relay R470 is not operated. Upon operating, the inter-pulse timer relay R630 interrupts, at the contacts 634, the previously traced holding circuit for maintaining operated the supervisory pulse relay R660; the previously traced original operating circuit for the supervisory relay R660 being interrupted, at the contacts 684, incident to operation of the sequence relay R680. Accordingly, the supervisory pulse relay R660 restores shortly thereafter, it being of the slow-to-release type. Also, the inter-pulse timer relay R630 completes, at the contacts 635, a circuit, including the contacts 685, 445, 474 and 441, for energizing in series the upper and lower windings of the answer supervisory relay R490; whereby the latter relay operates, it being of the differential type, as explained more fully hereinafter. Upon operating, the answer supervisory relay R490 completes, at the contacts 495, a holding circuit, for energizing in series the upper and lower windings thereof, that includes the contacts 474 and 441. Further, the answer supervisory relay R490 interrupts, at the contacts 496, the normally completed path for applying battery potential by way of the resistor 403 to the associated terminal of the lower winding thereof; and interrupts, at the contacts 491, the previously traced path for connecting the upper winding of the tandem test relay R480 to the control conductor C399 of the trunk 395. Further, the answer supervisory relay R490 completes, at the contacts 492, a path, including the contacts 488 and 441, for applying ground potential by way of the upper winding of the line supervisory relay R480 to the control conductor C399 of the trunk 395; which is without effect at this time since the above-described operation takes place following the transmission of the second digit 6 and preceding the transmission of the remainder of the digits constituting the directory number of the called subscriber substation T4 in the automatic exchange 50, whereby no potential appears upon the control conductors C399 of the trunk 395.

When the supervisory pulse relay R660 restores it interrupts, at the contacts 664, the previously traced circuit for maintaining operated the series relay R410, thereby to cause the latter relay to restore shortly thereafter, it being of the slow-to-release type. Also, the supervisory pulse relay R660 interrupts, at the contacts 661, the previously traced circuit for maintaining operated the control relay R505; and interrupts, at the contacts 663, the previously traced circuit for maintaining operated the send relay R675. Further, the supervisory pulse relay R660 interrupts, at the contacts 664, the previously mentioned multiple circuit for energizing the upper winding of the prepare relay R670. Upon restoring, the send relay R675 interrupts, at the contacts 676, the previously traced connection between the line conductors of the toll line 702 and the sending —conductor C601 and the sending +conductor C602 extending to the tone unit 601; and completes, at the contacts 677, the previously mentioned normally completed connection between the sending —conductor C601 and the sending +conductor C602; thereby to terminate the transmission, over the toll line 702 from the tone unit 601, of the seizing pulse of 60 cycle modulated 1000 cycle current. Further, the send relay R675 interrupts, at the contacts 678, the previously traced path for applying ground potential to the modulation cutoff conductor C608; whereby there is completed a path, including the contacts 489, the resistor 463, the contacts 424 and 682, for applying battery potential to the modulation cutoff conductor C608. This application of battery potential to the modulation cutoff conductor C608 extending to the tone unit 601 effects operation of the modulation cutoff relay therein, whereby the tone unit 601 is conditioned at this time to transmit unmodulated 1000 cycle current upon the next seizure thereof. Upon restoring, the control relay R505 interrupts, at the contacts 508, the previously mentioned circuit for maintaining operated the interpulse timer relay R630. When the series relay R410 restores it interrupts, at the contacts 412, the previously traced holding circuit for energizing the lower winding of the prepare relay R670, thereby to cause the latter relay to restore at this time. Upon restoring, the prepare relay R670 recompletes, at the contacts 673, the previously mentioned path for applying ground potential to the receiving switch conductor C607 extending to the tone unit 601, thereby to effect operation of the receiving switch relay therein, whereby the tone unit 601 is placed in receiving condition. Upon restoring, the inter-pulse timer relay R630 reprepares, at the contacts 634, a point in the previously traced circuit for operating the supervisory pulse relay R660, for a purpose more fully explained hereinafter.

Recapitulating, at this time the outgoing toll selector 345 has operated to select the trunk 395 extending to the repeater circuit 400, whereby the repeater circuit 400 operated in conjunction with the tone unit 601 to transmit a short splash of 60 cycle modulated 1000 cycle current, constituting a seizing signal, over the toll line 702; thereby to condition the repeater circuit 700 in the automatic exchange 50 to be responsive to digits dialed at the first operator position circuit 316 and repeated by the repeater circuit 400 over the toll line 702.

Specifically, the seizing signal transmitted over the toll line 702 is conducted over the windings 714, 715 and 716, 717 of the pad 795, and the receiving −conductor C705 and the receiving +conductor C706 to the tone unit 701 associated with the repeater circuit 700, in order to cause operation of the signal-in relay in the tone unit 701, whereby ground potential is applied for a short time duration to the signal-in conductor C709 extending therefrom. This application of ground potential to the signal-in conductor C709 completes an obvious circuit for energizing the signal-in relay R870 in the repeater circuit 700, whereby the latter relay operates shortly thereafter, it being of the slow-to-operate type. Upon operating, the signal-in relay R870 interrupts, at the contacts 874, an obvious normally completed circuit for maintaining operated the incoming release relay R920; however, the latter relay does not immediately restore. Also, the signal-in relay R870 completes, at the contacts 873, an obvious path for applying ground potential to the busy conductor C1110, thereby to complete an obvious circuit for operating the switch relay R1270 and a multiple circuit for illuminating the busy in-out lamp L1334 on the display panel 1330. The illumination of the busy in-out lamp L1334 indicates to the operators at the various positions at the manual dial toll board in the automatic exchange 50 that the repeater circuit 700 and the trunk 1380 extending thereto are busy at this time, by virtue of the seizure of the repeater circuit 700 over the associated toll line 702 from the Strowger dial toll board in the automatic exchange 30. Also, the signal-in relay R870 completes, at the contacts 873, a multiple circuit, including the contacts 721, for operating the pad cutout relay R710. Upon operating, the pad cutout relay R710 interrupts, at the contacts 712, a normally completed termination circuit, including the windings 714, 718 and 716 of the pad 795, and the condenser 719, across the line conductors of the toll line 702; and completes, at the contacts 711 and 713, paths for respectively short-circuiting the windings 714, 715 and 716, 717 of the pad 795. Also, the signal-in relay R870 completes, at the contacts 875, an obvious circuit for operating the cutoff relay R760, thereby to cause the latter relay to operate shortly thereafter, it being of the slow-to-operate type. Further, the signal-in relay R870 completes, at the contacts 875, a multiple circuit, including the contacts 917 and 1016, for operating the series relay R1050. Upon operating, the series relay R1050 prepares, at the contacts 1051, a circuit, traced hereinafter, for energizing the upper winding of the loop test relay R860; and, upon operating, the cutoff relay R760 interrupts, at the contacts 761, a further point in a connection, traced hereinafter, between the toll line 702 extending to the repeater circuit 700 and the trunk 1370 extending therefrom to the automatic switch train 1300. Finally, the signal-in relay R870 completes, at the contacts 876, a circuit, prior to the restoration of the incoming release relay R920 and including the contacts 922, 1019 and 899, for energizing the upper winding of the selector seize relay R890, and a multiple circuit, also including the contacts 896, for energizing the lower winding thereof; whereby the selector seize relay R890 is not operated at this time since it is of the differential type.

The incoming release relay R920 being of the slow-to-release type does not restore unless the signal-in relay R870 is maintained operated a considerable time interval corresponding to the reception of a release signal, as explained more fully hereinafter. Accordingly, in the present example, the seizure signal is of such short duration that the tone unit 701 does not maintain operated the signal-in relay R870 a time interval sufficiently long to bring about the restoration of the incoming release relay R920; and when the signal-in relay R870 restores at the conclusion of the seizure signal it re-completes, at the contacts 874, the previously mentioned circuit for maintaining operated the incoming release relay R920. Upon operating, the switch release relay R1270 completes, at the contacts 1272, a path for applying 24 volt battery potential to the conductor C1386, thereby to operate the visual signal or drop D1317 associated with the manual dial toll board in the automatic exchange 50, thereby further to indicate the busy condition of the repeater circuit 700 and the trunk 1380 extending thereto. Also, the switch release relay R1270 completes, at the contacts 1271, a path for applying battery potential by way of the inductance 1273 and the contacts 1261 to the line conductor C1371 of the incoming trunk 1370 extending to the automatic switch train 1300, which application of battery potential to the line conductor C1371 of the trunk 1370 is effective to bring about the release of the automatic switch train 1300 in the peculiar event that it is not completely released at this time; this being a unique characteristic operation of the automatic switch train 1300 which is of the well known International Standard Electric 7-A type, as previously noted. Further, the switch release relay R1270 completes, at the contacts 1272, an obvious multiple circuit for operating the switch release relay R1260, thereby to cause the latter relay to operate shortly thereafter, it being of the slow-to-operate type. Upon operating, the switch release relay R1260 interrupts, at the contacts 1261, the previously mentioned path for applying battery potential to the line conductor C1371 of the trunk 1370, thereby to condition the automatic switch train 1300 to be operated, in a manner more fully explained hereinafter.

At the conclusion of the seizure signal, the signal-in relay R870 restores, as previously explained, interrupting, at the contacts 876, the previously traced circuit for energizing in multiple the upper and lower windings of the selector seize relay R890. The magnetic flux in the upper winding of the selector seize relay R890 does not immediately decay by virtue of the shunt connection including the lower winding thereof and the contacts 896 extending also to battery potential, whereby the upper and lower windings of the selector seize relay R890 are effectively energized in series circuit relation during the decay of the magnetic flux therein, causing the latter relay to operate in order to close its contacts 895 which are, in turn, connected by way of the contacts 1018 and 921 to ground potential. Thus the upper and lower windings of the selector seize relay R890 are energized in series circuit relation, causing the latter relay to operate fully in order to interrupt, at the contacts 896, the previously mentioned path for short-circuiting in series the upper and lower windings thereof. Also, the selector seize relay R890 completes, at the contacts 892, a multiple path for applying ground potential to the busy conductor C1110, thereby to maintain operated the pad cutout relay R710, the switch release relay R1270, etc. Also, the selector seize relay R890 interrupts, at the contacts 897, a normally completed path, including the contacts 975, for applying ground potential by way of the lower winding of the sleeve relay R1070 to the sleeve conductor C1385 of the trunk 1380 that is connected to the sleeves of the jacks J1314, etc. at the various operator positions at the manual dial toll board in the automatic exchange 50, thereby further to mark the trunk 1380 and the repeater circuit 700 as busy to the operator positions mentioned. Further, the selector seize relay R890 completes, at the contacts 890, a path, including the resistor 884, for connecting 24 volt battery potential to the seize conductor C1103 and, consequently, by way of the contacts 1121, to the control conductor C1373 of the trunk 1370 extending to the automatic switch train 1300, thereby to effect seizure of the automatic switch train 1300. Further, the selector seize relay R890 completes, at the contacts 891, a path for applying ground potential to the conductor C1414 in the cable 1410 extending to the preselector 1403 and a multiple path for applying ground potential to the lamp conductor C1107, thereby to complete a circuit for illuminating the incoming lamp L1331 on the display panel 1330, thereby to indicate the presence of an incoming call to the automatic exchange 50 on the trunk 1370 associated with the repeater circuit 700. This application of ground potential to the conductor C1414 in the cable 1410, extending to the preselector 1403, causes the preselector 1403 to condition the previously selected coder, such, for example, as the coder 1404, to be responsive to register the first digit sent over the toll line 702 and received by the repeater circuit 700. Finally, the selector seize relay R890 completes, at the contacts 891', a circuit, including the contacts 1051, for energizing the upper winding of the loop test relay R860, thereby to cause the latter relay to operate shortly thereafter, it being of the slow-to-operate type. Also, it is noted that when the signal-in relay R870 restores at the conclusion of the seizure signal, it interrupts, at the contacts 875, the previously traced multiple circuits for maintaining operated the cutoff relay R760 and the series relay R1050, whereby the cutoff relay R760 restores immediately and the series relay R1050 restores shortly thereafter, it being of the slow-to-release type.

Upon operating, the loop test relay R860 completes, at the contacts 864, an obvious path for applying ground potential to the pulse cut-in conductor C711 extending to the tone unit 701 in order to cause operation of the pulse cut-in relay therein, whereby the impulse-in relay in the tone unit 701 is conditioned to be responsive to dial signals received over the toll line 702. Also, the loop test relay R860 completes, at the contacts 863, a circuit, including the contacts 921 and 1018, for operating the coder seizing relay R940; and a substantially identical multiple circuit for energizing the lower winding of the auxiliary relay R780, in order to cause the latter relay to operate. Upon operating, the coder seizing relay R940 completes, at the contacts 942 and 945, a path, including the contacts 891, 862, 881 and 911, for applying ground potential by way of the lower winding of the loop test relay R860 to the pulse conductor C1413 in the cable 1410 extending to the preselector 1403, thereby to complete a holding circuit for energizing the lower winding of the loop test relay R860 subsequent to the restoration of the series relay R1050 to interrupt the previously traced circuit for energizing the upper winding of the loop test relay R860. Accordingly, the loop test relay R860 is maintained in its operated position at this time by virtue of the completed holding circuit above traced, for energizing the lower winding thereof. Also, the coder seizing relay R940 interrupts, at the contacts 943 and 946, further points in a connection, traced hereinafter, between the toll line 702 and the trunk 1370; and completes, at the contacts 941 and 944, connections between the code A conductor C1411 and the code B conductor C1412 in the cable 1410 extending to the preselector 1403, and the line conductors C1371 and C1372 of the trunk 1370 extending to the automatic switch train 1300. Specifically, the code A conductor C1411 in the cable 1410 is connected by way of the contacts 941, 961, 1111 and 1131 to the line conductor C1371 of the trunk 1370; and the code B conductor C1412 in the cable 1410 is connected by way of the contacts 944 and 1113 to the line conductor C1372 of the trunk 1370.

Upon operating, the auxiliary relay R780 prepares, at the contacts 784, a circuit, traced hereinafter and including the contacts 876 of the signal-in relay R870, for energizing in multiple the upper and lower windings of the end-of-dial relay R830, thereby to place the end-of-dial relay R830 under the control of the signal-in relay R870. Further, the auxiliary relay R780 completes, at the contacts 786, a path, including the contacts 774, 934 and 982', between the false seizure conductor C996 and the junction between the upper and lower windings of the time pulse relay R770; over which circuit the upper and lower windings of the time pulse relay R770 are not immediately energized; and which circuit is utilized in case of false seizure of the repeater circuit 700, as explained more fully hereinafter.

In the foregoing description it was assumed that the preselector 1403 had previously operated to select the idle coder 1404 prior to operation of the coder seizing relay R940 in the repeater circuit 700 to connect the repeater circuit 700 to the preselector 1403. However, it may occur that all of the coders 1404, etc. are busy at this time and that when the coder seizing relay R940 is operated to connect the repeater circuit 700 to the cable 1410 extending to the preselector 1403, in the manner described above, the preselector 1403 is not connected to an idle one of the coders 1404, etc. In this peculiar case, wherein no idle coder 1404, etc. is available, a source of interrupted ground potential is connected in the preselector 1403 to the control conductor C1415 in the cable 1410, thereby to complete an obvious circuit for energizing the upper winding of the supervisory relay R840, in order to bring about intermittent operation thereof. In this event intermittent operation of the supervisory relay R840 is effective to cause the tone unit 701 to return a busy signal over the toll line 702, in a manner identical to that explained hereinafter when the called subscriber substation T4 in the automatic exchange 50' is busy incident to operation of the automatic switch train 1300 to select the subscriber line 1301 extending thereto.

Continuing now with the extension of the present connection, and again assuming that the preselector 1403 has previously operated to select the idle coder 1404 prior to operation of the coder seizing relay R940 to connect the repeater circuit 700 to the cable 1410 extending to the preselector 1403, the operator at the first position circuit 316 at the Strowger dial toll board in the automatic exchange 30 proceeds to dial the first digit of the directory number of the called subscriber substation T4 in the automatic exchange 50; whereby the line relay R430 in the repeater circuit 400 follows. Each time the line relay R430 restores and then reoperates, it completes and then interrupts at the contacts 432 a circuit including the contacts 444, 429, 482′ and 427, for energizing the winding of the series relay R410, thereby to cause the latter relay to operate and remain operated during impulsing, since it is of the slow-to-release type. Also, each time the line relay R430 restores and then reoperates it completes and then interrupts, at the contacts 431, a circuit, including the contacts 441, 481′ and 421′, for energizing the winding of the send relay R675, thereby to cause the latter relay to follow. Upon operating, the series relay R410 recompletes, at the contacts 412, the previously traced circuit, including the contacts 444, 429 and 686, for energizing the lower winding of the prepare relay R670, in order to cause the latter relay to operate. Since the series relay R410 is maintained operated throughout the impulses of the present digit, and the prepare relay R670 is operated by the series relay R410 as explained above, it will be apparent that the prepare relay R670 is also maintained operated throughout the impulses of the present digit. Upon reoperating, the prepare relay R670 again interrupts, at the contacts 673, the path for applying ground potential to the receiving switch conductor C607 extending to the tone unit 601, whereby the tone unit 601 is conditioned to send unmodulated 1000 cycle current, since battery potential at this time appears upon the modulation cut off conductor C608 extending thereto, as previously noted. Each time the send relay R675 operates and then restores it completes and then interrupts, at the contacts 676, the previously traced connection between the sending —conductor C601 and the sending +conductor C602 and the line conductors of the toll line 702; and interrupts and then recompletes, at the contacts 677, the previously mentioned connection between the sending —conductor C601 and the sending +conductor C602. Also, each time the send relay R675 operates and then restores it completes and then interrupts, at the contacts 678, the previously mentioned path for applying ground potential to the modulation cutoff conductor C608, whereby the winding of the modulation cutoff relay in the tone unit 601 is short-circuited intermittently. However, the modulation cutoff relay in the tone unit 601 does not restore during this intermittent short-circuiting of the winding thereof, but is maintained steadily operated causing the unmodulated 1000 cycle current to be projected over the sending —conductor C601 and the sending +conductor C602 extending therefrom, and consequently pulses of this unmodulated 1000 cycle current to be transmitted over the line conductors of the toll line 702 corresponding to the intermittent operation of the send relay R675. Accordingly, at this time a plurality of impulses of unmodulated 1000 cycle current corresponding to the impulses of the present digit are transmitted over the line conductors of the toll line 702 to the repeater circuit 700 in the automatic exchange 50, and are utilized therein in order to effect registration of the present digit, in a manner more fully explained hereinafter.

At the conclusion of the present digit the line relay R430 is maintained in its operated position, effecting immediate restoration of the send relay R675 and restoration of the series relay R410 shortly thereafter, and the consequent restoration of the prepare relay R670. When the next digit of the directory number of the called subscriber substation T4 in the automatic exchange 50 is dialed at the first operator position circuit 316 at the Strowger dial toll board in the automatic exchange 30, the line relay R430 again follows, the impulses thereof effecting operation of the series relay R410 and the prepare relay R670 throughout the impulses of the digit mentioned and intermittent operation of the send relay R675, all in the manner explained above; whereby the send relay R675 transmits a number of impulses of unmodulated 1000 cycle current corresponding to the impulses of the next digit mentioned over the line conductors of the toll line 702 from the tone unit 601, in a manner identical to that explained above. In view of the foregoing it will be appreciated that the remainder of the digits of the directory number of the called subscriber substation T4 dialed at the first operator position circuit 316 at the Strowger dial toll board in the automatic exchange 30 are repeated by the repeater circuit 400 over the toll line 702 to the repeater circuit 700 in the automatic exchange 50 and registered therein for control purposes, in a manner more fully explained hereinafter.

The first digit of the directory number of the called subscriber substation T4 in the automatic exchange 50 is received over the toll line 702 by the tone unit 701; which digit is in the form of a series of unmodulated 1000 cycle pulses of current. When the first digit mentioned is thus received over the toll line 702 by the tone unit 701, the impulse-in relay therein operates and restores in a corresponding manner; whereby a corresponding series of ground impulses are transmitted from the tone unit 701 over the dial-in conductor C710 extending therefrom. The series of ground impulses, corresponding to the number of impulses in the first digit transmitted over the dial-in conductor C710 extending from the tone unit 701, completes intermittently an obvious circuit for operating the dial-in relay R880 in the repeater circuit 700, in order to cause the latter relay to follow. Each time the dial-in relay R880 operates and then restores it interrupts and then recompletes, at the contacts 881, the previously traced path for applying ground potential by way of the lower winding of the loop test relay R860 to the pulse conductor C1413 in the cable 1410 extending to the preselector 1403, whereby a corresponding plurality of ground impulses are transmitted over the pulse conductor C1413 in the cable 1410 to the preselector 1403, and thence over the pulse conductor C1421 in the cable 1420 extending from the preselector 1403 and the contacts 1431 to the coder 1404; whereby the coder 1404 responds to the impulses of the first digit repeated thereto by the dial-in relay R880 in the repeater circuit 700. More particularly, the coder 1404 responds to the impulses of the present digit in order to bring about registration thereof in the first digit storage device DS1. Specifically, the relays A, B, C and D, comprising the first digit storage device DS1, are operated in selective combinations corresponding to the present digit. Further, it is noted that the various combinations of the positions of the relays A, B, C and D in the first digit storage device DS1 in turn mark the tip and ring conductors T and R with various combinations of −48 volts and +60 volts battery potentials through different amounts of resistance, in order to produce corresponding light and heavy −48 volts and +60 volts markings upon the tip and ring conductors T and R. The relationship between the digit, the combination positions of the relays A, B, C and D and the potentials applied to the tip and ring conductors T and R are indicated below:

| Digit | Relays Operated | Marking Tip Conductor T | Marking Ring Conductor R |
|---|---|---|---|
| 1 | A and D | + via 1450 ohms | − via 30 ohms. |
| 2 | B and D | − via 30 ohms | − via 30 ohms. |
| 3 | A, B and D | + via 150 ohms | − via 30 ohms. |
| 4 | C and D | | + via 150 ohms. |
| 5 | A, C and D | + via 1450 ohms | + via 150 ohms. |
| 6 | B | − via 30 ohms | |
| 7 | A and B | + via 150 ohms | |
| 8 | C | | + via 1450 ohms. |
| 9 | A and C | + via 1450 ohms | + via 1450 ohms. |
| 0 | D | | − via 30 ohms. |

In conjunction with the registration of the first digit in the first digit storage device DS1, it is pointed out that the registration of the digit 0 causes a peculiar operation, explained more fully hereinafter, which is indicative of the circumstance that the operator at the first position circuit 316 at the Strowger dial toll board in the automatic exchange 30 is extending the connection to an inward operator position at the manual dial toll board in the automatic exchange 50 rather than to the automatic switch train 1300; which situation is not the present example. Accordingly, the first digit of the directory number of the called subscriber substation T4 in the automatic exchange 50 is other than 0 and is registered in the first digit storage device DS1, as noted above. Further, it is pointed out that the second, etc. digits of the directory number of the called subscriber substation T4 in the automatic exchange 50 are received in a similar manner over the toll line 702 by the tone unit 701 and repeated by the repeater circuit 700 over the cable 1410 extending to the preselector 1403, and thence over the cable 1420 to the coder 1404 and stored in the second, etc. digit storage devices DS2, etc. in an identical manner.

Also, each time the dial-in relay R880 in the repeater circuit 700 operates and then restores, incident to the reception of each impulse of each digit, as previously noted, it completes and then interrupts, at the contacts 882, a circuit, including the contacts 1017, 917 and 1016, for operating the series relay R1050, and a substantially identical multiple circuit for operating the cutoff relay R760 shortly thereafter, the latter relay being of the slow-to-operate type. Further, each time the dial-in relay R880 operates and then restores it completes and then interrupts, at the contacts 883, a circuit, including the contacts 783 and 743′, for operating the control relay R930. The loop test relay R860 and the cutoff relay R760, being of the slow-to-operate type, are also slightly slow to release and remain operated during impulsing, while the series relay R1050 and the control relay R930, being directly of the slow-to-release type, remain operated during impulsing. When the series relay R1050 operates it completes, at the contacts 1051, the previously traced circuit for energizing the upper winding of the loop test relay R860, thereby positively to maintain the latter relay in its operated position during impulsing. Upon operating, the control relay R930 completes, at the contacts 933, a holding circuit, including the contacts 743′ and 783, for energizing the winding thereof; and completes, at the contacts 931, a circuit, including the contacts 891′, for operating the control relay R950. Further, the control relay R930 interrupts, at the contacts 934, the previously traced connection between the false seizure conductor C996 and the junction between the upper and lower windings of the time pulse relay R770, thereby positively to prevent operation of the time pulse relay R770 since the repeater circuit 700 has not been falsely seized, as indicated by the prompt reception of the first digit of the directory number of the called subscriber substation T4 in the automatic exchange 50.

After all of the digits comprising the directory number of the called subscriber substation T4 in the automatic exchange 50 have been dialed at the first operator position circuit 316 in the Strowger dial toll board in the automatic exchange 30 and repeated by the repeater circuit 400 over the toll line 702, in the manner explained above, battery potential through the call supervisory lamp at the first operator position circuit 316 is applied to the control conductor C399 of the trunk 395, thereby to complete a circuit substantially identical to that previously traced for energizing the upper winding of the line supervisory relay R480, since ground potential is applied by way of the contacts 441, 488, 492 and 485 and the upper winding of the line supervisory relay R480 to the control conductor C399 of the trunk 395 at this time; whereby the line supervisory relay R480 operates. Upon operating the line supervisory relay R480 completes, at the contacts 487, a holding circuit, including the contacts 441, for energizing in series the upper and lower windings thereof; and interrupts, at the contacts 489, the previously traced path for applying battery potential by way of the resistor 463 to the modulation cutoff conductor C608 extending to the tone unit 601. When battery potential is thus removed from the modulation cutoff conductor C608 the modulation cutoff relay in the tone unit 601 restores, whereby the tone unit 601 is prepared to send 60 cycle modulated 1000 cycle current the next time it is employed for sending purposes. Also, the line supervisory relay R480 interrupts, at the contacts 485, a further point in the previously traced original circuit for energizing the upper winding thereof; and prepares, at the contacts 486, a path, traced hereinafter, and governed by the contacts 531 of the supervisory relay R530 for applying ground potential to the control conductor C399 of the trunk 395, thereby to condition the call supervisory lamp at the first operator position circuit 316 to be governed by the supervisory relay R530 in the repeater circuit 400, in a manner more fully explained hereinafter. Further, the line supervisory relay R480 interrupts, at the contacts 481 and 483, the previously traced loop circuit extending to the line relay R430 in order to cause the latter relay to restore. Further, the line supervisory relay R480 completes, at the contacts 482 and 484, a connection, including the contacts 401 and 642 and the condenser 656, between the line conductors C396 and C397 of the trunk 395 and the monitoring —conductor C603 and the monitoring +conductor C604 extending to the tone unit 601. At this time the headset at the first operator position circuit 316 is operatively connected to the line conductors C396 and C397 of the trunk 395; and the line conductors of the toll line 702 are directly connected by the windings 605, 606 and 607, 608 of the pad 695 to the receiving —conductor C605 and to the receiving +conductor C606 extending to the tone unit 601. Finally, the receiving —conductor C605 and the receiving +conductor C606 are operatively connected in the tone unit 601 to the monitoring —conductor C603 and the monitoring +conductor C604. Accordingly, the headset at the first operator position circuit 316 at the Strowger dial toll board in the automatic exchange 30 is operatively connected through the tone unit 601 to the toll line 702, whereby the operator at the first position circuit 316 may listen in on the toll line 702 without in any way interfering with the subsequent reception by the tone unit 601 of signals received over the toll line 702 from the automatic exchange 50, and specifically the end-of-dialing signal that is subsequently received by the tone unit 601, in a manner more fully explained hereinafter.

Also at this time high resistance battery potential in the first operator position circuit 316 at the Strowger dial toll board in the automatic exchange 30 is connected to both of the line conductors C396 and C397 of the trunk 395; which application of high resistance battery potential to the line conductor C397 of the trunk 395 completes a circuit, including the contacts 484, for energizing the winding of the re-ring relay R400 in series with the winding of the pad control relay R690, whereby the pad control relay R690 operates. However, the re-ring relay R400 does not operate since it is of the marginal type. Upon operating, the pad control relay R690 interrupts, at the contacts 691, the previously mentioned circuit for maintaining operated the pad cutout relay R600, thereby to cause the latter relay to restore shortly thereafter, it being of the slow-to-release type. When the pad cutout relay R600 restores it interrupts, at the contacts 601 and 603, the previously mentioned path short-circuiting the windings 605, 606 and 607, 608 of the pad 695; and completes, at the contacts 602, the termination circuit, including the condenser 696 and the windings 697, 606 and 608, between the line conductors of the toll line 702; whereby the windings 605, 606 and 607, 608 of the pad 695 are included in the connection between the toll line 702 and the first operator position circuit 316, as previously traced.

After the last digit of the directory number of the called subscriber substation T4 in the automatic exchange 50 has been transmitted over the toll line 702 and repeated by the tone unit 701 to the dial-in relay R880, the latter relay is retained in its restored position, recompleting, at the contacts 881, the previously traced path for applying ground potential, by way of the lower winding of the loop test relay R860, to the pulse conductor C1413 in the cable 1410 extending through the preselector 1403 and the cable 1420 to the coder 1404, whereby the loop test relay R860 is retained in its operated position by virtue of this completed circuit for energizing the lower winding thereof. Also, the restored dial-in relay R880 interrupts, at the contacts 882, the previously traced multiple circuit for maintaining operated the cutoff relay R760 and the series relay R1050, whereby the cutoff relay R760 restores virtually immediately and the series relay R1050, being of the slow-to-release type, restores shortly thereafter. Upon restoring, the series relay R1050 again interrupts, at the contacts 1051, the previously traced circuit for energizing the upper winding of the loop test relay R860, whereby the latter relay is retained in its operated position only so long as battery potential is returned from the coder 1404 by way of the previously traced path to the pulse conductor C1413 in the cable 1410. The digits registered in the various digit storage devices DS1, etc. in the coder 1404 are marked, in the manner previously explained, to the tip and ring conductors T and R, and thence by way of the cable 1420 and the preselector 1403 to the code A conductor C1411 and the code B conductor C1412 in the cable 1410 and, accordingly, over the previously traced paths to the line conductors C1371 and C1372 of the trunk 1370 extending to the automatic switch train 1300; and consequently to an idle toll register sender, such, for example, as the toll register sender 1391. At this point it is noted that when the coder seizing relay R940 operates to connect the code A conductor C1411 and the code B conductor C1412 in the cable 1410 to the line conductors C1371 and C1372 of the trunk 1370 extending to the automatic switch train 1300, an idle toll register sender, such, for example, as the toll register sender 1391, is operatively connected to the automatic switch train 1300. Thus the digits stored in the coder 1404 are transferred in sequence over the trunk 1370, utilizing the markings mentioned, and are re-registered in the toll register sender 1391 operatively connected to the automatic switch train 1300. In turn, the toll register sender 1391 controls operation of the automatic switch train 1300 to select the subscriber line 1301 extending to the called subscriber substation T4, whereupon the automatic switch train 1300 operates to test the idle or busy condition of the called subscriber substation T4 at this time. When the last digit has been transferred from the coder 1404 to the toll register sender 1391 operatively connected to the automatic switch train 1300, in the manner explained above, the coder 1404 operates in order to interrupt the application of battery potential to the pulse conductor C1413 in the cable 1410, thereby to interrupt the previously traced circuit for energizing the lower winding of the loop test relay R860, whereby the latter relay restores. Upon restoring, the loop test relay R860 interrupts, at the contacts 864, the previously traced path for applying ground potential to the pulse cut-in conductor C711 extending to the tone unit 701, thereby to bring about the restoration shortly thereafter of the pulse cut-in relay in the tone unit 701, which is effective to prevent further operation of the impulse-in relay therein and the consequent repeating of digits over the dial-in conductor C710 extending from the tone unit 701 to the dial-in relay R880 in the repeater circuit 700. Also, the loop test relay R860 interrupts, at the contacts 863, the previously traced circuit for maintaining operated the coder seizing relay R940 and the multiple circuit for energizing the lower winding of the auxiliary relay R780, whereby the relays mentioned restore.

Upon restoring, the coder seizing relay R940 interrupts, at the contacts 942 and 945, further points in the previously traced path for applying ground potential to the pulse conductor C1413 in the cable 1410; and interrupts, at the contacts 941 and 944, the previously traced connections between the code A conductor C1411 and the code B conductor C1412 in the cable 1410, and the line conductors C1371 and C1372 of the trunk 1370. Further, the coder seizing relay R940 prepares, at the contacts 943 and 946, further points in a circuit, traced hereinafter, for connecting the toll line 702 to the trunk 1370 extending to the automatic switch train 1300. Upon restoring, the auxiliary relay R780 interrupts, at the contacts 783, the previously traced holding circuit for maintaining operated the control relay R930, in order to cause the latter relay to restore shortly thereafter, it being of the slow-to-release type. Upon restoring, the control relay R930 interrupts, at the contacts 931, the previously traced circuit for maintaining operated the control relay R950, whereby the latter relay restores shortly thereafter, it being of the slow-to-release type. However, prior to the restoration of the control relay R950 the control relay R930 completes, at the contacts 932, a circuit, including the contacts 891′ and 951, for operating the ring relay R960. Upon operating, the ring relay R960 completes, at the contacts 963, a path, including the contacts 891′, 932 and 916, for applying ground potential to the coder release conductor C1108. Shortly following operation of the ring relay R960, the control relay R950 restores to interrupt, at the contacts 951, the above-traced circuit for maintaining operated the ring relay R960, whereby the latter relay restores shortly thereafter, it being of the slow-to-release type. Upon restoring, the ring relay R960 interrupts, at the contacts 963, the above-traced path for applying ground potential to the coder release conductor C1108. Accordingly, ground potential is applied for a short time interval to the coder release conductor C1108, during the short time interval that the ring relay R960 occupies its operated position, thereby to complete an obvious circuit for operating the coder supervisory relay R1130. Upon operating, the coder supervisory relay R1130 completes, at the contacts 1133, a holding circuit for maintaining itself operated, and including the grounded lamp conductor C1107 as well as the contacts 1143 and 1152. Also, the coder supervisory relay R1130 interrupts, at the contacts 1131, a further point in the previously traced connection between the line conductor C1371 of the trunk 1370 and the lower winding of the loop test relay R860; and completes, at the contacts 1132, a path for applying 24 volt battery potential by way of the lower winding of the register sender supervisory relay R1140 to the line conductor C1371 of the trunk 1370 extending to the automatic switch train 1300.

When the automatic switch train 1300 responds to the last digit registered in the toll register sender 1391, in order to select the subscriber line 1301 extending to the called subscriber substation T4 in the automatic exchange 50, in the manner previously explained, ground potential in the automatic switch train 1300 is returned over the line conductor C1371 of the trunk 1370, completing an obvious circuit for energizing the lower winding of the register sender supervisory relay R1140, whereby the latter relay operates. Upon operating, the register sender supervisory relay R1140 completes, at the contacts 1142, a holding circuit, including the contacts 1124 and the grounded lamp conductor C1107, for energizing the upper winding thereof; and interrupts, at the contacts 1143, the previously traced holding circuit for maintaining operated the coder supervisory relay R1130. The coder supervisory relay R1130 then restores in order to interrupt, at the contacts 1132, the previously traced connection between the lower winding of the register sender supervisory relay R1140 and the line conductor C1371 of the trunk 1370; and to prepare, at the contacts 1131, a connection, traced hereinafter, between the trunk 1370 and the toll line 702. Further, upon operating, the register sender supervisory relay R1140 completes, at the contacts 1141, a connection, including the contacts 1121, between the control conductor C1373 of the trunk 1370 and the supervisory conductor C1104; which supervisory conductor C1104 extends directly by way of the lower winding of the supervisory relay R840 to 24 volt battery; while ground potential in the automatic switch train 1300 is applied to the control conductor C1373. Accordingly, the lower winding of the supervisory relay R840 is energized and operates at this time. Also the register sender supervisory relay R1140 completes, at the contacts 1142, a circuit, including the contacts 1124 and the grounded lamp conductor C1107 for illuminating the call to automatic exchange lamp L1332 on the display panel 1330, thereby to indicate to the operators in the various positions at the manual dial toll board in the automatic exchange 50 that the present call being routed over the repeater circuit 700 will be routed over the trunk 1370 to the automatic switch train 1300 and thence to a called subscriber substation in the automatic exchange 50. Finally, in passing, it is noted that when all of the digits registered in the toll register sender 1391 have been utilized to control the automatic switch train 1300, the toll register sender 1391 is released.

Upon operating, the supervisory relay R840 completes, at the contacts 844, a circuit, including the contacts 740, for reoperating the ring relay R960. Also, upon operating, the supervisory relay R840 completes, at the contacts 842, a circuit, including the contacts 891′, 835, 762 and 872, for operating the supervisory start relay R850. Upon operating, the ring relay R960 completes, at the contacts 964, a holding circuit, including the contacts 844, for maintaining itself operated; and interrupts, at the contacts 961, a further point in a connection, traced hereinafter, between the line conductor C1371 of the trunk 1370 and the corresponding line conductor of the toll line 702. Further, the ring relay R960 completes, at the contacts 962, a path, including the contacts 894, 1111 and 1131, for connecting the line conductor C1371 of the trunk 1370 to the ring conductor C1106, which ring conductor C1106 is connected, by way of the contacts 1126 and the resistor 1134, to the interrupted ring battery conductor C1134, whereby interrupted ring battery potential applied to the last-mentioned conductor is extended over the previously traced path to the line conductor C1371 of the trunk 1370 and, consequently, into the automatic switch train 1300, in order to cause the switch train 1300 to operate and project ringing current over the subscriber line 1301 to the called subscriber substation T4 in the automatic exchange 50, assuming that the called subscriber substation T4 is idle at this time.

Upon operating, the supervisory start relay R850 completes, at the contacts 854, an obvious circuit for energizing the lower winding of the prepare relay R750 in order to cause the latter relay to operate. Also, the supervisory start relay R850 completes, at the contacts 851, an obvious circuit for operating the send relay R730. Upon operating, the prepare relay R750 completes, at the contacts 753, a circuit, including the contacts 853, for operating the control relay R820; and, upon operating, the control relay R820 completes, at the contacts 821, an obvious circuit for operating the cutoff relay R760, the latter relay operating shortly thereafter, it being of the slow-to-operate type. Also, the control relay R820 completes, at the contacts 821, a circuit, including the contacts 917 and 1016, for operating the series relay R1050. Further, the prepare relay R750 completes, at the contacts 753, a multiple circuit for energizing the lower winding of the sequence relay R970, thereby to cause the latter relay to operate and complete, at the contacts 972, a holding circuit, including the grounded busy conductor C1110, for energizing the upper winding thereof. Also, upon operating, the sequence relay R970 completes, at the contacts 972, a circuit, including the grounded busy conductor C1110 and the contacts 893, for operating the switch-over relay R910. Upon operating, the switch-over relay R910 completes, at the contacts 915, a holding circuit, including the grounded busy conductor C1110, for maintaining itself operated; and interrupts, at the contacts 917, the previously traced circuit for maintaining operated the series relay R1050, in order to cause the latter relay to restore shortly thereafter, it being of the slow-to-release type. Also, upon operating, the control relay R820 completes, at the contacts 822, a circuit, including the contacts 921, 1018 and 745', for energizing the lower winding of the end-of-dial relay R830 and a multiple circuit, including the contacts 833, for energizing the upper winding thereof, whereby the end-of-dial relay R830 does not operate at this time since it is of the differential type.

Also, upon operating, the prepare relay R750 interrupts, at the contacts 754, the previously mentioned path for applying ground potential to the receiving switch conductor C707 extending into the tone unit 701, thereby to effect restoration of the receiving switch relay in the tone unit 701, in order to cause the tone unit 701 to transmit, over the sending −conductor C701 and the sending +conductor C702, 60 cycle modulated 1000 cycle current. Upon operating, the send relay R730 completes, at the contacts 734, an obvious path for applying ground potential to the modulation cutoff conductor C708 extending to the tone unit 701, thereby to insure that the modulation cutoff relay in the tone unit 701 is maintained in its restored position to effect the sending of the 60 cycle modulated 1000 cycle current, in the manner explained above. Further, the send relay R730 interrupts, at the contacts 732, an obvious connection between the sending −conductor C701 and the sending +conductor C702; and completes, at the contacts 731, an operative connection between the sending −conductor C701 and the sending +conductor C702 and the line conductors of the toll line 702, whereby the 60 cycle modulated 1000 cycle current is returned over the toll line 702 and constitutes an end-of-dialing signal to the repeater circuit 400 in the automatic exchange 30. Specifically, the sending −conductor C701 is connected by way of thecontacts 731 and the contacts 711 to one of the line conductors of the toll line 702; and the sending +conductor C702 is connected by way of the condenser 723, the resistor 722 and the contacts 713 to the other line conductor of the toll line 702.

When the supervisory start relay R850 operated, as explained above, it also completed, at the contacts 852, a holding circuit, including the grounded hold conductor C1110, the contacts 762 and 872, for maintaining itself operated; and when the cutoff relay R760 operated, as previously noted, it interrupted, at the contacts 762, the above-traced holding circuit for maintaining operated the supervisory start relay R850, in order to cause the latter relay to restore shortly thereafter, it being of the slow-to-release type. Upon restoring, the supervisory start relay R850 interrupts, at the contacts 851, the previously traced circuits for maintaining operated the send relay R730; and interrupts, at the contacts 854, the previously traced circuit for energizing the lower winding of the prepare relay R750, in order to cause the latter relay to restore. Upon restoring, the prepare relay R750 interrupts, at the contacts 753, the previously traced circuit for maintaining operated the control relay R820; and, upon restoring, the control relay R820 interrupts, at the contacts 821, the previously traced circuit for maintaining operated the cutoff relay R760; and interrupts, at the contacts 822, the previously traced circuit for energizing in multiple the upper and lower windings of the end-of-dial relay R830. The magnetic flux in the lower winding of the end-of-dial relay R830 does not immediately decay by virtue of the shunt connection including the upper winding thereof and the contacts 833 extending also to battery potential, whereby the upper and lower windings of the end-of-dial relay R830 are effectively energized in series circuit relation during the decay of the magnetic flux therein, causing the latter relay to operate in order to close its contacts 832 which are, in turn, connected by way of the contacts 1021 to the grounded busy conductor C1110. Thus the upper and lower windings of the end-of-dial relay R830 are energized in series circuit relation, causing the latter relay to operate fully in order to interrupt, at the contacts 833, the previously mentioned path for short-circuiting the associated resistor 837. Also, the end-of-dial relay R830 completes, at the contacts 831, a circuit, including the contacts 749 and 1021 and the grounded busy conductor C1110, for operating the switch-through relay R740 and a substantially identical multiple circuit for operating the supervisory relay R1040. Also, the end-of-dial relay R830 interrupts, at the contacts 834, a further point in the previously traced original circuit for operating the supervisory start relay R850; and prepares, at the contacts 834, an alternative circuit, traced hereinafter, for operating the supervisory start relay R850. When the send relay R730 restores, it interrupts, at the contacts 731, the operative connection between the sending −conductor C701 and the sending +conductor C702 extending from the tone unit 701 to the line conductors of the toll line 702; and recompletes, at the contacts 732, the normal path between the sending −conductor C701 and the sending +conductor C702. Also, the send relay R730 interrupts, at the contacts 734, the previously mentioned path for applying ground potential to the modulation cutoff conductor C708 extending to the tone unit 701. However, battery potential is not at this time applied to the modulation cutoff conductor C708; accordingly, the modulation cutoff relay in the tone unit 701 is maintained in its restored position. Upon restoring, the prepare relay R750 recompletes, at the contacts 754, the previously mentioned path for applying ground potential to the receiving switch conductor C707 extending to the tone unit 701, thereby to effect reoperation of the receiving switch relay in the tone unit 701, whereby the tone unit 701 is conditioned to receive signals transmitted over the toll line 702 at this time; the receiving —conductor C705 and the receiving +conductor C706 extending from the tone unit 701 being operatively connected to the line conductors of the toll line 702 by way of the previously traced path. In view of the foregoing it will be appreciated that the end-of-dialing signal transmitted by the repeater circuit 700 from the tone unit 701 over the toll line 702 comprises a short splash of 60 cycle modulated 1000 cycle current and causes operation of the repeater circuit 400 in the automatic exchange 30, in a manner explained hereinafter.

Upon operating, the supervisory relay R1040 in the repeater circuit 700 completes, at the contacts 1042, an obvious connection between the grounded busy conductor C1110 and the supervisory lamp conductor C1109, thereby to complete an obvious circuit for illuminating the supervisory lamp L1333 on the display panel 1330, in order to indicate to the operators at the various positions at the manual dial toll board in the automatic exchange 50 that the present call has been extended from the trunk 1370 by the automatic switch train 1300 to the called subscriber substation in the automatic exchange 50, but has not as yet been answered by the subscriber at the called subscriber substation. Upon operating, the switch-through relay R740 completes, at the contacts 748, a holding circuit, including the grounded busy conductor C1110 for maintaining itself operated. Also, the switch-through relay R740 interrupts, at the contacts 741, the previously mentioned connection between one of the line conductors of the toll line 702 and the sending —conductor C701; and completes, at the contacts 742 and 743, an operative connection between the toll line 702 and the trunk 1370 extending to the automatic switch train 1300. One of the line conductors of the toll line 702 is connected by way of the contacts 711, 742, 751, 761, 912 and 943, the resistor 965, the contacts 1111 and 1131 to the line conductor C1371 of the trunk 1370; and the other line conductor of the toll line 702 is connected by way of the contacts 713, 743, 752, 913, 946 and 1113 to the line conductor C1372 of the trunk 1370. Also, at this time it is noted that ringing current is being projected from the automatic switch train 1300 over the subscriber line 1301 to the called subscriber substation T4 in the automatic exchange 50; and ring-back tone current is being returned from the automatic switch train 1300 over the trunk 1370 and the previously traced connection, including the resistor 965, over the toll line 702 and, consequently, over the repeater circuit 400 in the automatic exchange 30 and the other elements of the connection to the first operator position circuit 316 at the Strowger dial toll board therein, in order to indicate to the operator thereat that the called subscriber substation T4 in the automatic exchange 50 is being rung at this time.

After all of the digits comprising the directory number of the called subscriber substation T4 in the automatic exchange 50 have been transmitted over the toll line 702 to the repeater circuit 700, the repeater circuit 700 operates in order to cause an end-of-dialing signal in the form of a short splash of 60 cycle modulated 1,000 cycle current to be sent from the associated tone unit 701 over the toll line 702; which operation was described in detail hereinbefore. This 60 cycle modulated 1,000 cycle splash of current returned over the toll line 702 is received by the tone unit 601 over the receiving —conductor C605 and the receiving +conductor C606 connected to the line conductors of the toll line 702 by way of the windings previously noted of the pad 695, whereby the tone unit 601 responds in order to bring about operation of the signal-in relay therein, whereby ground potential is applied to the signal-in conductor C609 extending therefrom. This application of ground potential to the signal-in conductor C609 completes an obvious circuit for energizing the winding of the signal-in relay R620, thereby to cause the latter relay to operate shortly thereafter, it being of the slow-to-operate type. Upon operating the signal-in relay R620 interrupts at the contacts 625 the previously traced normally completed circuit for maintaining operated the incoming release relay R406; whereby the latter relay tends to restore shortly thereafter, since it is of the slow-to-release type. However, at this time, the end-of-dialing signal is of short time duration; whereby the signal-in relay R620 does not occupy its operated position sufficiently long to bring about the restoration of the incoming release relay R460 as explained more fully hereinafter.

Also, upon operating, the signal-in relay R620 completes, at the contacts 626, a circuit, including the contacts 655, 447, 477, 526 and 515, for energizing the lower winding of the supervisory control relay R520, and a multiple circuit also including the contacts 522 for energizing the upper winding of the supervisory control relay R520, whereby the supervisory control relay R520 does not operate at this time since it is of the differential type. At the conclusion of the end-of-dialing signal the signal-in relay in the tone unit 601 restores in order to interrupt the application of ground potential to the signal-in conductor C609 extending therefrom, thereby to bring about the restoration of the signal-in relay R620. Upon restoring, the signal-in relay R620 interrupts, at the contacts 626, the previously traced circuit for energizing in multiple the upper and lower windings of the supervisory control relay R520. The magnetic flux in the lower winding of the supervisory control relay R520 does not immediately decay by virtue of the shunt connection including the upper winding thereof and the contacts 522 extending also to battery potential, whereby the upper and lower windings of the supervisory control relay R520 are effectively energized in series circuit relation during the decay of the magnetic flux therein, causing the latter relay to operate in order to close its contacts 521 which are, in turn, connected by way of the contacts 511 and the contacts 441 to ground potential. Thus the upper and lower windings of the supervisory control relay R520 are energized in series circuit relation, causing the latter relay to operate fully in order to interrupt, at the contacts 522, the previously mentioned path for short-circuiting the resistor 529. Upon operating fully, the supervisory control relay R520 interrupts, at the contacts 526, a further point in the previously traced circuit for energizing in multiple the upper and lower windings thereof; and prepares, at the contacts 525, a substantially identical circuit, traced hereinafter, for energizing in multiple the upper and lower windings of the answer supervisory relay R510. Also, the supervisory control relay R520 completes, at the contacts 524, a circuit, including the contacts 441, for operating the supervisory relay R530. Upon operating, the supervisory relay R530 completes, at the contacts 531, the previously mentioned path, including the contacts 441 and 486, for applying ground potential to the control conductor C399 of the trunk 395, thereby to illuminate the call supervisory lamp at the first operator position circuit 316 at the Strowger dial toll board in the automatic exchange 30, in order to render to the operator thereat end-of-dialing supervision. Also, the end-of-dialing signal returned over the toll line 702 and via the receiving −conductor C605 and the receiving +conductor C606 to the tone unit 601 is coupled therein to the monitoring −conductor C603 and the monitoring +conductor C604, and consequently to the headset at the first operator position circuit 316 at the Strowger dial toll board in the automatic exchange 30; whereby the operator thereat also receives an audible end-of-dialing signal. Further when the signal-in relay R620 restores it again completes at the contact 625 the previously traced circuit for maintaining operated the incoming release relay R460; which latter relay is maintained operated during the reception of the end-of-dialing signal by the repeater circuit 400 as previously mentioned.

When the subscriber at the called subscriber substation T4 in the automatic exchange 50 answers the call by removing the receiver of the telephone instrument thereat from its associated switchhook, the automatic switch train 1300 operates to interrupt the projection of ringing current over the subscriber line 1301 extending thereto, and to interrupt the return of ringback tone current over the trunk 1370. Also, the automatic switch train 1300 operates to increase the resistance included in the path for applying ground potential to the control conductor C1373 of the trunk 1370, thereby to cause the supervisory relay R840 in the repeater circuit 700 to restore, since the latter relay is of the marginal type and the lower winding thereof is not energized with sufficient current to maintain it in an operated condition. Upon restoring, the supervisory relay R840 interrupts, at the contacts 844, the previously traced holding circuit for maintaining operated the ring relay R960, thereby to cause the latter relay to restore shortly thereafter, it being of the slow-to-release type. Upon restoring, the ring relay R960 interrupts, at the contacts 962, the previously traced path for applying interrupted ringing battery potential to the line conductor C1371 of the trunk 1370 extending to the automatic switch train 1300; and completes, at the contacts 961, an obvious path for short-circuiting the resistor 965 included in the previously traced connection extending between the trunk 1370 and the toll line 702. Also, upon restoring, the supervisory relay R840 completes, at the contacts 843, the previously mentioned alternative circuit, including the contacts 891′, 781, 834, 762 and 872, for operating the supervisory start relay R850. Upon operating, the supervisory start relay R850 completes, at the contacts 851, the previously mentioned circuit for operating the send relay R730; and completes, at the contacts 854, the previously traced circuit for energizing the lower winding of the prepare relay R750, thereby to cause the latter relay to operate. Upon operating, the prepare relay R750 completes, at the contacts 753, the previously traced circuit for operating the control relay R820; and, upon operating, the control relay R820 completes, at the contacts 821, the previously traced circuit for operating the cutoff relay R760 shortly thereafter, the later relay being of the slow-to-operate type. Also, upon operating, the control relay R820 completes, at the contacts 822, a circuit, including the contacts 921, 1018, 744′ and 1025, for energizing the lower winding of the answer relay R1020, and a substantially identical multiple circuit, including the contacts 1026, for energizing the upper winding thereof, whereby the answer relay R1020 does not operate since it is of the differential type. Upon operating, the cutoff relay R760 interrupts, at the contacts 762, the above-traced alternative circuit for operating the supervisory start relay R850, thereby to cause the latter relay to restore shortly thereafter, it being of the slow-to-release type. Upon restoring, the supervisory start relay R850 interrupts, at the contacts 851, the previously mentioned circuit for maintaining operated the send relay R730; and interrupts, at the contacts 854, the previously traced circuit for energizing the lower winding of the prepare relay R750 in order to cause the latter relay to restore. Upon restoring, the prepare relay R750 interrupts, at the contacts 753, the previously traced circuit for maintaining operated the control relay R820; and, upon restoring, the control relay R820 interrupts, at the contacts 821, the previously traced circuit for maintaining operated the cutoff relay R760. Also upon restoring, the control relay R820 interrupts, at the contacts 822, the previously traced circuit for energizing in multiple the upper and lower windings of the answer relay R1020. The magnetic flux in the lower winding of the answer relay R1020 does not immediately decay by virtue of the shunt connection including the upper winding thereof and the contacts 1026 extending also to battery potential, whereby the upper and lower windings of the answer relay R1020 are effectively energized in series circuit relation during the decay of the magnetic flux therein, causing the latter relay to operate in order to close its contacts 1022 which are, in turn, connected to the grounded busy conductor C1110. Thus the upper and lower windings of the answer relay R1020 are energized in series circuit relation, causing the latter relay to operate fully in order to interrupt, at the contacts 1026, the previously mentioned path for short-circuiting the resistor 1027. Also, the answer relay R1020 interrupts, at the contacts 1021, the previously traced holding circuit for energizing in series the upper and lower windings of the end-of-dial relay R830 and the previously traced multiple circuit for maintaining operated the supervisory relay R1040, whereby the end-of-dial relay R830 restores substantially immediately and the supervisory relay R1040 restores shortly thereafter, it being of the slow-to-release type. Upon restoring the end-of-dial relay R830 interrupts, at the contacts 834, a further point in the above-traced alternative circuit for operating the supervisory start relay R850, thereby to prevent reoperation of the latter relay incident to restoration of the cutoff relay R760, in the manner explained above. Upon restoring, the supervisory relay R1040 interrupts, at the contacts 1042, the previously traced path for applying ground potential to the supervisory lamp conductor C1109, thereby to extinguish the supervisory lamp L1333 on the display panel 1330, in order to indicate to the operators at the various positions at the manual dial toll board in the automatic exchange 50 that the present connection extended by way of the repeater circuit 700 and the trunk 1370 has been answered at the called subscriber substation in the automatic exchange 50.

During the short time interval between the operation and the subsequent restoration of the send relay R730, in the manner described above, the tone unit 701 was operatively connected to the toll line 702 and was rendered operative to send, by virtue of the operation of the prepare relay R750 during the time interval mentioned, a short splash of 60 cycle modulated 1,000 cycle current over the toll line 702 and constituting an answer signal.

This answer signal sent over the toll line 702 by the repeater circuit 700 is received by the tone unit 601 in order to effect operation of the signal-in relay therein, whereby ground potential is again applied to the signal-in conductor C609 extending therefrom in order to bring about reoperation of the signal-in relay R620. When the signal-in relay R620 reoperates at this time it completes, at the contacts 626, the previously mentioned circuit, including the contacts 655, 447, 477 and 525, for energizing the lower winding of the answer supervisory relay R510, and a substantially identical multiple circuit, including the contacts 513 and the associated resistor 517, for energizing the upper winding of the answer supervisory relay R510, whereby the answer supervisory relay R510 is not operated at this time since it is of the differential type. At the conclusion of the answer signal the signal-in relay in the tone unit 601 restores, effecting the restoration of the signal-in relay R620, in the manner previously explained, whereby the latter relay upon restoring interrupts, at the contacts 626, the previously traced multiple circuit for energizing the upper and lower windings of the answer supervisory relay R510. The magnetic flux in the lower winding of the answer supervisory relay R510 does not immediately decay by virtue of the shunt connection including the upper winding thereof and the contacts 513 extending also to battery potential, whereby the upper and lower windings of the answer supervisory relay R510 are effectively energized in series circuit relation during the decay of the magnetic flux therein, causing the latter relay to operate in order to close its contacts 512 which are, in turn, connected by way of the contacts 441 to ground potential. Thus the upper and lower windings of the answer supervisory relay R510 are energized in series circuit relation, causing the latter relay to operate fully in order to interrupt, at the contacts 513, the previously mentioned path for short-circuiting in series the upper and lower windings thereof. Also, the answer supervisory relay R510 completes, at the contacts 512, a circuit, including the contacts 441, for energizing the lower winding of the switch-through relay R640 in order to cause the latter relay to operate; and interrupts, at the contacts 511, the previously traced holding circuit for energizing in series the upper and lower windings of the supervisory control relay R520 in order to cause the latter relay to restore. Further, the answer supervisory relay R510 interrupts, at the contacts 515, a further point in the previously traced circuit for energizing in multiple the upper and lower windings of the supervisory control relay R520; and prepares, at the contacts 514, a circuit, traced hereinafter, for energizing the winding of the supervisory relay R530. Upon operating, the switch-through relay R640 completes, at the contacts 646, a holding circuit, including the contacts 441, for energizing the upper winding thereof; and interrupts, at the contacts 642, the previously traced connection between the line conductor C397 of the trunk 395 and the monitoring +conductor C604. Finally, the switch-through relay R640 completes, at the contacts 641 and 643, a direct connection, including the contacts 482, 484 and 671, 672, as well as the windings 605, 606 and 607, 608 of the pad 695, between the line conductors C396 and C397 of the trunk 395 and the line conductors of the toll line 702, thereby to complete an established connection between the first operator position circuit 316 at the Strowger dial toll board in the automatic exchange 30 and the called subscriber substation T4 in the automatic exchange 50. Upon restoring, the supervisory control relay R520 interrupts, at the contacts 524, the previously traced circuit for operating the supervisory relay R530 in order to cause the latter relay to restore shortly thereafter, it being of the slow-to-release type. Upon restoring, the supervisory relay R530 interrupts, at the contacts 531, the previously traced path for applying ground potential to the control conductor C399 of the trunk 395, thereby to extinguish the call supervisory lamp at the first operator position circuit 316 in order to render to the operator thereat answer supervision. At this time a connection is established between the first operator position circuit 316 at the Strowger dial toll board in the automatic exchange 30 and the called subscriber substation T4 in the automatic exchange 50, and after the operator at the first position circuit 316 converses with the subscriber at the called subscriber substation T4 she may complete a connection to an incoming circuit to the automatic exchange 30 that is to be connected to the called subscriber substation T4 in the automatic exchange 50. When the last-mentioned connection is completed the operator at the first position circuit 316 restores the associated talk key, thereby disconnecting the position equipment from the established connection, whereupon high resistance battery potential is removed from the line conductors C396 and C397 of the trunk 395. When high resistance battery potential is thus removed from the line conductor C397 of the trunk 395, the previously traced circuit for maintaining operated the pad control relay R690 is interrupted; whereupon the latter relay restores, recompleting, at the contacts 691, the previously traced circuit for operating the pad cutout relay R600. Upon operating, the pad cutout relay R600 completes, at the contacts 601 and 603, the previously traced paths for short-circuiting the windings 605, 606 and 607, 608 of the pad 695; whereby the pad 695 is not included in the established connection between the incoming circuit to the automatic exchange 30 and the called subscriber substation T4 in the automatic exchange 50.

Reconsidering the operation of the repeater circuit 400 in conjunction with the repeater circuit 700, it is noted that in the event the called subscriber substation T4 in the automatic exchange 50 is busy when the automatic switch train 1300 operates to test the subscriber line 1301 extending thereto, as previously explained, the automatic switch train 1300 operates in order to interrupt the application of steady ground potential upon the control conductor C1373 of the trunk 1370 and to cause interrupted ground potential to be applied to the control conductor C1373. This application of interrupted ground potential in the automatic switch train 1300 upon the control conductor C1373 of the trunk 1370 completes intermittently the previously traced circuit, including the supervisory conductor C1104 and 24 volt battery for energizing the lower winding of the supervisory relay R840 in the repeater circuit 700; whereby the latter relay operates and restores intermittently. The first time the supervisory relay R840 restores it completes, at the contacts 843, the previously mentioned alternative circuit, including the contacts 891', 781, 834, 762, and 872 for operating the supervisory start relay R850. Upon operating the supervisory start relay R850 completes, at the contacts 851, the previously mentioned circuit for operating the send relay R730; and completes, at the contacts 854, the previously traced circuit for operating the prepare relay R750 via the lower winding thereof. Upon operating the prepare relay R750 completes, at the contacts 753, the previously traced circuit for operating the control relay R820; and upon operating the control relay R820 completes, at the contacts 821, the previously traced circuit for operating the cutoff relay R760 shortly thereafter. Upon operating the cutoff relay R760 interrupts, at the contacts 762, the previously traced alternative circuit for maintaining operated the supervisory start relay R850, thereby to cause the latter relay to restore shortly thereafter. Upon restoring the supervisory start relay R850 interrupts, at the contacts 851, the previously mentioned circuit for maintaining operated the send relay R730; and interrupts, at the contacts 854, the previously traced circuit for maintaining operated the prepare relay R750 via the lower winding thereof. Upon restoring the prepare relay R750 interrupts, at the contacts 753, the previously traced circuit for maintaining operated the control relay R820; and upon restoring the control relay R820 interrupts, at the contacts 821, the previously traced circuit for maintaining operated the cutoff relay R760. When the cutoff relay R760 restores it recompletes, at the contacts 762, the previously traced circuit for operating the supervisory start relay R850; thereby to initiate another cycle of operation of the relays mentioned above in the manner explained. Since the supervisory relay R840 operates and restores intermittently a new cycle of operation of the relays mentioned, as explained above, must be initiated when the supervisory relay R840 occupies its restored position closing the contacts 843; however, this condition occurs frequently; whereby the relays mentioned repeat the cycle above described continuously at this time. During the short time interval between the operation and the subsequent restoration of the send relay R730, in the manner described above, the tone unit 701 is operatively connected to the toll line 702 and is rendered operative to send, by virtue of the operation of the prepare relay R750, during the time interval mentioned, a short splash of 60 cycle modulated 1,000 cycle current over the toll line 702. Accordingly, each time the relays mentioned operate through the cycle above described, a splash of 60 cycle modulated 1,000 cycle current is sent over the toll line 702; whereby a series of splashes of 60 cycle modulated 1,000 cycle current are transmitted over the toll line 702 at this time, and constituting a busy signal.

This busy signal, sent over the toll line 702, is received by the tone unit 601 in order to cause corresponding intermittent operation and restoration of the signal-in relay therein; whereby the signal-in relay R620 in the repeater circuit 400 operates and restores intermittently in a corresponding manner. Upon the reception of the end-of-dialing signal the signal-in relay R620 brought about operation of the supervisory control relay R520 and the consequent operation of the supervisory relay R530, in the manner previously explained; whereby the supervisory relay R530, upon operating, effected illumination of the call supervisory lamp at the first operator position circuit 316 at the Strowger dial toll board in the automatic exchange 30. Upon the reception of the first pulse of the busy signal, the signal-in relay R620 brings about operation of the answer supervisory relay R510 and the consequent restoration of the supervisory control relay R520 and the supervisory relay R530, in the manner previously explained; whereby the supervisory relay R530, upon restoring, effects extinguishing of the call supervisory lamp at the first operator position circuit 316. Upon the reception of the second impulse of the busy signal, the signal-in relay R620 operates and then restores to complete and then to interrupt, at the contacts 626, a circuit, including the contacts 655, 447, 477, 526 and 514, for operating the supervisory relay R530, whereby the latter relay operates and then restores intermittently, the supervisory relay R530 restoring shortly after each deenergization thereof, since it is of the slow-to-release type. Each time the supervisory relay R530 operates and then restores it completes and then interrupts, at the contacts 531, the previously mentioned circuit for illuminating the called supervisory lamp at the first operator position circuit 316; whereby the called supervisory lamp mentioned is flashed at this time giving the operator thereat busy supervision. When the operator at the first position circuit 316 at the Strowger dial toll board in the automatic exchange 30 receives busy supervision, she proceeds to release the established connection including the repeater circuit 400 in the automatic exchange 30 and the repeater circuit 700 in the automatic exchange 50; all explained in detail hereinafter.

Continuing now with the established connection between the incoming circuit to the automatic exchange 30 and the called subscriber substation T4 in the automatic exchange 50, and including the finder-selector link 315 at the first operator position circuit 316 at the Strowger dial toll board in the automatic exchange 30, when the subscriber at the called subscriber substation T4 replaces the receiver of the telephone instrument thereat upon its associated switchhook, the automatic switch train 1300 in the automatic exchange 50 operates to decrease the resistance included in the previously traced circuit for energizing the lower winding of the supervisory relay R840 in the repeater circuit 700; which circuit includes the control conductor C1373 of the trunk 1370. When the lower winding of the supervisory relay R840 is thus energized the latter relay operates since it is of the marginal type. Upon operating the supervisory relay R840 effects operation of the supervisory start relay R850; which, in turn, effects operation of the prepare relay R750 and the send relay R730, the prepare relay R750 effecting operation of the control relay R820, and the control relay R820 effecting operation of the cutoff relay R760 and the supervisory relay R1040; all in the manner previously explained. Upon operating the supervisory relay R1040 completes at the contacts 1043 a multiple holding circuit, including the contacts 836 and 1017 for maintaining operated the cutoff relay R760. Upon operating the cutoff relay R760 effects restoration of the supervisory start relay R850; which in turn effects restoration of the control relay R820 and the prepare relay R750 and the send relay R730; and, in turn, the control relay R820 effects restoration of the supervisory relay R1040; and, in turn, the supervisory relay R1040 effects restoration of the cutoff relay R760; all in the manner previously described. Upon restoring the cutoff relay R760 effects reoperation of the supervisory start relay R850; thereby to initiate another cycle of operation of the relays mentioned. During the above described cycle of operation of the relays mentioned, and while the send relay R730 and the prepare relay R750 occupy their operated positions, the tone unit 701 was operatively connected to the toll line 702 and was operated to transmit a pulse of 60 cycle modulated 1,000 cycle current over the toll line 702. Accordingly, at this time, the relays mentioned operate continuously through the cycle above described in order to cause a series of 60 cycle modulated 1,000 cycle pulses of current to be transmitted over the toll line 702, and constituting a disconnect signal. In passing, it is noted that the disconnect signal is identical to the busy signal previously described; and that the disconnect signal is continuously transmitted from the repeater circuit 700 in the automatic exchange 50 over the toll line 702 to the repeater circuit 400 in the automatic exchange 30 until the operator at the first position circuit 316 at the Strowger dial toll board in the automatic exchange 30 effects the release of the established connection in a manner more fully explained hereinafter. Also during the above described cycle of operation of the relays mentioned in the repeater circuit 700, each time the supervisory relay R1040 operates and then restores it completes and then interrupts, at the contacts 1042, the previously traced connection between the grounded busy conductor C1110 and the supervisory lamp conductor C1109; thereby to complete intermittently the previously traced circuit for illuminating the supervisory lamp L1333 on the display panel 1330 associated with the manual dial toll board in the automatic exchange 30 in order to give an indication to the operators at the various positions at the manual dial toll board mentioned that the called subscriber substation in the automatic exchange 50 and involved in the connection including the repeater circuit 700 and the trunk 1370 extending therefrom to the automatic switch train 1300 has disconnected from the established connection at this time.

When this disconnect signal is received by the repeater circuit 400 in the automatic exchange 30, the tone unit 601 responds thereto, effecting intermittent operation of the signal-in relay R620 in the repeater circuit 400 and the consequent intermittent operation of the supervisory relay R530 in a manner substantially identical to that previously explained, bringing about flashing of the call supervisory lamp at the first operator position circuit 316, in order to render to the operator thereat flashing disconnect supervision. Upon receiving the disconnect supervision, the operator at the first position circuit 316 may operate the associated talk key; thereby to reconnect high resistance battery potential to the line conductors C396 and C397 of the trunk 395. The application of high resistance battery potential to the line conductor C397 of the trunk 395 completes the previously traced circuit for energizing in series the winding of the re-ring relay R400 and the winding of the pad control relay R690 in order to bring about operation of the pad control relay R690; the re-ring relay R400 is not operated since it is the marginal type. Upon operating the pad control relay R690 interrupts at the contacts 691 the previously traced circuit for maintaining operated the pad cutout relay R600, in order to cause the latter relay to restore shortly thereafter, it being of the slow-to-release type. Upon restoring the pad cutout relay R600 interrupts at the contacts 601 and 603, the previously mentioned paths for respectively short-circuiting the windings 605, 606 and 607, 608 of the pad 695; and recompletes at the contacts 602 the previously traced termination circuit, including the condenser 696, between the line conductors of the toll line 702.

Also at this time the operator at the first position circuit 316 may operate the associated ring key in order to bring about resignaling of the subscribed at the called subscriber substation T4 in the automatic exchange 50. More particularly, when the associated ring key is thus operated, direct battery potential is applied to the line conductor C397 of the trunk 395 completing a low resistance circuit, including the contacts 484, for energizing the winding of the re-ring relay R400 in series with the winding of the pad control relay R690, causing the marginal re-ring relay R400 to operate.

Upon operating, the re-ring relay R400 prepares, at the contacts 402, a circuit for operating the supervisory pulse relay R660, which circuit is completed, at the contacts 624, when the signal-in relay R620 occupies its restored position during intermittent operation thereof; the circuit mentioned extending from ground by way of the contacts 533, 402, 634 and 624 and the winding of R660 to battery. Upon operating, the supervisory pulse relay R660 completes, at the contacts 664, the previously traced multiple circuit for energizing the upper winding of the prepare relay R670 and the winding of the series relay R410, in order to cause the relays mentioned to reoperate. Also, the supervisory pulse relay R660 completes, at the contacts 663, the previously mentioned circuit for operating the send relay R675; and completes, at the contacts 661, the previously traced circuit for operating the control relay R505. Also, the operated series relay R410 completes, at the contacts 412, the previously traced holding circuit for energizing the lower winding of the prepare relay R670. Accordingly, the series relay R410, being of the slow-to-release type, and the prepare relay R670, maintained operated thereby, are retained in their operated positions during a plurality of cycles of restoration and subsequent reoperation of the supervisory pulse relay R660, as explained more fully below. Upon reoperating, the prepare relay R670 interrupts, at the contacts 673, the previously mentioned path for applying ground potential to the receiving switch conductor C607, thereby to condition the tone unit 601 to send 60 cycle modulated 1000 cycle current over the sending −conductor C601 and the sending +conductor C602, in the manner previously explained. Upon operating, the send relay R675 effectively connects the tone unit 601 to the toll line 702, whereby a pulse of 60 cycle modulated 1000 cycle current is sent thereover. Upon operating, the control relay R505 completes, at the contacts 508, the previously traced circuit for operating shortly thereafter the inter-pulse timer relay R630, the latter relay being of the slow-to-operate type. Upon operating, the inter-pulse timer relay R630 interrupts, at the contacts 634, the previously traced circuit for maintaining operated the supervisory pulse relay R660, thereby to cause the latter relay to restore shortly thereafter, effecting the restoration of the send relay R675 and the control relay R505. Upon restoring, the control relay R505 effects the restoration of the inter-pulse timer relay R630; which, upon restoring, effects reoperation of the suppervisory pulse relay R660, thereby to initiate another cycle of operation of the relays mentioned. This cycling of the relays mentioned, including the supervisory pulse relay R660, continues so long as the re-ring relay R400 is retained in its operated position; which, in turn, is retained in its operated position so long as the ring key at the first operator position circuit 316 is retained in its operated position. The cycling of the relays mentioned, including the supervisory pulse relay R660, effects intermittent operation of the send relay R675, whereby the tone unit 601 is effectively connected to and disconnected from the toll line 702 repeatedly, causing corresponding pulses of 60 cycled modulated 1000 cycle current to be transmitted over the toll line 702; which series constitutes a re-ring signal.

This re-ring signal transmitted over the toll line 702 is received by the tone unit 701; thereby to cause ground potential to be applied intermittently to the signal-in conductor C709 extending therefrom in order to bring about corresponding intermittent operation of the signal-in relay R870 in the repeater circuit 700. Upon operating the signal-in relay R870 completes at the contacts 875, the previously traced circuit for operating the control relay R930; which latter relay upon operating completes, at the contacts 931, the previously traced circuit for operating the control relay R950. The signal-in relay R870 then restores, interrupting, at the contacts 876, the previously traced circuit for operating the control relay R930, in order to cause the latter relay to restore shortly thereafter, it being of the slow-to-release type. Upon restoring the control relay R930 interrupts, at the contacts 931, the previously traced circuit for maintaining operated the control relay R950; thereby to cause the latter relay to restore shortly thereafter, it being of the slow-to-release type. Also upon restoring the control relay R930 completes, at the contacts 932, prior to the restoration of the control relay R950, the previously traced circuit for operating the ring relay R960. Upon operating the ring relay R960 completes, at the contacts 964, a holding circuit therefor, including the contacts 844. Also the ring relay R960 completes, at the contacts 962, the previously traced connection between the line conductor C1371 of the trunk 1370 extending to the automatic switch train 1300 and the ring conductor C1106, having interrupted ring battery potential applied thereto; whereby the automatic switch train 1300 is controlled in order again to project ringing current over the subscriber line 1301 to the called subscriber substation T4 in the automatic exchange 50. The automatic switch train 1300 continues to project ringing current over the subscriber line 1301 to the called subscriber substation T4 until the subscriber thereat again answers the call by removing the receiver of the telephone instrument thereat from its associated switch hook or until the operator at the first position circuit 316 at the Strowger dial toll board in the automatic exchange 30 releases the connection.

When the operator at the first position circuit 316 at the Strowger dial toll board in the automatic exchange 30 restores the ring key thereat, low resistance battery potential is disconnected from the line conductor C397 of the trunk 395, bringing about the restoration of the marginal re-ring relay R400; the pad control relay R690 being retained in its operative position by the application of high resistance battery potential in the position equipment to the line conductor C397 of the trunk 395. Upon restoring the re-ring relay R400 interrupts, at the contacts 402, the previously traced circuit for operating the supervisory pulse relay R660 in order to cause the latter relay to restore and bring about the restoration of the send relay R675 and the control relay R505. Shortly after the restoration of the supervisory pulse relay R660, the series relay R410 restores, effecting the restoration of the prepare relay R670, in the manner previously explained. Upon restoring, the prepare relay R670 recompletes, at the contacts 673, the previously mentioned path for applying ground potential to the receiving switch conductor C607, thereby to effect reoperation of the receiving switch relay in the tone unit 601 and the consequent reconditioning of the tone unit 601 to be responsive to signals transmitted over the toll line 702. At this time in the event the subscriber at the called subscriber substation T4 in the automatic exchange 50 has not re-answered the call, as a consequence of receiving a re-ring signal, the repeater circuit 700 continues operation to send the disconnect signal over the toll line 702 and, consequently, to the tone unit 601, effecting intermittent operation of the signal-in relay R620, in the repeater circuit 400 in the manner previously explained. The intermittent operation of the signal-in relay R620 again effects intermittent operation of the supervisory relay R530 and the consequent flashing of the call supervisory lamp at the first operator position circuit 316 in order to continue to render to the operator thereat the disconnect supervision.

When the subscriber at the called subscriber substation T4 in the automatic exchange 50 again answers the call by removing the receiver of the telephone instrument thereat from its associated switch hook, the automatic switch train 1300 again operates to interrupt the projection of ringing current over the subscriber line 1301 extending thereto and to interrupt the application of intermittent direct ground potential upon the control conductor C1373 of the trunk 1370; and again to increase the resistance included in the path for applying ground potential to the control conductor C1373 of the trunk 1370; whereby the supervisory relay R840 restores to arrest the cycle of operation of the relays previously mentioned in the repeater circuit 700 that are causing the transmission of the disconnect signal over the toll line 702 in the manner previously explained. When the disconnect signal is thus removed from the toll line 702, the tone unit 601 brings about the restoration of the signal-in relay R620 in the repeater circuit 400 and the consequent restoration of the supervisory relay R530; thereby to extinguish the call supervisory lamp at the first operator position circuit 316 at the Strowger dial toll board in the automatic exchange 30; thereby again to render to the operator thereat answer supervision. At this time the operator at the first position circuit 316 may converse with the subscriber at the called subscriber substation T4 in the automatic exchange 50.

After the operator at the first position circuit 316 at the Strowger dial toll board in the automatic exchange 30 receives disconnect supervision, she may effect the release of the established connection by operating the associated release call key, thereby bringing about the release of the selector of the finder-selector link 315 and the outgoing toll selector 345. Of course, the operator at the first position circuit 316 may also operate the associated release answer key in order to bring about the release of the finder of the finder-selector link 315 and the connected incoming circuits to the automatic exchange 30; all in the manner previously explained. When the outgoing toll selector 345 is thus released, ground potential is removed from the control conductor C398 of the trunk 395, thereby to interrupt the previously traced holding circuit for energizing in series the upper and lower windings of the release relay R420, causing the latter relay to restore. Upon restoring, the release relay R420 completes, at the contacts 420, a circuit, including the contacts 444, for operating the supervisory pulse relay R660; and interrupts, at the contacts 426, the previously mentioned circuit for maintaining operated the release pulse relay R435. Upon operating, the supervisory pulse relay R660 effects operation of the control relay R505, the send relay R675 and the prepare relay R670, all in the manner previously explained. Upon operating, the prepare relay R670 interrupts, at the contacts 673, the application of ground potential to the receiving switch conductor C607, whereby the tone unit 601 is conditioned to send 60 cycle modulated 1000 cycle current over the toll line 702. Upon operating, the send relay R675 completes, at the contacts 678, the previously mentioned path for applying ground potential to the modulation cutoff conductor C608, in order to insure restoration of the modulation cutoff relay in the tone unit 601, and effectively to connect the tone unit 601 to the toll line 702, whereby the 60 cycle modulated 1000 cycle current is sent from the tone unit 601 over the toll line 702. Also, upon restoring, the release pulse timer relay R435 sets its armature RA436 into vibration, whereby the previously traced holding circuit for maintaining operated the release pulse timer relay R440 is alternately completed and interrupted at the contacts associated with the vibratory armature RA436. However, after a time interval of approximately two seconds the armature RA436 of the release pulse timer R435 settles down, effecting complete interruption of the holding circuit for maintaining operated the release pulse timer relay R440. Upon restoring, the release pulse timer relay R440 interrupts, at the contacts 444, the previously traced circuit for maintaining operated the supervisory pulse relay R660, in order to cause the latter relay to restore and bring about the restoration of the prepare relay R670, the send relay R675 and the control relay R505. When the send relay R675 is thus restored, it disconnects the tone unit 601 from the toll line 702, thereby terminating the long pulse of 60 cycle modulated 1000 cycle current, constituting a release signal. Finally, the release pulse timer relay R440 interrupts, at the contacts 441, the multiple holding circuits for maintaining operated the answer supervisory relay R490, the sequence relay R680, the switch-through relay R640, the answer supervisory relay R510, the line supervisory relay R480 and the pad cutout relay R600. Accordingly, at this time only the incoming release R460 in the repeater circuit 400 occupies its operated position, whereby the repeater circuit 400 is completely released. Also, at this time battery potential is applied by way of the previously traced path, including the upper winding of the release relay R420, to the control conductor C398 of the trunk 395; thereby marking the trunk 395 and, consequently, the repeater circuit 400 as idle to the outgoing toll selectors 345, etc., having access thereto.

This release signal sent over the toll line 702 is received by the tone unit 701 and brings about continuous operation of the signal-in relay R870 in the repeater circuit 700 for a corresponding time interval of approximately two seconds; the release signal being in the form of a 60 cycle modulated 1000 cycle pulse of current of a time duration of approximately two seconds. Upon operating the signal-in relay R870 completes, at the contacts 873, a multiple path for applying ground potential to the busy conductor C1110; and interrupts, at the contacts 872, a further point in the previously traced circuit for operating the supervisory start relay R850; thereby causing the latter relay to restore shortly thereafter in the special event that it is operated at this time as a consequence of intermittent operation of the supervisory relay R840 resulting from a disconnect signal received from the automatic switch train 1300 when the subscriber at the called subscriber substation T4 in the automatic exchange 50 replaced the receiver of the telephone instrument thereat upon its associated switch hook. Accordingly, upon restoring the supervisory start relay R850 prevents further operation of the relays mentioned in the repeater circuit 700 to control operation of the tone unit 701 to return the disconnect signal over the toll line 702; all in the manner previously explained. Further, the signal-in relay R870 completes, at the contacts 875, the previously mentioned circuit for operating shortly thereafter the cutoff relay R760; and completes, at the contacts 876, the previously traced circuit for operating the control relay R930. Also the signal-in relay R870 interrupts, at the contacts 874, the previously mentioned circuit for maintaining operated the incoming release relay R920; thereby to cause the latter relay to restore shortly thereafter since it is of the slow-to-release type. At this point, it is again noted that the incoming release relay R920 is caused to restore at this time as a consequence of the signal-in relay R870 being maintained operated for approximately two seconds as a result of the tone unit 701 receiving the release signal over the toll line 702. Upon restoring the incoming release relay R920 interrupts, at the contacts 922, the previously traced circuit for maintaining operated the selector seize relay R890. Upon restoring the selector seize relay R890 interrupts, at the contacts 892, the original path for applying ground potential to the busy conductor C1110; whereby at this time, ground potential is applied to the busy conductor C1110 only at the contacts 873 of the operated signal-in relay R870.

At the conclusion of the release signal the signal-in relay R870 restores interrupting, at the contacts 873, the previously mentioned alternate path for applying ground potential to the busy conductor C1110; whereby the holding circuits for maintaining operated the following relays are interrupted; the sequence relay R970, the switch over relay R910, the switch through relay R740, the pad cutout relay R710, the switch release relays R1260 and R1270, and the register sender supervisory relay R1140. Upon restoring the sequence relay R970 recompletes, at the contacts 975, the previously traced path, including the contacts 897, for applying ground potential by way of the lower winding of the sleeve relay R1070 to the sleeve conductor C1385 of the trunk 1380 extending to the jacks J1314, etc., at the various operator positions at the manual dial toll board in the automatic exchange 50; whereby the trunk 1380 and, consequently, the repeater circuit 700 is marked as idle to the operator positions mentioned. Also, when the selector seize relay R890 restores, ground potential is removed, at the contacts 891, from the lamp conductor C1107, thereby to interrupt the circuit for illuminating the incoming lamp L1331 on the display panel 1330 and the previously traced multiple circuit for illuminating the call to automatic exchange lamp L1332 on the display panel 1330. Moreover, when ground potential is removed from the busy conductor C1110, the previously traced circuit for illuminating the busy-in-out lamp L1334 on the display panel 1330 is interrupted. Upon restoring the switch release relay R1270 interrupts, at the contacts 1272, the previously traced circuit for operating the visible signal or drop D1317 assocated with the operator positions at the manual dial toll board mentioned. When the lamps noted on the display panel 1330, associated with the manual dial toll board in the automatic exchange 50 are thus extinguished, it indicates to the operators thereat that the repeater circuit 700 is idle at this time and that access may be had thereto by way of the associated trunk 1380. In passing, it is noted that when the selector seize relay R890 in the repeater circuit 700 restores, it interrupts, at the contacts 890, the previously traced path for applying 24 volt battery potential by way of the resistor 884 to the seize conductor C1103, and, consequently, to the control conductor C1373 of the trunk 1370; thereby to bring about the release of the automatic switch train 1300; whereby the subscriber line 1301 extending to the called subscriber substation T4 is marked as idle to the switch train 1300.

At this time all of the apparatus involved in the established connection between the first operator position circuit 316 at the Strowger dial toll board in the automatic exchange 30 and the called subscriber substation T4 in the automatic exchange 50 is completely released and available for further use.

In view of the foregoing description of the repeater circuit 400, it will be understood that the impedance network including the condenser 692 and the resistor 693 is normally connected across the line conductors of the toll line 702 when the repeater circuit 400 is idle; that this impedance network is connected in series between the toll line 702 and the sending conductors C601 and C602 extending to the tone unit 601 when the tone unit 601 is in sending condition; and that this impedance network is disconnected from across the line conductors of the toll line 702 when the connection is established thereover.

*A call from Sao Paulo to Campos*

Assuming that a call has been extended to the first operator position circuit 316 at the Strowger dial toll board in the automatic exchange 30 in San Paulo, that is to be extended to a subscriber substation in the manual exchange 60 in Campos, the call may have been routed to the first operator position circuit 316 via the finder of the finder-selector link 315; whereupon the operator mentioned dials the first two digits 4 and 6 assigned to the automatic exchange 50 in Rio De Janeiro, and then the single digit 0 indicating the call is to be routed first to an inward operator position at the manual dial toll board in the automatic exchange 50. Now assume that the selector of the finder-selector link 315 operates to select the trunk 346 extending to the outgoing toll selector 345, and that the outgoing toll selector 345 operates to select the trunk 395 extending to the repeater circuit 400 terminating the toll line 702 extending between the automatic exchange 30 and the automatic exchange 50. When the outgoing toll selector 345 operates to seize the trunk 395, the repeater circuit 400 operates to transmit a seizing signal over the toll line 702, thereby to cause the repeater circuit 700 to respond and become connected by way of the cable 1410 and the preselector 1403 to an idle one of the coders, such for example, as the coder 1404; the coder 1404 having been previously selected via the cable 1420 by the preselector 1403; all in the manner previously explained. At this time the repeater circuit 700 is conditioned to be responsive to the digit 0; and the first digit storage device DS1 in the coder 1404 is conditioned to store the digit 0 repeated thereto by the repeater circuit 700; all in the manner previously explained. More particularly, when the digit 0 is dialed at the first operator position circuit 316 at the Strowger dial toll board in the automatic exchange 30, the line relay R430 in the repeater circuit 400 follows, causing the tone unit 601 to transmit a corresponding series of unmodulated pulses of 1000 cycle current over the toll line 702, and constituting a dialing signal. This dialing signal is received over the toll line 702 by the tone unit 701 and controls the dial-in relay R880 in the repeater circuit 700; whereby the dial-in relay R880 repeats, at the contacts 881, a corresponding series of ground impulses over the pulse conductor C1413 in the cable 1410 extending to the preselector 1403; and thence over the pulse conductor C1421 in the cable 1420 extending from the preselector 1403 and the contacts 1431 to the coder 1404; whereby the coder 1404 responds to the impulses of the digit 0 in order to cause registration thereof in the first digit storage device DS1. More particularly, the digit 0 is registered in the first digit storage device DS1 by the operation of the relay D; whereby there is completed, at the contacts 1440 of the operated relay D, a circuit including the contacts 1442 of the restored relay C, the contacts 1443 of the restored relay A, and the resistor 1444 for energizing the upper winding of the transfer control relay R1430 in order to cause the latter relay to operate. Upon operating the transfer control relay R1430 completes, at the contacts 1433, a holding circuit indicated for energizing the lower winding thereof; and interrupts, at the contacts 1431, the previously traced connection between the pulse conductor C1421 in the cable 1420 and the receiving portion of the coder 1404. Finally, the transfer control relay R1430 completes, at the contacts 1432, a path including the 1450 ohms marking resistor for applying +60 volts battery potential to the pulse conductor C1421, and consequently, by way of the preselector 1403 to the pulse conductor C1413 in the cable 1410. This application of +60 volt battery potential upon the pulse conductor C1413 in the cable 1410 completes a circuit, including the contacts 942, 911, 881, 862, 945 and 891, for energizing the lower winding of the loop test relay R860 in the reverse direction, with respect to normal energization thereof; whereby the loop test relay R860 is restored immediately, notwithstanding the completed holding circuit for energizing the upper winding thereof, brought about by the operated position of the series relay R1050 prior to restoration of the latter relay at the conclusion of the digit 0. Shortly after operation of the transfer control relay R1430 in the coder 1404, the coder 1404 is released since it is not to be utilized in the extension of the present connection.

Upon restoring the loop test relay R860 interrupts, at the contacts 862, the above traced circuit for energizing the lower winding thereof; and interrupts, at the contacts 863, the previously traced multiple circuits for energizing the winding of the coder seizing relay R940 and the lower winding of the auxiliary relay R780 in order to cause the relays mentioned to restore. By this time the series relay R1050 in the repeater circuit 700 has restored following the conclusion of the digit 0, interrupting, at the contacts 1051, the previously traced holding circuit for energizing the upper winding of the loop test relay R860; whereby the loop test relay R860 is retained in its restored position. Further, upon restoring the loop test relay R860 completes, at the contacts 861, an obvious path between the pulse conductor C1413 in the cable 1410 and the ring-down conductor C1105; whereby the +60 volts battery potential on the pulse conductor C1413 is applied to the ring-down conductor C1105, completing an obvious series circuit for operating the transfer relays R1110 and R1120. Finally, the loop test relay R860 interrupts, at the contacts 864, the previously mentioned path for applying ground potential to the pulse cut-in conductor C711 extending to the tone unit 701; thereby to bring about restoration, shortly thereafter, of the pulse cut-in relay in the tone unit 701, preventing further response thereof to dialing signals. Upon operating the transfer relay R1120 completes, at the contacts 1125, an obvious connection between the ground lamp conductor C1107 and the ring-down conductor C1105; thereby to complete a holding circuit for maintaining operated the transfer relays R1120 and R1110; and to complete a multiple circuit for energizing in series the winding of the re-ring relay R1210 and the winding of the control relay R1150, in order to cause the relays mentioned to operate. Also the transfer relay R1120 interrupts, at the contacts 1126, the previously mentioned connection between the ring conductor C1106 and the interrupter ringing battery conductor C1134. Also the transfer relay R1120 completes, at the contacts 1123, a path, including the contacts 1231, for applying ground potential to the supervisory conductor C1104; thereby to complete the previously traced circuit for energizing the lower winding of the supervisory relay R840 in order to cause the latter relay to operate. Further, the transfer relay R1120 interrupts at the contacts 1121, the previously traced path for applying 24 volts battery on the seizure conductor C1103 to the control conductor C1373 of the trunk 1370; thereby to bring about the release of the automatic switch train 1300. Further, the transfer relay R1120 completes, at the contacts 1122, an obvious circuit including the seizure conductor C1103, having 24 volts battery potential thereon, for illuminating the inward position lamp L1330 on the display panel 1330. When the inward position lamp L1330 on the display panel 1330 is thus illuminated, it indicates to the operators at the various inward positions at the manual dial toll board in the automatic exchange 50 that the connection between the repeater circuit 700 and the automatic switch train 1300 has been interrupted and that the repeater circuit 700 is now connected to the trunk 1380, terminating in the jacks J1314, etc., appearing before the various positions at the manual dial toll board mentioned.

Upon operating the transfer relay R1110 interrupts, at the contacts 1111 and 1113, further points in the previously traced connection between the repeater circuit 700 and the line conductors C1371 and C1372 of the trunk 1370 extending to the automatic switch train 1300; and prepares, at the contacts 1112 and 1114, further points in a connection traced hereinafter between the repeater circuit 700 and the line conductors C1381 and C1382 of the trunk 1380 extending to the jacks J1314, etc., previously mentioned. Also, the transfer relay R1110 completes, at the contacts 1116, a path for applying ground potential by way of the winding of the sleeve relay R1220 and the contacts 1251 to the sleeve conductor C1385 of the trunk 1380 extending to the jacks J1314, etc. Also at the contacts 1116 the transfer relay R1110 completes a direct path for applying ground potential by way of the winding of the sleeve relay R1220 to the sleeve conductor C1387 of the trunk 1380 terminating in the jacks J1351, etc., at the various transfer operator position circuits 1350, etc., at the manual dial toll board mentioned. When the auxiliary relay R780 restores in the manner previously explained, it interrupts, at the contacts 783, the previously traced holding circuit for maintaining operated the control relay R930. The control relay R930 restores shortly thereafter, it being of the slow-to-release type, to interrupt, at the contacts 931, the previously traced circuit for maintaining operated the control relay R950 in order to cause the latter relay to restore shortly thereafter, it being of the slow-to-release type. Also the control relay R930 upon restoring completes, at the contacts 932, a path including the contacts 891' and 963, for applying ground potential to the re-ring control conductor C1102; and a substantially identical multiple circuit, including the contacts 916, for applying ground potential to the coder release conductor C1108. This application of ground potential to the re-ring control conductor C1102 completes a circuit, including the contacts 1115 and 1234, for energizing the lower winding of the signal relay R1240 in order to cause the latter relay to operate; and this application of ground potential to the coder release conductor C1108 completes an obvious circuit for operating the coder supervisory relay R1130. Upon operating the signal relay R1240 completes, at the contacts 1241, a holding circuit including the contacts 1231, the conductor C1386 and the contacts 1272 for energizing the upper winding thereof. Also the signal relay R1240 completes, at the contacts 1242, a circuit, including the contacts 1236 and 1254 and the lamp conductor C1383, for illuminating the inward line lamp L1318, etc., respectively associated with the jacks J1314, etc., terminating the trunk 1380 and disposed at the various inward operator positions at the manual dial toll board mentioned.

Upon operating the coder supervisory relay R1130 completes, at the contacts 1133, a path, including the contacts 1143 and 1151, between the grounded lamp conductor C1107 and the supervisory conductor C1104; thereby to complete a multiple holding circuit for energizing the lower winding of the supervisory relay R840. Upon operating the supervisory relay R840 completes, at the contacts 842, the previously traced alternative circuit for operating the supervisory start relay R850; and completes, at the contacts 844, the previously traced circuit for operating the ring relay R960. Upon operating the supervisory start relay R850 effects operation of the send relay R730 and the prepare relay R750; the prepare relay R750 effects operation of the control relay R820; the control relay R820 effects operation of the cutoff relay R760 and the series relay R1050; the cutoff relay R760 effects restoration of the supervisory start relay R850, the supervisory start relay R850 effects restoration of the send relay R730 and the prepare relay R750; the prepare relay R750 effects restoration of the control relay R820; and the control relay R820 effects restoration of the cutoff relay R760 and the series relay R1050; all in the manner previously explained. During the short time interval that the send relay R730 and the prepare relay R750 occupy their operated positions, the tone unit 701 is operatively connected to the toll line 702 and is effective to transmit a splash of 60 cycle modulated 1000 cycle current thereover, constituting a completion supervisory signal. Also, when the prepare relay R750 operates as described above, it completes, at the contacts 753, the previously traced circuit for energizing the lower winding of the sequence relay R970; thereby to cause the latter relay to operate and complete, at the contacts 972, the previously traced holding circuit for energizing the upper winding thereof. Also the sequence relay completes, at the contacts 972, the previously traced circuit for operating the switch-over relay R910. Upon operating the switch-over relay R910 completes, at the contacts 915, the previously traced holding circuit for maintaining it operated; and prepares, in the contacts 912 and 913, a connection, traced hereinafter, between the toll line 702 and the line conductors C1381 and C1382 of the trunk 1380 terminating at the jacks J1314, etc. Also upon operating and then restoring, the control relay R820 completes and then interrupts, at the contacts 822, the previously traced circuit for energizing in multiple the upper and lower winding of the end-of-dial relay R830; thereby to effect operation of the latter relay in the manner previously explained. Upon operating the end-of-dial relay R830 completes, at the contacts 831, the previously traced circuits for operating the switch-through relay R740, and the supervisory relay R1040. Upon operating the switch-through relay R740 completes, at the contacts 748, the previously traced holding circuit for maintaining it operated; and completes, at the contacts 742 and 743, a connection, traced hereinafter, between the toll line 702 and the trunk 1380. Upon operating the supervisory relay R1040 completes, at the contacts 1042, the previously mentioned path between the grounded busy conductor C1110 and the supervisory lamp conductor C1109; thereby to effect illumination of the supervisory lamp L1333 on the display panel 1330. At this time the line conductor C1381 of the trunk 1380 is connected by way of the contacts 1112, 961, 943, 912, 761, 751, 742, and 711 to one of the line conductors of the toll line 702; and the line conductor C1382 of the trunk 1380 is connected by way of the contacts 1114, 946, 913, 752, 743, and 713 to the other line conductor of the toll line 702.

The completion supervisory signal transmitted over the toll line 702 is received by the tone unit 601; thereby to bring about the operation and the subsequent restoration of the signal-in relay R620 in the repeater circuit 400; whereby the supervisory control relay R520 and then the supervisory relay R530 are operated. Upon operating the supervisory relay R530 effects illumination of the call supervisory lamp at the first operator position circuit 316 at the Strowger dial toll board in the automatic exchange 30 in order to render to the operator thereat completion supervision; all in the manner previously explained.

At this time the inward lamp L1330, the incoming lamp L1331, the supervisory lamp L1333 and the busy in-out lamp L1334 on the display panel 1330 are eliminated; also the inward line lamps L1318, etc., are illuminated and the drop D1317 is operated; thereby to indicate the conditions previously noted to the operators at the various positions at the manual dial toll board in the automatic exchange 50. Specifically, the illumination of the inward line lamps L1318, etc., respectively associated with the jacks J1314, etc., indicate to the operators noted that a call is waiting to be answered on the trunk 1380; and the operator at an idle inward position at the manual dial toll board mentioned selects an idle cord circuit and proceeds to answer the call. For example, the operator at the first inward position at the manual dial toll board mentioned may answer the call and may select the cord circuit 1310 for this purpose; whereupon the answer plug 1311 thereof is inserted into the jack J1314 terminating the trunk 1380; thereby to complete a circuit, including the contacts 1116 and 1251, and the sleeves of the jack J1314 and the answer plug 1311 for energizing in series circuit relation the sleeve relay R1220 in the repeater circuit 700 and the supervisory relay R1340 in the cord circuit 1310; whereby the sleeve relay R1220 operates; however, the supervisory relay R1340 does not operate due to the high series resistance of the winding of the sleeve relay R1220. Upon operating the sleeve relay R1220 completes, at the contacts 1221, an obvious circuit for operating the cutoff relay R1230. Upon operating the cutoff relay R1230 interrupts, at the contacts 1236, the previously traced path for applying 24 volts battery potential to the lamp conductor C1383; thereby to extinguish the line lamps L1318, etc., in order to indicate to the other inward operator positions at the manual dial toll board mentioned that the call on the trunk 1380 has been answered at the first inward operator position thereat. Also the cutoff relay R1230 interrupts, at the contacts 1231, the previously traced holding circuit for energizing the upper winding of the signal relay R1240; thereby to cause the latter relay to restore shortly thereafter, it being of the slow-to-release type. Also the cutoff relay R1230 interrupts, at the contacts 1231, the previously traced path for applying ground potential to the supervisory conductor C1104; thereby to interrupt the previously traced circuit for energizing the lower winding of the supervisory relay R840 in order to cause the latter relay to restore. Upon restoring the supervisory relay R840 completes, at the contacts 843, the previously traced alternative circuit for operating the supervisory start relay R850. Upon operating the supervisory start relay R850 initiates a cycle of operation of the relays in the repeater circuit 700, and including the send relay R730 and the prepare relay R750; whereby the relays mentioned operate through a cycle in the manner previously explained in order to cause the tone unit 701 to send a splash of 60 cycle modulated 1000 cycle current over the toll line 702, and constituting an answer signal. The tone unit 601 responds to this answer signal sent over the toll line 702; thereby to effect operation and then restoration of the signal-in relay R620 in the repeater circuit 400, and the consequent operation of the answer supervisory relay R510; whereby the supervisory relay R530 is restored shortly thereafter; all in the manner previously explained. Upon restoring the supervisory relay R530 effect extinguishing of the call supervisory lamp at the first operator position circuit 316 at the Strowger dial toll board in the automatic exchange 30; thereby to render to the operator thereat answer supervision.

At this time an established connection is completed between the first operator position circuit 316 at the Strowger dial toll board in the automatic exchange 30 and the first inward operator position at the manual dial toll board in the automatic exchange 50; and when the operator at the first inward operator position at the manual dial toll board mentioned learns that the call is to be extended to a particular called subscriber substation in the manual exchange 60 in Campos, she inserts the call plug 1312 of the cord circuit 1310 into a jack terminating an idle toll trunk circuit, such for example, as the jack J1313 terminating the toll trunk circuit 1317. The call is then extended over the toll line 1361 to the manual toll board 1320 in the manual exchange 60. After the call is passed to the operator at the manual toll board 1320 in the manual exchange 60, she completes the connection to the called subscriber substation in the manual exchange 60 and disconnects from the established connection. The operator at the first inward position at the manual dial toll board in the automatic exchange 50 then disconnects from the established connection; whereupon the operator at the first position circuit 316 at the Strowger dial toll board in the automatic exchange 30 disconnects from the established connection. At this time the established connection is completed between the incoming circuit to the automatic exchange 30 and the called subscriber substation in the manual exchange 60.

At the conclusion of the established connection the operator at the first inward position circuit at the manual dial toll board in the automatic exchange 50 takes down the connection by withdrawing the call plug 1312 from the jack J1313 and by withdrawing the answer plug 1311 from the jack J1314. When the call plug 1312 is withdrawn from the jack J1313, the operator at the manual toll board 1320 in the manual exchange 60 takes down the connection to the called subscriber substation in the manual exchange 60 as well as the connection to the toll line 1361 extending between the manual exchange 60 and the automatic exchange 50. When the answer plug 1311 is removed from the jack J1314, the previously traced circuit for energizing in series, the winding of the supervisory relay R1340 in the cord circuit 1310 and the winding of the sleeve relay R1220 in the repeater circuit 700 is interrupted; whereby the sleeve relay R1220 restores interrupting, at the contacts 1221, the circuit for maintaining operated the cutoff relay R1230. Upon restoring the cutoff relay R1230 recompletes, at the contacts 1231, the previously traced path for applying ground potential to the supervisory conductor C1104; thereby to complete the previously traced circuit for energizing the lower winding of the supervisory relay R840. The supervisory relay R840 then operates in order to bring about a cycle of operation of the relays mentioned in the trunk circuit 700, and including the send relay R730 and the prepare relay R750; whereby the relays mentioned cause the tone unit 701 to transmit a splash of 60 cycle modulated 1000 cycle current over the toll line 702, and constituting a disconnect signal. This disconnect signal sent over the toll line 702 is received by the tone unit 601 in order to cause operation and subsequent restoration of the signal-in relay R620 in the repeater circuit 400; whereby the supervisory relay R530 is reoperated in order to bring about illumination of the call supervisory lamp at the first operator position circuit 316 at the Strowger dial toll board in the automatic exchange 30; thereby to render to the operator thereat disconnect supervision. At this time the operator at the first operator position circuit 316 at the Strowger dial toll board in the automatic exchange 30 proceeds to re-ring the first inward position at the manual dial toll board in the automatic exchange 50 or to release the established connection, as explained more fully hereinafter.

Reconsidering the extension of the above described call from the first operator position circuit 316 at the Strowger dial toll board in the automatic exchange 30 by way of the toll line 702 to an inward operator position at the manual dial toll board in the automatic exchange 50, it was assumed that when the repeater circuit 700 operated to switch through to the trunk 1380 extending to the jacks J1314, etc., at the various operator positions at the manual dial toll board mentioned that all of the jacks J1314, etc., were unoccupied. However, it may occur that when the repeater circuit 700 operates to switch through to the trunk 1380, that one of the jacks J1314, etc., is occupied. For example, assuming at this time that the answer plug 1311 of the cord circuit 1310 at the first inward operator position at the manual dial toll board mentioned is inserted into the jack J1314 when the repeater circuit 700 switches through to the trunk 1380, the sleeve relay R1220 and the cutoff relay R1230 in the repeater circuit 700 occupy their operated positions. The operated sleeve relay R1220 retains completed, at the contacts 1221, the circuit for operating the cutoff relay R1230; and the operated cutoff relay R1230 retains completed, at the contacts 1232, a holding circuit including the contacts 1251 and the sleeves of the jack J1314 and the answer plug 1311 for energizing in series the winding of the sleeve relay R1220 in the repeater circuit 700 and the winding of the supervisory relay R1340 in the cord circuit 310; whereby the sleeve relay R1220 is retained in its operated position. Accordingly, incident to the switch-through of the repeater circuit 700 to the trunk 1380, the coder supervisory relay R1130 operates in the manner previously explained completing, at the contacts 1133, the previously traced path, including the contacts 1143 and 1151, for connecting the grounded lamp conductor C1107 to the supervisory conductor C1104; thereby to complete the previously traced circuit for operating the supervisory relay R840. Upon operating the supervisory relay R840 effects operation of the supervisory start relay R850; whereby the relays mentioned in the repeater circuit 700 operate through a cycle to cause a splash of 60 cycle modulated 1000 cycle current to be sent over the toll line 702, and constituting a completion supervisory signal; all in the manner previously explained. Subsequently, when the switchover relay R910 operates, it interrupts, at the contacts 916, the previously traced path for applying ground potential to the coder release conductor C1108; thereby to bring about the release of the coder supervisory relay R1130. Upon restoring the coder supervisory relay R1130 interrupts, at the contacts 1133, the previously traced connection between the grounded lamp conductor C1107 and the supervisory conductor C1104; and at this time the alternative normally completed path, including the contacts 1123 and 1231, for applying ground potential to the supervisory conductor C1104 is not completed by virtue of the operated position of the cutoff relay R1230. Hence, ground potential is removed from the supervisory conductor C1104 in order to cause the supervisory relay R840 to restore and recomplete, at the contacts 843, the previously traced alternative current for operating the supervisory start relay R850; whereby the relays mentioned in the repeater circuit 700 operate again to cause the tone unit 701 to transmit a splash of 60 cycle modulated 1000 cycle current over the toll line 702, and constituting an answer signal.

The tone unit 601 receives the completion supervisory signal over the toll line 702 in order to effect operation and then restoration of the signal-in relay R620 in the repeater circuit 400; whereby the supervisory relay R530 is operated to bring about the illumination of the call supervisory lamp at the first operator position circuit 316. The tone unit 601 then responds to the answer supervisory signal sent over the toll line 702 in order to cause operation and then restoration of the signal-in relay R620 in the repeater circuit 400; whereby the supervisory relay R530 is restored bringing about extinguishing of the call supervisory lamp at the first operator position circuit 316. The illumination and subsequent extinguishing of the call supervisory lamp at the first operator position circuit 316 renders to the operator thereat first completion supervision and then answer supervision. At this time, the repeater circuit 400 in the automatic exchange 30 and the repeater circuit 700 in the automatic exchange 50 are in the operated conditions previously explained; whereby a connection is again completed between the first operator position circuit 316 at the Strowger dial toll board in the automatic exchange 30 and the first inward operator position at the manual dial toll board in the automatic exchange 50.

Continuing with the established connection between the first operator position circuit 316 at the Strowger dial toll board in the automatic exchange 30 and the first inward operator position at the manual dial toll board in the automatic exchange 50, the operator at the first position circuit 316 mentioned may re-ring the operator at the first inward position mentioned during the continuance of the established connection. Specifically, the operator at the first position circuit 316 mentioned operates first the associated talk key and then the associated ring key; whereby the repeater circuit 400 is controlled in the manner previously explained to cause splashes of 60 cycle modulated 1000 cycle current to be transmitted from the tone unit 601 over the toll line 702; which series constitutes a re-ring signal. This re-ring signal transmitted over the toll line 702 is received by the tone unit 701; thereby to cause corresponding intermittent operation of the signal-in relay R870 in the repeater circuit 700. Upon operating the signal-in relay R870 completes, at the contacts 876, the previously traced circuit for operating the control relay R930. Upon operating the control relay R930 completes, at the contacts 931, the previously traced circuit for operating the control relay R950. When the signal-in relay R870 then restores, it interrupts, at the contacts 876, the previously traced circuit for maintaining operated the control relay R930; thereby to cause the latter relay to restore shortly thereafter, it being of the slow-to-release type. Upon restoring the control relay R930 interrupts, at the contacts 931, the previously traced circuit for maintaining operated the control relay R950; thereby to cause the latter relay to restore shortly thereafter, it being of the slow-to-release type. Also upon restoring the control relay R930 completes, at the contacts 932, the previously traced circuit including the contacts 951 of the operating control relay R950 for operating the ring relay R960; whereby the latter relay upon operating completes, at the contacts 963, the previously traced path, including the contacts 932 and 891', for applying ground potential to the re-ring control conductor C1102. Shortly thereafter, when the control relay R950 restores, it interrupts, at the contacts 951, the previously traced circuit for maintaining operated the ring relay R960 in order to cause the latter relay to restore shortly thereafter, it being of the slow-to-release type. Upon restoring the ring relay R960 interrupts, at the contacts 963, the above traced path for applying ground potential to the re-ring control conductor C1102. Accordingly, ground potential is first connected to and then disconnected from the re-ring control conductor C1102; thereby completing and then interrupting a path including the contacts 1115, the ring-down conductor C1105, the contacts 1125 and the grounded lamp conductor C1107 for short-circuiting the winding of the re-ring relay R1210 in order to cause the latter relay to restore. Upon restoring the re-ring relay R1210 completes, at the contacts 1212, a path, including the contacts 1116, for applying ground potential by way of the winding of the re-ring relay R1170 and the contacts 1162 and 1251 to the sleeve conductor C1305; whereby the re-ring relay R1170 and the sleeve relay R1220 in the repeater circuit 700 are energized in multiple with each other and in series with the supervisory relay R1340 in the cord circuit 1310, causing the re-ring relay R1170 to operate and causing the supervisory relay R1340 to operate since it is of the marginal type. Upon operating the supervisory relay R1340 completes, at the contacts 1341, an obvious circuit for illuminating the supervisory lamp L1342 in the cord circuit 1310. Also the re-ring relay R1170 completes, at the contacts 1172, a multiple holding circuit for energizing the winding thereof; and completes, at the contacts 1171, a path, including the contacts 1211, between the 120 I. P. M. conductor C1213 and the winding of the flash relay R1160; whereby the flash relay R1160 is operated and restored 120 times per minute. Each time the flash relay R1160 operates, it completes, at the contacts 1161, a holding circuit, including the contacts 1172, the resistor 1153 and 24 volts battery for maintaining operated the re-ring relay R1170; and interrupts, at the contacts 1162, the original circuit for energizing the winding of the re-ring relay R1170 in multiple with the sleeve relay R1220. Accordingly, the winding of the re-ring relay R1170 is connected and disconnected 120 times per minute in multiple with respect to the winding of the sleeve relay R1120; thereby correspondingly decreasing and increasing the series circuit resistance including the winding of the supervisory relay R1340 in the cord circuit 1310; whereby the supervisory relay R1340 follows, repeating at the contacts 1341, corresponding ground impulses to the supervisory lamp L1342. Hence, the supervisory lamp L1342 in the cord circuit 1310 is flashed 120 times per minute giving the operator at the first inward position at the manual dial toll board in the automtic exchange 50 corresponding flashing recall supervision.

When the operator at the first inward position at the manual dial toll board mentioned re-enters the connection, the resistance of the series circuit completed over the sleeves of the answer plug 1311 and the jack J1314 is materially increased effecting restoration of the supervisory relay R1340 in the cord circuit 1310 and the re-ring relay R1170 in the repeater circuit 700, since both the relays mentioned are of the marginal type. Upon restoring the re-ring relay R1170 interrupts, at the contacts 1172, the previously traced holding circuit for energizing the winding thereof in order to retain it restored. Also, upon restoring the re-ring relay R1170 interrupts, at the contacts 1171, the previously traced circuit for effecting intermittent operation of the flash relay R1160. By this time, the operator at the first position circuit 316 at the Strowger dial toll board in the automatic exchange 30 has restored the associated ring key; thereby to cause the repeater circuit 400 to arrest operation of the tone unit 601 to transmit over the toll line 702 the re-ring signal; whereby the tone unit 701 effects final restoration of the signal-in relay R870 in the repeater circuit 700. At this time, the connection is again established between the first operator position circuit 316 at the Strowger dial toll board in the automatic exchange 30 and the first operator position at the manual dial toll board in the automatic exchange 50.

Reconsidering re-ring control from the first operator position circuit 316 at the Strowger dial toll board in the automatic exchange 30, the operator at the first position circuit 316 mentioned may operate her associated ring key after receiving disconnect supervision over the established connection in the manner previously explained; whereby at this time, the operator at the first inward position at the manual dial toll board in the automatic exchange 50 has already taken down the connection to the trunk 1380 extending from the repeater circuit 700 in the manner previously explained. In this connection the repeater circuit 400 operates in conjunction with the tone unit 601 to transmit the re-ring signal over the toll line 702 in the manner explained above; whereby the tone unit 701 responds to the re-ring signal sent over the toll line 702 in order to effect intermittent operation of the signal-in relay R870 in the repeater circuit 700 as previously explained. The signal-in relay R870 effects operation of the control relay R930; which, in turn, effects operation of the control relay R950; the signal-in relay R870 then restores effecting restoration of the control relay R930; the control relay 930 restores effecting operation of the ring relay R960 and subsequent restoration of the control relay R950; upon restoring the control relay R950 effects restoration of the ring relay R960; all in the manner previously explained. Accordingly, ground potential is applied to and then interrupted from the re-ring control conductor C1102 in the manner previously explained, completing a circuit including the contacts 1115 and 1234 for energizing the lower winding of the signal relay R1240 in order to cause the latter relay to operate. Upon operating the signal relay R1240 completes, at the contacts 1241, the previously traced holding circuit for energizing the upper winding thereof; and completes, at the contacts 1242, the previously traced path for applying 24 volts battery potential to the lamp conductor C1383; thereby again to illuminate the inward line lamps L1318, etc., at the various inward operator positions at the manual dial toll board in the automatic exchange 50; thereby to indicate to the operators thereat that a call is waiting to be answered on the trunk 1380 extending from the repeater circuit 700. This recall on the trunk 1380 extending from the repeater circuit 700 is dealt with as a new call at the manual dial toll board mentioned and is answered at one of the inward operator positions thereat; all in the manner previously explained.

Reconsidering the established connection between the first operator position circuit 316 at the Strowger dial toll board in the automatic exchange 30 and the first inward operator position at the manual dial toll board in the automatic exchange 50, after answering the call the operator at the first inward position mentioned may desire to transfer the call to a transfer operator position at the manual dial toll board; and this is accomplished by operating the transfer key K1325 in the cord circuit 1310. When the transfer key K1325 is thus operated, battery potential is applied to the ring of the answer plug 1311, and consequently, by way of the ring of the jack J1314 to the line conductor C1382 of the trunk 1380 and thence by way of the contacts 1114, 946, 913, 752, and 743 to the receiving +conductor C706 and the connected transfer inward conductor C1101. This application of battery potential upon the transfer inward conductor C1101 completes a circuit, including the contacts 1117, for energizing the upper winding of the position transfer relay R1250 in the repeater circuit 700. When thus energized, the position transfer relay R1250 operates to complete, at the contacts 1252, a circuit including the grounded busy conductor C1110 for energizing the lower winding of the signal relay R1240; and interrupts, at the contacts 1251, the previously traced path for applying ground potential by way of the winding of the sleeve relay R1220 to the sleeve conductor C1385 extending to the sleeve of the jack J1314; thereby to cause the sleeve relay R1220 to restore. Upon operating the signal relay R1240, completes, at the contacts 1241, a path including the contacts 1272 and 1123, for applying 24 volts battery potential by way of the upper winding thereof to the supervisory conductor C1104; which is without effect at this time. Upon restoring the sleeve relay R1220 interrupts, at the contacts 1221, the previously mentioned circuit for maintaining operated the cutoff relay R1230; and upon restoring the cutoff relay R1230 completes, at the contacts 1231, the previously traced path for applying ground potential to the supervisory conductor C1104; whereby the previously traced holding circuit for energizing the upper winding of the signal relay R1240 is completed in multiple with the previously traced circuit for energizing the lower winding of the supervisory relay R840; whereby the signal relay R1240 is retained in its operated position and the supervisory relay R840 is operated. Also upon restoring the cutoff relay R1230 completes, at the contacts 1236, a path including the contacts 1242 and 1253 for applying 24 volts battery potential by way of the lower winding of the position transfer relay R1250 to the conductor C1388; whereby a series holding circuit is completed for energizing the lower winding of the position transfer relay R1250 and for illuminating in multiple the various line lamps L1352, etc., at the various transfer operator positions at the manual dial toll board mentioned. The illumination of the line lamps L1352, etc., indicate to the operators at the various transfer operator positions that a call answered at one of the inward operator positions at the manual dial toll board mentioned is being transferred thereto. Upon operating the supervisory relay R840 effects operation of the supervisory start relay R850; whereby the relays mentioned in the repeater circuit 700 effect operation of the tone unit 701 to send over the toll line 702 a series of splashes of 60 cycle modulated 1000 cycle current and constituting a transfer signal. This transfer signal is received over the toll line 702 by the tone unit 601 in order to cause intermittent operation of the signal-in relay R620 in the repeater circuit 400; whereby the supervisory relay R530 is alternately operated and restored effecting corresponding flashing of the call supervisory lamp at the first operator position circuit 316 at the Strowger dial toll board in the automatic exchange 30 in order to render to the operator thereat flashing transfer supervision.

When the operator at one of the transfer position circuits answers the call, such for example, as the operator at the first transfer position circuit 1350 at the manual dial toll board in the automatic exchange 50, the plug of an idle one of the cord circuits thereat is inserted into the jack J1351 terminating the trunk 1380; whereby battery potential in the cord circuit mentioned is applied by way of the sleeves of the plug thereof and the jack J1351 to the sleeve conductor C1387; thereby to complete a circuit substantially identical to that previously traced for reoperating the sleeve relay R1220 recomplates, at the contacts 1221, the previously mentioned circuit for operating the cutoff relay R1230. Upon operating the cutoff relay R1230 interrupts, at the contacts 1231, the previously traced path for applying ground potential to the supervisory conductor C1104 in order to effect the restoration of the supervisory relay R840 and the multiple holding circuit for energizing the upper winding of the signal relay R1240 in order to cause the latter relay to restore shortly thereafter, it being of the slow-to-release type. Upon restoring the signal relay R1240 interrupts, at the contacts 1242, the previously traced holding circuit for maintaining operated the position transfer relay R1250 and for illuminating the line lamps L1352, etc., at the various transfer operator positions at the manual dial toll board mentioned. It is assumed that the transfer key K1325 in the cord circuit 1310 at the first inward position at the manual dial toll board mentioned was operated only momentarily in order to complete the previously traced circuit for energizing the upper winding of the position transfer relay R1250; whereby the position transfer relay R1250 restores at this time. When the line lamps L1352, etc., at the various transfer operator positions at the manual dial toll board mentioned are thus extinguished, it indicates that the call on the trunk 1380 has been transferred to one of the transfer operator position circuits mentioned. When the supervisory relay R840 restores, it arrests cyclic operation of the relays mentioned in the repeater circuit 700 in order to terminate the transmission from the tone unit 701 over the toll line 702 of the transfer supervisory signal. The tone unit 601 then brings about final restoration of the signal-in relay R620 in the repeater circuit 400 in order to effect the restoration of the supervisory relay R530 and the consequent extinguishing of the call supervisory lamp at the first operator position circuit 316 at the Strowger dial toll board in the automatic exchange 30; thereby to indicate to the operator thereat that the connection has been completely transferred and has again been answered at one of the transfer operator positions at the manual dial toll board in the automatic exchange 50. At this time, an established connection is completed between the first operator position circuit 316 at the Strowger dial toll board in the automatic exchange 30 and the first transfer operator position circuit 1350 at the manual dial toll board in the automatic exchange 50; and the operator at the first inward position circuit at the manual dial toll board mentioned withdraws the answer plug 1311 of the cord circuit 1310 from the jack J1314 also terminating the trunk 1380. The supervision and the ultimate release of this established connection is the same as that involving the first inward operator position at the manual dial toll board in the automatic exchange 50.

At the conclusion of the established connection between the first operator position circuit 316 at the Strowger dial toll board in the automatic exchange 30 and the first inward operator position at the manual dial toll board in the automatic exchange 50, the operator at the first operator position circuit 316 mentioned operates the associated release call key; thereby bringing about the release of the selector of the finder-selector link 315 and the consequent release of the out-going toll selector 345; all in the manner previously explained. At this time the repeater circuit 400 is completely released and operates to transmit the release signal from the tone unit 601 over the toll line 702; thereby to cause the tone unit 701 to respond and bring about continued operation of the signal-in relay R870 in the repeater circuit 700 for a time duration of approximately two seconds; whereby the incoming release relay R920 is restored effecting restoration of the previously noted operated relays in the repeater circuit 700; all in the manner previously explained. At this time ground potential is removed from the lamp conductor C1107 effecting the release of the transfer relays R1110 and R1120, together with the re-ring relay R1210 and the control relay R1150. Upon restoring the re-ring relay R1210 completes, at the contacts 1212, a path including the contacts 1172 for energizing the winding of the re-ring relay R1170 in multiple with the winding of the sleeve relay R1220 and, in turn, in series with the winding of the supervisory relay R1340 in the cord circuit 1310; whereby both the re-ring relay R1170 and the supervisory relay R1340 operate since they are of the marginal type. Upon operating the supervisory relay R1340 completes, at the contacts 1341, the previously mentioned circuit for illuminating the supervisory lamp L1342; thereby to render to the operator at the first inward position at the manual dial toll board mentioned disconnect supervision. The operator at the first inward position mentioned then withdraws the answer plug 1311 of the cord circuit 1310 from the jack J1314; thereby to interrupt the previously traced circuit for maintaining operated the supervisory relay R1340 in the cord circuit 1310 and the re-ring relay R1170 and the sleeve relay R1220 in the repeater circuit 700. Upon restoring the sleeve relay R1220 interrupts, at the contacts 1221, the circuit for maintaining operated the cutoff relay R1230; whereby the repeater circuit 700 is completely released.

In passing it is noted that prior to the time the operator at the first inward position at the manual dial toll board mentioned withdraws the answer plug 1311 of the cord circuit 1310 from the jack J1314, the sleeve relay R1220 in the repeater circuit 700 is retained in its operated position; thereby to maintain interrupted, at the contacts 1222, a further point in a circuit traced hereinafter for energizing the lower winding of the sleeve relay R1070. This arrangement positively prevents operation of the sleeve relay R1070 prior to withdrawal of the answer plug 1311 of the cord circuit 1310 from the jack J1314 in order positively to prevent an outgoing call from being automatically initiated by the repeater circuit 700 over the toll line 702 as a consequence of the answer plug 1311 of the cord circuit 1310 remaining in the jack J1314 for the short time interval prior to the time that the operator at the first inward position at the manual dial toll board mentioned withdraws the answer plug 1311 of the cord circuit 1310 from the jack J1314 as described above.

At this time all of the apparatus involved in the established connection between the first operator position circuit 316 at the Strowger dial toll board in the automatic exchange 30 and the first inward operator position at the manual dial toll board in the automatic exchange 50 is completely released and available for further use.

*A call from Rio de Janeiro to Sao Paulo*

At the outset it is noted that calls to the automatic exchange 30 in Sao Paulo may be extended from both the inward operator positions and the outward operator positions at the manual dial toll board in the automatic exchange 50 in Rio de Janeiro, since the jacks J1314, etc., at the various inward operator positions mentioned are multiplied with the jack J1341, etc., at the various outward operator positions mentioned; the jacks J1314, etc., and J1341, etc., being connected to the trunk 1380 extending to the repeater circuit 700 terminating the toll line 702 extending between the automatic exchange 50 and the automatic exchange 30. Now assuming that a call has been extended to the first inward operator position at the manual dial toll board in the automatic exchange 50, that the call has been answered utilizing the answer plug 1311 of the cord circuit 1310 thereat, and that the call is to be extended to a subscriber substation in the automatic office 380 associated with the automatic exchange 30, both in Sao Paulo; the operator at the first inward position mentioned may insert the call plug 1312 of the cord circuit 1310 into the jack J1314 terminating the trunk 1380 extending to the repeater circuit 700. The operator at the first inward position mentioned knows that the trunk 1380 and, consequently, the repeater circuit 700 is idle by virtue of the extinguished condition of the busy in-out lamp L1334 on the display panel 1330 associated with the manual dial toll board mentioned. When the call plug 1312 of the cord circuit 1310 is thus inserted into the jack J1314, a circuit is completed for energizing the lower winding of the sleeve relay R1070 in the repeater circuit 700 in series with the winding of a supervisory relay in the cord circuit 1310 and associated with the call plug 1312; the series circuit mentioned extending from ground by way of the contacts 975, the lower winding of the sleeve relay R1070, the contacts 897, the sleeve conductor C1385 of the trunk 1380, the sleeve of the call plug 1312 and the winding of the supervisory relay, not shown, in the cord circuit 1310 to battery potential. When this series circuit is completed, the sleeve relay R1070 in the repeater circuit 700 operates; however, the supervisory relay in the cord circuit 1310 does not operate due to the high series resistance of the lower winding of the sleeve relay R1070.

Upon operating the sleeve relay R1070 completes, at the contacts 1072, an obvious circuit for operating the release pulse-timer relay R1030; and a multiple circuit, also including the contacts 747, for operating the start relay R1080. Upon operating the start relay R1080 completes, at the contacts 1087, a path including the contacts 988 for applying ground potential to the start conductor C1096 extending to the allotter 1405; thereby to cause the allotter 1405 to initiate operation of the previously selected idle finder circuit, such for example, as the finder circuit 1401. As previously noted, the finder circuit 1401 is connected to the individually associated register sender 1402; whereby the finder circuit 1401 operates at this time to find the cable 1090 extending to the calling repeater circuit 700; thereby operatively to connect the register sender 1402 to the repeater circuit 700 as explained more fully hereinafter. Also the start relay R1080 interrupts, at the contacts 1081 and 1083 further points in a connection traced hereinafter between the line conductors C1381 and C1382 of the trunk 1380 and the repeater circuit 700; and completes, at the contacts 1082 and 1084, connections between the line conductors C1381 and C1382 of the trunk 1380 and the code A conductor C1091 and the code B conductor C1092 in the cable 1090. Further, the start relay R1080 completes, at the contacts 1085, an obvious path for applying battery potential by way of the lower winding of the line relay R1060 to the pulse conductor C1094 in the cable 1090; and completes, at the contacts 1086, an obvious path for applying battery potential by way of the winding of the finder-stop relay R980 to the cutoff conductor C1095 in the cable 1090. Also a multiple path, including the contacts 741′ and 986, is completed, at the contacts 1086, for applying battery potential by way of the resistor 746′ to the cutoff conductor C1095 in the cable 1090. Finally the start relay R1080 completes, at the contacts 1088, a multiple circuit, including the contacts 921 for energizing the lower winding of the sleeve relay R1070 in the repeater circuit 700 in series with the supervisory relay, not shown, in the cord circuit 1310.

Upon operating the release pulse-timer relay R1030 sets its armature RA1031 into vibration and closes the contacts 1032; whereby the winding of the release pulse-timer relay R1010 is energized intermittently by the vibratory action of the armature RA1031, causing the release pulse-timer relay R1010 to operate shortly thereafter, the latter relay being of the slow-to-operate type. At this point it is noted that the incoming release relay R920 normally occupies is operated position, an operating circuit therefor including the contacts 874, being normally completed. Upon operating the release pulse-timer relay R1010 completes, at the contacts 1011, a holding circuit for energizing the winding thereof by way of the armature RA1031 of the release pulse-timer relay R1030; and completed, at the contacts 1015, an obvious path for applying ground potential to the busy conductor C1110. This application of ground potential to the busy conductor C1110 completes the previously traced circuit for operating the pad cut-out relay R710 and the previously traced multiple circuit for illuminating the busy in-out lamp L1334 on the display panel 1330 associated with the manual dial toll board mentioned. The illumination of the busy in-out lamp L1334 on the display panel 1330 indicates to the operators at the other positions at the manual dial toll board in the automatic exchange 50 that the trunk 1380 and, consequently, the repeater circuit 700 is busy at this time. Also, this application of ground potential to the busy conductor C1110 completes an obvious circuit for operating the monitor relay R990. Upon operating the monitor relay R990 interrupts, at the contacts 991 and 993, further points in a connection traced hereinafter between the trunk 1380 and the toll line 702; and prepares, at the contacts 992 and 994, a circuit traced hereinafter between the line conductors C1381 and C1382 of the trunk 1380 and the monitoring −conductor C703 and the monitoring +conductor C704 extending from the tone unit 701, for a purpose more fully explained hereinafter.

Further, the release pulse-timer relay R1010 completes, at the contacts 1012, a circuit including the contacts 971, 762 and 872, for operating the supervisory start relay R850. Upon operating the supervisory start relay R850 completes, at the contacts 852, the previously traced holding circuit for energizing the winding thereof; and completes, at the contacts 851, the previously traced circuit for operating the send relay R730. Also the supervisory start relay R850 completes, at the contacts 854, the previously traced circuit for energizing the lower winding of the prepare relay R750 in order to cause the latter relay to operate. Further, the supervisory start relay R850 prepares, at the contacts 854, a circuit traced hereinafter for operating the series relay R1050. Upon operating the prepare relay R750 interrupts, at the contacts 754, the previously traced path for applying ground potential to the receiving switch conductor C707 extending to the tone unit 701; thereby to condition the tone unit 701 to transmit 60 cycle modulated 1000 cycle current at this time. Also the prepare relay R750 completes, at the contacts 753, the previously traced circuit for energizing the lower winding of the sequence relay R970 in order to cause the latter relay to operate; and completes, at the contacts 753, the previously traced multiple circuit, including the contacts 853, for operating the control relay R820. Further, the prepare relay R750 interrupts, at the contacts 751 and 752, further points in a circuit traced hereinafter between the toll line 702 and the trunk 1380.

Upon operating the send relay R730 completes, at the contacts 734, the previously mentioned path for applying ground potential to the modulation cut off conductor C708 extending to the tone unit 701; thereby to insure that the modulation cutoff relay in the tone unit 701 is retained in its restored position, conditioning the tone unit 701 to send the 60 cycle modulated 1000 cycle current previously mentioned. Further, the send relay R730 interrupts, at the contacts 732, the previously mentioned normal connection between the sending −conductor C701 and the sending +conductor 702; and completes, at the contacts 731; an operating connection, including the resistor 722 and the condensor 723, as well as the contacts 711 and 713, between the sending −conductor C701 and the sending +conductor C702 and the line conductors of the toll line 702; whereby 60 cycle modulated 1000 cycle current is sent from the tone unit 701 over the toll line 702, and constituting a seizure signal. Upon operating the sequence relay R970 completes, at the contacts 972, a holding circuit, including the grounded busy conductor C1110, for energizing the upper winding thereof.

When the finder 1401 finds the cable 1090 extending to the repeater circuit 700, a loop circuit including the pulse conductors C1093 and C1094 in the cable 1090 is completed from the register sender 1402 connected to the finder circuit 1401 for energizing in series the upper and lower windings of the line relay R1060; thereby to cause the latter relay to operate. Also ground potential in the register sender 1402 is applied by way of the finder circuit 1401 to the cutoff conductor C1095 in the cable 1090, thereby to complete a circuit for operating the finder stop relay R980 in the repeater circuit 700. Upon operating the finder stop relay R980 completes, at the contacts 989, the previously mentioned circuit, including the contacts 854, for operating the series relay R1050. Also upon operating the sequence relay R970 completes, at the contacts 973, a path, including the contacts 985 and 741′, for applying battery potential by way of the resistor 746′ to the modulation cutoff conductor C708; which is without effect at this time by virtue of the application of direct ground potential at the contacts 734 of the operated send relay R730 to the modulation cutoff conductors C708. Upon operating the control relay R820 completes, at the contacts 821, the previously traced circuit for operating shortly thereafter the cutoff relay R760; which latter relay upon operating interrupts, at the contacts 762, the previously traced holding circuit for maintaining operated the supervisory start relay R850 in order to cause the latter relay to restore shortly thereafter, it being of the slow-to-release type. Upon restoring the supervisory start relay R850 effects the restoration of the prepare relay R750, the send relay R730 and the control relay R820; as well as restoration of the series relay R1050 shortly thereafter, all in the manner previously explained. Upon restoring the send relay R730 disconnects, at the contacts 731, the tone unit 701 from the toll line 702; and recompletes, at the contacts 732, the normal connection between the sending −conductor C701 and the sending +conductor C702 extending from the tone unit 701. Also, the send relay R730 interrupts, at the contacts 734, the previously mentioned path for applying direct ground potential to the modulation cutoff conductor C708; whereby battery potential by way of the previously traced path, including the resistor 746', is connected to the modulation cutoff conductor C708; thereby to bring about operation of the modulation cutoff relay in the tone unit 701 in order to condition the tone unit 701 to be operative to send unmodulated 1000 cycle current the next time it is seized for use.

Upon restoring the prepare relay R750 recompletes, at the contacts 754, the previously mentioned path for applying ground potential to the receiving switch conductor C707; thereby to place the tone unit 701 in receiving condition at this time. Upon restoring the control relay R820 also interrupts, at the contacts 821, the previously mentioned circuit for maintaining operated the cutoff relay R760; and upon restoring the cutoff relay R760 reprepares, at the contacts 762, an alternative circuit traced hereinafter for operating the supervisory start relay R850.

Also when the finder stop relay R980 operates, it interrupts, at the contacts 988, the previously mentioned path for applying ground potential to the start conductor C1096 extending from the repeater circuit 700 to the allotter 1405; and interrupts, at the contacts 986, the previously traced path for applying battery potential by way of the resistor 746' to the cutoff conductor C1095 in the cable 1090; and prepares, at the contacts 981 and 982, further points in the previously mentioned circuit between the trunk 1380 and the toll line 702. At this time, the digit keys, not shown, disposed at the first inward operator position as the manual dial toll board in the automatic exchange 50 are operatively connected to the tip and ring of the call plug 1312 and, consequently, to the tip and ring of the jack J1314 and thence by way of the line conductors C1381 and C1382 of the trunk 1380 and the contacts 1082 and 1084 to the code A conductor C1091 and the code B conductor C1092 in the cable 1090; and by way of the finder circuit 1401 to the register sender 1402. Accordingly, at this time, the operator at the first inward position mentioned operates the digit keys; whereby coded digits are transmitted over the above traced path and registered in the register sender 1402. Also at this time, the repeater circuit 700 has operated to transmit a seizure signal over the toll line 702 as explained above.

This seizure signal transmitted over the toll line 702 is received by the tone unit 601; thereby effecting operation and then restoration of the signal-in relay R620 in the repeater circuit 400 in the manner previously explained. Upon operating the signal-in relay R620 completes, at the contacts 622, an obvious circuit for illuminating the busy lamp L687; thereby to indicate that the repeater circuit 400 is busy at this time; and interrupts, at the contacts 625, the previously traced circuit for maintaining operated the incoming release relay R460; which is without effect at this time since the signal-in relay R620 does not remain operated sufficiently long to bring about the restoration of the incoming release relay R460 which is of the slow-to-release type, as previously noted. Also the signal-in relay R620 completes, at the contacts 622 and 623, a circuit, including the contacts 474, for operating the inter-pulse timer relay R630 shortly thereafter, the latter relay being of the slow-to-operate type; and a multiple circuit, also including the contacts 428, for operating the series relay R410. Further, the signal-in relay R620 completes, at the contacts 622, the previously traced circuit, including the contacts 691, for operating the pad cutout relay R600; thereby to cause the latter relay to operate and complete, at the contacts 601 and 603, the previously mentioned paths for short-circuiting the windings 605, 606, and 607, 608 of the pad 695. Also, the pad cutout relay R600 interrupts, at the contacts 602, the termination circuit including the condenser 696 between the line conductors of the toll line 702. Finally, the signal-in relay R620 completes, at the contacts 626, a circuit, including the contacts 655, 448 and 457, for energizing the lower winding of the selector seize relay R450. When the lower winding of the selector seize relay R450 is thus energized, it operates through its first step to complete, at the contacts 456, a substantially identical path, also including the contacts 462 and 443, for short-circuiting the upper winding thereof; the selector seize relay R450 being of the two-step type.

At the conclusion of the seizure signal, the tone unit 601 brings about the restoration of the signal-in relay R620 in the repeater circuit 400 as previously noted; whereby the signal-in relay R620 recompletes, at the contacts 625, the previously traced circuit for maintaining operated the incoming release relay R460 in order positively to prevent restoration of the latter relay. Also the signal-in relay R620 interrupts, at the contacts 626, the previously traced path for short-circuiting the upper winding of the selector seize relay R450; whereby there is completed a circuit, including the contacts 456, 462, and 443 for energizing in series the upper and lower windings thereof, causing the seizure relay R450 to operate through its second step. When the selector seize relay R450 operates through its second step, it interrupts, at the contacts 453, the previously traced path for applying battery potential by way of the upper winding of the release relay R420 to the control conductor C398 of the trunk 395; and completes, at the contacts 452, a path for applying ground potential to the control conductor C398; thereby to mark the trunk 395 and, consequently, the repeater circuit 400 as busy to the outgoing toll selector 345, etc., having access thereto. Further, the selector seize relay R450 completes, at the contacts, 455, an alternative circuit including the contacts 691 for maintaining operated the pad cutout relay R600; and completes, at the contacts 451, an obvious path for applying ground potential to the control conductor C393 of the trunk 390; and completes, at the contacts 459, a circuit, including the contacts 411 and 577, for energizing the lower winding of the loop test relay R500 in order to cause the latter relay to operate shortly thereafter, it being of the slow-to-operate type. Upon operating the loop test relay R500 completes, at the contacts 501, a circuit, including the contacts 455, for operating the control relay R590. Also upon restoring the signal-in relay interrupts, at the contacts 623, the previously traced circuits for maintaining operated the inter-pulse timer relay R630 and the series relay R410; whereby the inter-pulse timer relay R630 restores substantially immediately and the series relay R410 restores shortly thereafter, it being of the slow-to-release type.

Upon operating the control relay R590 completes, at the contacts 591, a loop circuit, including the contacts 581, 571 and 536, between the upper winding of the loop test relay R500 and the line conductors C391 and C392 of the trunk 390 and, consequently, to the incoming toll selector 320; whereby the upper winding of the loop test relay R500 is energized over the above traced loop circuit effecting the complete seizure of the incoming toll selector 320. Also the control relay R590 completes, at the contacts 597, a path, including the contacts 564 and 494, between the false seizure conductor C517 and the junction between the upper and lower windings of the answer supervisory relay R490; over which circuit the upper and lower windings of the answer supervisory relay R490 are not immediately energized; and which circuit is utilized in case of false seizure of the repeater circuit 400 as explained more fully hereinafter. Further, the control relay R590 completes, at the contacts 598, a path, including the contacts 473 and 450, for applying ground potential to the pulse cut-in conductor C611 extending to the tone unit 601 in order to effect operation of the pulse cut-in relay in the tone unit 601; whereby the tone unit 601 is conditioned to respond to the unmodulated 1000 cycle dialing pulses subsequently transmitted over the toll line 702, and constituting a dialing signal. Further, the control relay R590 completes, at the contacts 593, a path, including the contacts 538 and 455 for applying ground potential by way of the lower winding of the tandem test relay R470 to the control conductor C394 of the trunk 390 extending to the incoming toll selector 320; thereby to permit the tandem test relay R470 to operate in the special event that the incoming toll selector 320 is subsequently operated to select an outgoing toll selector 345, etc., and the outgoing toll selector 345, etc., is then operated to extend the connection over another repeater circuit, such, for example, as the repeater circuit 350 terminating the toll line 351 extending between the automatic exchange 30 in Sao Paulo and the automatic exchange 370 in Campinas. In the present example, the incoming toll selector 320 will not be operated to select an outgoing toll selector 345, etc., since the connection is to be extended to the called subscriber substation T1 in the automatic office 380 in Sao Paulo; whereby the tandem test relay R470 in the repeater circuit 400 will not be operated.

The operator at the first inward position at the manual dial toll board in the automatic exchange 50 then operates the associated digit keys in order to cause the first digit 2, the second digit 8 and the digits comprising the directory number of the called subscriber substation T1 in the automatic office 380 to be sent in code over the trunk 1380 and registered in the register sender 1402. The register sender 1402 then operates to transmit the first digit 2 over the pulse +conductor C1093 and the pulse −conductor C1094 in the cable 1090; whereby the line relay R1060 in the repeater circuit 700 restores and then reoperates twice in succession in accordance with the two impulses of the first digit 2. Upon restoring the line relay R1060 completes, at the contacts 1061, a circuit, including the contacts 1015, 984 and 744, for operating the send relay R730; and completes, at the contacts 1062, a circuit, including the contacts 1087, 987, and 742′, for energizing the lower winding of the prepare relay R750; and a substantially identical multiple circuit, also including the contacts 989, for energizing the winding of the series relay R1050 in order to cause the relays mentioned to operate. Upon operating the series relay R1050 completes, at the contacts 1052, a holding circuit including the contacts 1087, 987, and 976, for energizing the upper winding of the prepare relay R750; whereby the series relay R1050, being of the slow-to-release type, remains operated during impulsing and retains operated the prepare relay R750. However, as the line relay R1060 follows the impulses of the first digit 2, it completes and then interrupts, at the contacts 1061, the previously traced circuit for operating the send relay R730; whereby the latter relay follows the impulses of the first digit 2. Each time the send relay R730 operates and then restores, it completes and then interrupts, at the contacts 734, a path for applying ground potential to the modulation cutoff conductor C708; thereby intermittently to short-circuit the winding of the modulation cutoff relay in the tone unit 701 since battery potential is normally applied at this time by way of the previously traced path including the resistor 746′ to the modulation cutoff conductor C708. However, the modulation cutoff relay in the tone unit 701 does not restore as a result of the intermittent short-circuiting of the winding thereof; whereby the tone unit 701 continues to send unmodulated 1000 cycle current over the sending −conductor C701 and the sending +conductor C702. Also each time the send relay R730 operates and then restores, it interrupts and then recompletes, at the contacts 732, the previously mentioned path between the sending −conductor C701 and the sending +conductor C702; and completes and then interrupts, at the contacts 731, the previously traced connection between the sending −conductor C701 and the sending +conductor C702 and the line conductors of the toll line 702; whereby the send relay R730 repeats, at the contacts 731, splashes of unmodulated 1000 cycle current corresponding to the impulses of the first digit 2 from the tone unit 701 over the toll line 702, and constituting a dialing signal.

At the conclusion of the first digit 2, the line relay R1060 is retained in its operated position by the register sender 1402 for a suitable time interval constituting an inter-digit space; whereby the operated line relay R1060 retains interrupted, at the contacts 1062, the previously traced circuit for maintaining operated the series relay R1050 for an interval of time sufficiently long to cause the latter relay to restore. Upon restoring the series relay R1050 interrupts, at the contacts 1052, the previously traced holding circuit for energizing the upper winding of the prepare relay R750 in order to cause the latter relay to restore since the above traced circuit for energizing the lower winding thereof is interrupted at the contacts 1062 of the operated line relay R1060. Also the operated line relay R1060 interrupts, at the contacts 1061, the previously traced circuit for operating the send relay R730. The send relay R730 and the prepare relay R750 restore; thereby terminating the transmission from the tone unit 701 over the toll line 702 of the pulses of unmodulated 1000 cycle current constituting the dialing signal and representing the first digit 2. In a similar manner the register sender 1402 controls the line relay R1060 in accordance with the second digit 8 and the other digits constituting the directory number of the called subscriber substation T1 in the automatic office 380; whereby the repeater circuit 400 transmits the second 8 and remaining digits mentioned in a similar manner over the toll line 702.

The dialing signal corresponding to the first digit 2 transmitted over the toll line 702 is received by the tone unit 601; whereby the tone unit 601 responds in order to cause a corresponding series of ground impulses to be transmitted over the dial-in conductor C601 extending therefrom; whereby the dial-in relay R580 follows. Each time the dial-in relay R580 operates and then restores, it completes and then interrupts, at the contacts 582, an obvious circuit for operating the ring control relay R560; thereby to cause the latter relay to operate and remain operated during impulsing since it is of the slow-to-release type. Also each time the dial-in relay operates and then restores, it completes and then interrupts, at the contacts 583, a circuit, including the contacts 428, 446, 474 and 455, for energizing the winding of the series relay R410; thereby to cause the latter relay to operate and remain operating during impulsing since it is of the slow-to-release type. Also, each time the dial-in relay R587 operates and then restores, it completes and then interrupts, at the contacts 583, a substantially identical multiple circuit for operating the inter-pulse timer relay R630; thereby to cause the latter relay to operate and restore intermittently. When the series relay R410 operates, it completes, at the contacts 411, a holding circuit, including the contacts 459 and 577, for energizing the lower winding of the loop test relay R500; thereby to prevent the latter relay from restoring incident to the interruption of the previously traced loop circuit including the upper winding thereof and extending to the incoming toll selector 320. Upon operating the ring control relay R560 completes, at the contacts 561, a holding circuit, including the contacts 502, 481' and 455, for energizing the winding thereof; and completes, at the contacts 562, a circuit including the contacts 473 and 450, for operating the ring control relay R550. Also the ring control relay R560 interrupts, at the contacts 564, the previously traced connection between the false seizure conductor C517 and the junction between the upper and lower windings of the answer supervisory relay R490; thereby to prevent operation of the latter relay over the false seizure conductor C517 since the repeater circuit 400 has not been falsely seized as evidenced by the prompt reception by the associated tone unit 601 of the dialing signal constituting the first digit 2.

Also, each time the dial-in relay operates and then restores, it interrupts and then recompletes, at the contacts 581, the previously traced loop circuit extending between the upper winding of the loop test relay R500 and the incoming toll selector 320; whereby the impulses of the first digit 2 are repeated at the contacts 581, over the trunk 390 to the incoming toll selector 320. The incoming toll selector 320 responds to the first digit 2 in order to select the group of outgoing toll selectors, including the outgoing toll selector 340, and then an idle outgoing toll selector therein. For example, the incoming toll selector 320 may select the trunk 341 extending to the outgoing toll selector 340; whereby the outgoing toll selector 340 is conditioned to be responsive to a digit transmitted thereto. At the conclusion of the first digit 2, the dial-in relay R580 remains restored, interrupts, at the contacts 583, the previously traced multiple circuits for operating the inter-pulse timer relay R630 and for maintaining operated the series relay R410; whereby the inter-pulse timer relay R630 restores substantially immediately and the series relay R410 restores shortly thereafter, it being of the slow-to-release type. Upon restoring the series relay 410 interrupts, at the contacts 411, the previously traced holding circuit for energizing the lower winding of the loop test relay R500; however, the latter relay is retained in its operated position at this time by virtue of the completed loop circuit including the upper winding thereof and extending by way of the trunk 390, the incoming toll selector 320 and the trunk 341 to the outgoing toll selector 340.

In a similar manner the tone unit 601 responds to the dialing signals corresponding to the second digit 8 and the remaining digits constituting the directory number of the called subscriber substation T1 in the automatic office 380; whereby the digits mentioned are transmitted by the dial-in relay R580 in the repeater circuit 400 over the trunk 390 in the manner previously explained. The outgoing toll selector 340 responds to the second digit 8 transmitted thereto to select the group of trunk lines extending between the automatic exchange 30 and the automatic office 380 and then an idle trunk line in the group mentioned. For example, the outgoing toll selector 340 may select the trunk line 342 extending between the automatic exchange 30 and the automatic office 380 and terminated in the switch train 385 in the automatic office 380. The switch train 385 then responds to the digits comprising the directory number of the called subscriber substation T1 in the automatic office 380 and operates in a conventional manner to select the subscriber line 386 extending to the called subscriber substation T1.

When the connection is extended by the switch train 385 to the subscriber line 386 extending to the called subscriber substation T1 in the automatic office 380, the switch train 385 operates to dry the loop circuit including the trunk line 342 extending thereto; and to apply ground potential upon the control conductor thereof and, consequently, through the outgoing toll selector 340, the trunk 341, the incoming toll selector 320 to the control conductor C394 of the trunk 390 extending to the repeater circuit 400. When the loop circuit extending by way of the line conductors C391 and C392 of the trunk 390 and including the upper winding of the loop test relay R500 in the repeater circuit 400 is thus dried, the upper winding of the loop test relay R500 is de-energized causing the latter relay to restore. Upon restoring the loop test relay R500 interrupts, at the contacts 501, the previously traced circuit for maintaining operated the control relay R590; and interrupts, at the contacts 502, the previously traced holding circuit for maintaining operated the ring control relay R560; whereby the latter relay restores shortly thereafter, it being of the slow-to-release type. Upon restoring the control relay R590 interrupts, at the contacts 593, the previously traced connection for applying ground potential by way of the lower winding of the tandem test relay R470 to the control conductor C394 of the trunk 390 and completes, at the contacts 592, a circuit including the contacts 538 and the grounded control conductor C394 of the trunk 390 for energizing the upper winding of the supervisory relay R610 in order to cause the latter relay to operate. Also the control relay R590 interrupts, at the contacts 598, the previously traced path for applying ground potential to the pulse cut-in conductor C611 extending to the tone unit 601 in order to cause the pulse cut-in relay in the tone unit 601 to restore preventing further response by the tone unit to dialing signals transmitted over the toll line 702.

Upon operating the supervisory relay R610 completes, at the contacts 613, a circuit, including the contacts 450, 528, 634 and 624, for operating the supervisory pulse relay R660. Upon operating the supervisory pulse relay R660 completes, at the contacts 663, the previously mentioned circuit for operating the send relay R675; and completes, at the contacts 664, the previously traced circuit for energizing the upper winding of the prepare relay R670 in order to cause the latter relay to operate. Upon operating the prepare relay R670 completes, at the contacts 674, the previously mentioned circuit for energizing the lower winding of the sequence relay R680 in order to cause the latter relay to operate; and completes, at the contacts 674, a multiple circuit, including the contacts 661 for operating the control relay R505. Upon operating the control relay R505 completes, at the contacts 508, the previously traced circuit for operating shortly thereafter the inter-pulse timer relay R630; and a multiple circuit also including the contacts 428 for operating the series relay R410. Upon operating the series relay R410 completes, at the contacts 412, a holding circuit, including the contacts 664, 482′, 432 and 686, for energizing the lower winding of the prepare relay R670. Also the control relay R505 completes, at the contacts 507, a circuit including the contacts 443, 477, 526 and 515 for energizing the lower winding of the supervisory control relay R520 and a multiple circuit including the contacts 522, for energizing the upper winding of the control relay R520; however, the latter relay does not operate at this time as it is of the differential type. Upon operating the inter-pulse timer relay R630 interrupts, at the contacts 634, the previously traced circuit for maintaining operated the supervisory pulse relay R660; thereby to cause the latter relay to restore shortly thereafter, it being of the slow-to-release type. Upon restoring the supervisory pulse relay R660 interrupts, at the contacts 661, the previously traced circuit for maintaining operated the control relay R505; and upon restoring the control relay R505 interrupts, at the contacts 507, the previously traced circuit for energizing in multiple the upper and lower windings of the supervisory control relay R520. The magnetic flux in the lower winding of the supervisory control relay R520 does not immediately decay by virtue of the shunt connection including the upper winding thereof and the contacts 522 extending also to battery potential; whereby the upper and lower windings of the supervisory control relay R520 are effectively energized in series circuit relation during the decay of the magnetic flux therein, causing the latter relay to operate in order to close its contacts 521 which are, in turn, connected by way of the contacts 511 and 455 to ground potential. Thus the upper and lower windings of the supervisory control relay R520 are energized in series circuit relation causing the latter relay to operate fully in order to interrupt, at the contacts 522, the previously mentioned path for short-circuiting the associated resistor 529. Also the supervisory control relay R520 interrupts, at the contacts 528, a further point in the previously traced circuit for operating the supervisory pulse relay R660; and completes, at the contacts 524, a circuit, including the contacts 455, for operating the supervisory relay R530; and a multiple circuit, including the contacts 480, for energizing the lower winding of the line supervisory relay R480 in order to cause the latter relay to operate. Upon operating the line supervisory relay R480 completes, at the contacts 487, a holding circuit, including the contacts 455, for energizing the upper and lower windings thereof in series circuit relation. Also upon operating the sequence relay R680 completes, at the contacts 683, a circuit including the contacts 455 and 454, for energizing the upper winding of the switch over relay R570 in order to cause the latter relay to operate. Upon operating the switch over relay R570 completes, at the contacts 575, a holding circuit, including the contacts 455, for energizing the upper winding thereof; and completes, at the contacts 572 and 573, a connection traced hereinafter between the line conductors C391 and C392 of the trunk 390 and the line conductors of the toll line 702.

Also, when the ring control relay R560 restores, it interrupts, at the contacts 562, the previously traced circuit for maintaining operated the ring control relay R550 in order to cause the latter relay to restore shortly thereafter, it being of the slow-to-release type. Further, upon restoring the ring control relay R560 completes, at the contacts 563, a circuit, including the contacts 552, 473, and 450, for operating the ring control relay R540. Upon operating the ring control relay R540 completes, at the contacts 542, a circuit, including the contacts 474 and 455, for operating the ring relay R535. Upon operating the ring relay R535 interrupts, at the contacts 536, the previously mentioned connection between the line conductor C392 of the trunk 390 and the corresponding line conductor of the toll line 702; and completes, at the contacts 537, a path including the resistor 536′ for applying battery potential to the line conductor C392 of the trunk 390; thereby to initiate operation of the switch train 385 in the automatic exchange 380 to transmit ringing current over the subscriber line 386 to the called subscriber substation T1 in the automatic office 380, assuming that the called subscriber substation T1 is idle at this time.

Upon restoring the ring control relay R550 interrupts, at the contacts 552, the previously traced circuit for maintaining operated the ring control relay R540 in order to cause the latter relay to restore shortly thereafter, it being of the slow-to-release type. Upon restoring the control relay R540 interrupts, at the contacts 542, the previously traced circuit for maintaining operated the ring relay R535 in order to cause the latter relay to restore shortly thereafter, it being of the slow-to-release type. Upon restoring the ring relay R535 interrupts, at the contacts 537, the previously traced path for applying battery potential by way of the resistor 536′ to the line conductor C392 of the trunk 390; and recompletes, at the contacts 536, a further point in the previously mentioned connection between the line conductor C392 of the trunk 390 and the corresponding line conductor of the toll line 702.

Also upon restoring, the supervisory pulse relay R660 interrupts, at the contacts 663, the previously mentioned circuit for maintaining operated the send relay R675; and upon restoring the control relay R505 interrupts, at the contacts 508, the previously traced circuit for maintaining operated the inter-pulse timer relay R630 and the series relay R410; whereby the inter-pulse timer relay R630 restores substantially immediately and the series relay R410 restores shortly thereafter, it being of the slow-to-release type. Upon restoring the series relay R410 interrupts, at the contacts 412, the previously traced holding circuit for energizing the lower winding of the prepare relay R670; thereby to cause the latter relay to restore. During the time that the send relay R675 and the prepare relay R670 occupy their operated positions, the tone unit 601 was operatively connected to the toll line 702 and operated to transmit thereover a splash of 60 cycle modulated 1000 cycle current, constituting an end-of-dialing signal.

This end-of-dialing signal transmitted over the toll line 702 is received by the tone unit 701; whereby it operates to bring about operation and then restoration of the signal-in relay R870 in the repeater circuit 700, in the manner previously explained. Upon operating and then restoring, the signal-in relay R870 interrupts and then recompletes, at the contacts 874, the previously traced circuit for maintaining operated the incoming release relay R920; whereby the latter relay being of the slow-to-release type is maintained in its operated position as previously noted. Also upon operating and then upon restoring, the signal-in relay R870 completes and then interrupts, at the contacts 876, a circuit, including the contacts 922, 1010, and 745', for energizing in multiple the upper and lower windings of the end-of-dial relay R830; whereby the end-of-dial relay R830 does not immediately operate, but does operate when the above traced circuit for energizing in multiple the upper and lower windings thereof is interrupted; all in the manner previously explained. Upon operating the end-of-dial relay R830 completes, at the contacts 832, a holding circuit, including the contacts 1021 and the grounded busy conductor C1110, for energizing in series the upper and lower windings thereof, and completes at the contacts 831 a substantially identical circuit, also including the contacts 749, for operating the switch through relay R740, and a substantially identical multiple circuit for operating the supervisory relay R1040. Upon operating the switch through relay R740 completes, at the contacts 748, an obvious holding circuit, including the grounded busy conductor C1110, for energizing the winding thereof; and interrupts, at the contacts 741, the normally completed path, including the contacts 732, for connecting the resistor 722 and the condenser 723 across the line conductors extending to the pad 795. Also the switch through relay R740 interrupts, at the contacts 741', the previously traced path for applying battery potential by way of the resistor 746' to the modulation cutoff conductor C708 extending to the tone unit 701; thereby to condition the tone unit 701 to transmit 60 cycle modulated 1,000 cycle current the next time it is seized for use. Also the switch through relay R740 completes, at the contacts 746, a holding circuit, including the contacts 1072, for the energizing the winding of the finder-stop relay R980; and prepares, at the contacts 742 and 743, further points in a connection traced hereinafter between the trunk 1380 and the toll line 702. Also the switch through relay R740 interrupts, at the contacts 747, the previously traced circuit for maintaining operated the start relay R1080; and prepares, at the contacts 744', a circuit traced hereinafter for energizing in multiple the upper and lower windings of the answer relay R1020.

Upon operating the supervisory relay R1040 completes, at the contacts 1044, a path for energizing the upper winding of the sleeve relay R1070 in multiple with the lower winding thereof; whereby low resistance ground potential is applied through the multiple connected windings of the sleeve relay R1070 to the sleeve conductor C1385 of the trunk 1380 in order to bring about operation of the marginal supervisory relay, not shown, in the cord circuit 1310 at the first inward operator position at the manual dial toll board in the automatic exchange 50. Upon operating the supervisory relay mentioned, not shown, effects illumination of the associated supervisory lamp, not shown; thereby to render to the operator at the first inward operator position mentioned end-of-dialing supervision. Upon restoring the start relay R1080 interrupts, at the contacts 1086, the previously traced path for applying ground potential by way of the contacts 1072 and 746 to the cutoff conductor C1095 in the cable 1090; thereby to effect the release of the finder circuit 1401 and the connected register sender 1402; whereby the finder circuit 1401 and the connected register sender 1402 are marked as idle and available for further use to the associated allotter 1405. Also upon restoring the start relay R1080 interrupts, at the contacts 1082 and 1084, the previously traced connections between the line conductors C1381 and C1382 of the trunk 1380 and the Code A conductor C1091 and the Code B conductor C1092 in the cable 1090. Finally, the start relay R1080 interrupts, at the contacts 1085, the previously traced circuit for maintaining operated the line relay R1060. Also when the supervisory relay R1040 operates, it completes, at the contacts 1042, the previously mentioned path, including the grounded busy conductor C1110, for applying ground potential to the supervisory lamp conductor C1109; thereby to illuminate the supervisory lamp L1333 on the display panel 1330 in order to indicate to the operator at the first inward position at the manual dial toll board mentioned that the present connection has been extended to the called subscriber substation T1 in the automatic office 380, but that the subscriber thereat has not as yet answered the call.

Finally, upon restoring the start relay R1080 completes, at the contacts 1081 and 1083, a connection between the trunk 1380 and the tone unit 701. More particularly, the line conductors C1381 and C1382 of the trunk 1380 are connected by way of the contacts 1081, 1083 and 992, 994 to the monitoring —conductor C703 and the monitoring +conductor C704 extending to the tone unit 701; whereby the remainder of the end-of-dialing signal returned over the toll line 702 and via the receiving —conductor C705 and the receiving +conductor C706 to the tone unit 701 is coupled therein to the monitoring —conductor C703 and the monitoring +conductor C704 and, consequently, by way of the previously traced path including the trunk 1380 to the headset connected to the cord circuit 1310 at the first inward operator position at the manual dial toll board in the automatic exchange 50; whereby the operator thereat also receives an audible end-of-dialing signal.

Furthermore, at this time the line conductors of the toll line 702 are connected by way of the voice current repeaters 703 to the repeater circuit 400; wherein one of the line conductors of the toll line 702 is connected by way of the contacts 601, 671, 631 and 572 to the line conductor C391 of the trunk 390; and the other line conductor of the trunk line 702 is connected by way of the contacts 603, 672, 632, 573 and 536 to the line conductor C392 of the trunk 390. Finally, the line conductors C391 and C392 of the trunk 390 are connected by way of the incoming toll selector 320, the trunk 341, the outgoing toll selector 340, the trunk line 342 and the switching apparatus 385 to the subscriber line 386 extending to the called subscriber substation T1.

When the subscriber at the called subscriber substation T1 in the automatic office 380 answers the call by removing the receiver of the telephone instrument thereat from its associated switch hook, the switch train 385 operates to interrupt the projection of ringing current over the subscriber line 386 extending thereto and to interrupt the application of ground potential upon the control conductor of the trunk line 342 and, consequently, upon the control conductor C394 of the trunk 390 in order to interrupt the previously traced circuit for energizing the upper winding of the supervisory relay R610, causing the latter relay to restore. Upon restoring the supervisory relay R610 completes, at the contacts 614, a circuit, including the contacts 450, 590, 527, 634 and 624, for operating the supervisory pulse relay R660. Upon operating the supervisory pulse relay R660 effects recycling of the relays previously mentioned and including the send relay R675; whereby the tone unit 601 is operatively connected to send a splash of 60 cycle modulated 1000 cycle current over the toll line 702, and constituting an answer signal. During this cycling of the relays mentioned, the control relay R505 operates and then restores completing and then interrupting, at the contacts 507, a circuit, including the contacts 443, 477 and 525, for energizing in multiple the upper and lower windings of the answer supervisory relay R510. The answer supervisory relay R510 operates when the circuit for energizing in multiple the upper and lower windings thereof is interrupted as previously explained in order to complete, at the contacts 512, a holding circuit, including the contacts 455, for energizing in series the upper and lower windings thereof. Also upon operating, the answer supervisory relay R510 interrupts, at the contacts 511, the previously traced circuit for maintaining operated the supervisory control relay R520; and upon restoring the supervisory control relay R520 interrupts, at the contacts 524, the previously traced circuit for maintaining operated the supervisory relay R530 in order to cause the latter relay to restore shortly thereafter, it being of the slow-to-release type.

This answer signal sent over the toll line 702 by the repeater circuit 400 is received by the tone unit 701 in order to effect operation and subsequent restoration of the signal-in relay R870 in the repeater circuit 700. Upon operating and then restoring the signal-in relay R870 completes and then interrupts, at the contacts 876, a circuit, including the contacts 922, 1010, 744' and 1025 for energizing in multiple the upper and lower windings of the answer relay R1020. When the circuit for energizing in multiple the upper and lower windings of the answer relay R1020 is thus interrupted, the latter relay operates to complete, at the contacts 1022, a holding circuit including the grounded busy conductor C110 for energizing in series the upper and lower windings thereof. Also the answer relay R1020 interrupts, at the contacts 1021, the previously traced multiple circuits for maintaining operated the monitor relay R990 and the end-of-dial relay R830, and the previously traced multiple circuit for maintaining operated the supervisory relay R1040; whereby the monitor relay R990 and the end-of-dial relay R830 restore immediately and the supervisory relay R1040 restores shortly thereafter, it being of the slow-to-release type. Upon restoring the monitor relay R990 interrupts, at the contacts 992 and 994, the previously traced connection between the trunk 1380 and the monitoring —conductor C703 and the monitoring +conductor C704 extending to the tone unit 701; and completes, at the contacts 991 and 993, a connection between the trunk 1380 and the toll line 702. More particularly, at this time the position equipment at the first inward operator position at the manual dial toll board in the automatic exchange 50 is connected to the cord circuit 1310 which, in turn, is connected by the call plug 1312 to the jack J1314 terminating the trunk 1380. The line conductor 1381 of the trunk 1380 is connected by way of the contacts 1081, 991, 981, 761, 751 and 742 to one side of the pad 795; and the line conductor 1382 of the trunk 1380 is connected by way of the contacts 1083, 993, 982, 811, 752, and 743 to the other side of the pad 795. Also at this time high resistance battery potential in the position equipment at the first inward operator position at the manual dial toll board mentioned is connected to the line conductors of the trunk 1380; which application of high resistance battery potential to the line conductor C1381 of the trunk 1380 completes a path substantially identical to that previously traced for energizing in series the winding of the re-ring relay R810 and the winding of the pad control relay R720; whereby the pad control relay R720 operates, but the re-ring relay R810 does not operate as it is of the marginal type. Upon operating the pad control relay R720 interrupts, at the contacts 721, the previously mentioned circuit for maintaining operated the pad cutout relay R710; whereby the latter relay restores shortly thereafter, it being of the slow-to-release type. Upon restoring the pad cutout relay R710 interrupts, at the contacts 711 and 713, the previously traced paths for short-circuiting the windings 714, 715 and 716, 717 of the pad 795; whereby the windings mentioned of the pad 795 are inserted into the connection to the line conductors of the toll line 702. Also the pad cutout relay R710 completes, at the contacts 712, the previously traced termination circuit including the winding 718 of the pad 795 and the condenser 719 across the line conductors of the toll line 702.

Upon restoring the supervisory relay R1040 interrupts, at the contacts 1042, the previously mentioned path for applying ground potential to the supervisory lamp conductor C1109; thereby to extinguish the supervisory lamp L1333 on the display panel 1330 in order to indicate to the operator at the first inward position at the manual dial toll board in the automatic exchange 50 that the subscriber at the called subscriber substation T1 in the automatic office 380 has answered the call. Further, upon restoring the supervisory relay R1040 interrupts, at the contacts 1044, the previously traced path for energizing the upper winding of the sleeve relay R1070 in multiple with the lower winding thereof in order to increase the resistance in the path for applying ground potential to the sleeve conductor C1385 of the trunk 1380; whereby the supervisory relay, not shown, in the cord circuit 1310 restores in order to extinguish the supervisory lamp, not shown; thereby to give the operator at the first inward position at the manual dial toll board mentioned answer supervision. At this time a connection is established between the first inward operator position at the manual dial toll board in the automatic exchange 50 and the called subscriber substation T1 in the automatic office 380 and after the operator at the first inward operator position mentioned converses with the subscriber at the called subscribed substation T1, she may complete the connection to an incoming circuit to the automatic exchange 50 that is to be connected to the called subscriber substation T1 in the automatic office 380. When the last mentioned connection is completed, the operator at the first inward position circuit mentioned restores the associated talk key; thereby disconnecting the position equipment from the cord circuit 1310 and the established connection; whereupon high resistance battery potential is removed from the line conductors C1381 and C1382 of the trunk 1380. When high resistance battery potential is thus removed from the line conductor C1381 of the trunk 1380, the previously traced circuit for maintaining operated the pad control relay R720 is interrupted; whereupon the latter relay restores recompleting, at the contacts 721, the previously traced circuit for operating the pad cutout relay R710. Upon operating the pad cutout relay R710 recompletes, at the contacts 711 and 713, the previously traced paths for short-circuiting the windings 714, 715 and 716, 717 of the pad 795; whereby the pad 795 is not included in the established connection between the incoming circuit to the automatic exchange 50 and the called subscriber substation T1 in the automatic office 380.

Reconsidering the operation of the repeater circuit 700 in conjunction with the repeater circuit 400, it is noted that in the event the called subscriber substation T1 in the automatic office 380 is busy when the switch train 385 operates in order to interrupt the application of steady ground potential upon the control conductor of the trunk line 342, it operates to cause interrupted ground potential to be applied to the control conductor of the trunk line 342. This application of interrupted ground potential in the switch train 385 upon the control conductor of the trunk line 342 and, consequently, upon the control conductor C394 of the trunk 390 completes intermittently the previously traced circuit including the contacts 538 and 592 for energizing the upper winding of the supervisory relay R610 in the repeater circuit 400; whereby the latter relay operates and restores intermittently. The first time the supervisory relay R610 restores it completes, at the contacts 614, the previously traced circuit, including the contacts 450, 590, 527, 643 and 624 for operating the supervisory pulse relay R660. Upon operating the supervisory pulse relay R660 completes, at the contacts 663, the previously mentioned circuit for operating the send relay R675; and completes, at the contacts 664, the previously traced circuit for operating the prepare relay R670 via the upper winding thereof. Upon operating the prepare relay R670 completes, at the contacts 674, the previously traced circuit for operating the control relay R505; and upon operating the control relay R505 completes, at the contacts 508, the previously traced circuit for operating the series relay R410; whereby the latter relay completes, at the contacts 412, the previously traced holding circuit for energizing the lower winding of the prepare relay R670. Upon operating the inter-pulse timer relay R630 interrupts, at the contacts 634, the previously traced circuit for maintaining operated the supervisory pulse relay R660; whereby the latter relay restores shortly thereafter, it being of the slow-to-release type. Upon restoring the supervisory pulse relay R660 effects the restoration of the send relay R675 and the control relay R505; whereby the control relay R505 effects the restoration of the inter-pulse timer relay R630. Upon restoring the inter-pulse timer relay R630 recompletes, at the contacts 634, when the supervisory relay R610 occupies its restored position closing the contacts 614, the previously traced circuit for reoperating the supervisory pulse relay R660; thereby to initiate another cycle of operation of the relays mentioned above in the manner explained. Since the supervisory relay R610 operates and restores intermittently, a new cycle of operation of the relays mentioned as explained above must be initiated when the supervisory relay R610 occupies its restored position closing the contacts 614; however, this condition occurs frequently, whereby the relays mentioned repeat the cycle above described continuously at this time. During the short time interval between the operation and the subsequent restoration of the send relay R675 in the manner described above, the tone unit 601 is operatively connected to the toll line 702 and is rendered operated to send by virtue of the operation of the prepare relay R670, during the time interval mentioned, a short splash of 60 cycle modulated 1,000 cycle current over the toll line 702. Accordingly, each time the relays mentioned operate through the cycle above described a splash of 60 cycle modulated 1,000 cycle current is sent over the toll line 702; whereby a series of splashes of 60 cycle modulated 1,000 cycle current are transmitted over the toll line 702 at this time, and constituting a busy signal. This busy signal sent over the toll line 702 is received by the tone unit 701 in order to cause corresponding intermittent operation and restoration of the signal-in relay R870 in the repeater circuit 700. Upon the reception of the end-of-dialing signal, the signal-in relay R870 brought about operation of the end-of-dial relay R830 and the consequent operation of the switch through relay R740 and the supervisory relay R1040 in the manner previously explained; whereby the supervisory relay R1040 effected the connection of the upper winding of the sleeve relay R1070 in parallel with the lower winding thereof in order to operate the supervisory relay, not shown, in the cord circuit 1310; thereby to illuminate the associated supervisory lamp, not shown, in the cord circuit 1310. Upon the reception of the first pulse of the busy signal, the signal-in relay R870 brings about operation of the answer relay R1020 and the consequent restoration of the end-of-dial relay R830 and the supervisory relay R1040, in the manner previously explained; whereby the supervisory relay R1040 upon restoring interrupts, at the contacts 1044, the previously traced path for connecting the upper winding of the sleeve relay R1070 in parallel with the lower winding thereof in order to bring about the restoration of the supervisory relay, not shown, in the cord circuit 1310 and the consequent extinguishing of the associated supervisory lamp, not shown. Upon the reception of the second impulse of the busy signal the signal-in relay R870 operates and then restores to complete and then to interrupt, at the contacts 876, a circuit, including the contacts 922, 1010, 744' and 1024, for operating the supervisory relay R1040, whereby the latter relay operates and then restores; the supervisory relay R1040 restoring shortly after each deenergization thereof since it is of the slow-to-release type. The above traced circuit for operating intermittently the supervisory relay R1040 is completed each time the signal-in-relay R870 operates as a consequence of the operated position of the answer relay R1020; which latter relay operated the first time the signal-in relay R870 operated and then restored in the manner previously explained. Each time the supervisory relay R1040 operates and then restores it completes and then interrupts, at the contacts 1044, the previously traced path for applying low resistance ground potential to the sleeve conductor C1385 of the trunk 1380 in order to effect corresponding operation of the supervisory relay, not shown, in the cord circuit 1310; whereby the supervisory lamp, not shown, in the cord circuit 1310 is flashed at this time giving the operator at the first inward position at the manual dial toll board mentioned busy supervision. Also each time the supervisory relay R1040 operates and then restores it completes and then interrupts, at the contacts 1042, the previously traced circuit for illuminating the supervisory lamp L1333 on the display panel 1330; whereby the supervisory lamp L1333 is flashed indicating the busy condition mentioned. When the operator at the first inward position at the manual dial toll board in the automatic exchange 50 receives busy supervision, she proceeds to release the established connection including the repeater circuit 700 in the automatic exchange 50 and the repeater circuit 400 in the automatic exchange 30; all explained in detail hereinafter.

Continuing now with the established connection between the incoming circuit to the automatic exchange 50 and the called subscriber substation T1 in the automatic office 380, and including the cord circuit 1310 at the first inward operator position at the manual dial toll board in the automatic exchange 50, when the subscriber at the called subscriber substation T1 replaces the receiver of the telephone instrument thereat upon its associated switchhook, the switch train 385 at the automatic office 380 operates again to apply ground potential to the control conductor of the trunk line 382 and, consequently, to the control conductor C394 of the trunk 390; thereby to recomplete the previously traced circuit for energizing the upper winding of the supervisory relay R610 in order to cause the latter relay to operate. Upon operating the supervisory relay R610 completes, at the contacts 613, the previously traced circuit for operating the supervisory pulse relay R660. Upon operating the supervisory pulse relay R660 effects operation of the send relay R675 and the prepare relay R670; the prepare relay R670 effects operation of the control relay R505; the control relay R505 effects operation of the inter-pulse timer relay R630; all in the manner previously explained. Also the control relay R505 completes, at the contacts 507, a circuit, including the contacts 443, 477, 526 and 514, for operating the supervisory relay R530. Upon operating the inter-pulse timer relay R630 effects the restoration of the supervisory pulse relay R660 in the manner previously explained; and upon operating the supervisory relay R530 completes, at the contacts 532, a holding circuit, including the contacts 455, 523, and 423, for maintaining operated the inter-pulse timer relay R630 and a substantially identical multiple circuit, also including the contacts 428, for maintaining operated the series relay R410; the series relay R410 having been operated incident to operation of the control relay R505 in the manner previously explained. Upon restoring the supervisory pulse relay R660 effects restoration of the send relay R675 and the prepare relay R670; the prepare relay R670 effects restoration of the control relay R505; all in the manner previously explained. Upon restoring the control relay R505 interrupts, at the contacts 507, the previously traced circuit for maintaining operated the supervisory relay R530; thereby to cause the latter relay to restore shortly thereafter, it being of the slow-to-release type. Upon restoring the supervisory relay R530 interrupts, at the contacts 532, the previously traced circuits for maintaining operated the series relay R410 and the inter-pulse timer relay R630; whereby the series relay R410 being of the slow-to-release type does not restore immediately, but the inter-pulse timer relay R630 does restore immediately to recomplete, at the contacts 634, the previously traced circuit for operating the supervisory pulse relay R660. The supervisory pulse relay R660 upon operating initiates another cycle of operation of the relays mentioned. During the above described cycle of operation of the relays mentioned and while the send relay R675 and the prepare relay R670 occupy their operated positions, the tone unit 601 was operatively connected to the toll line 702 and was operated to transmit a pulse of 60 cycle modulated 1,000 cycle current over the toll line 702. Accordingly, at this time the relays mentioned operate continuously through the cycle above described in order to cause a series of 60 cycle modulated 1,000 cycle pulses of current to be transmitted over the toll line 702 and constituting a disconnect signal. In passing, it is noted that the disconnect signal is identical to the busy signal previously described; and that the disconnect signal is continuously transmitted from the repeated circuit 400 in the automatic exchange 30 over the toll line 702 to the repeater circuit 700 in the automatic exchange 50 until the operator at the first inward position at the manual dial toll board in the automatic exchange 50 effects the release of the established connection in a manner more fully explained hereinafter.

When this disconnect signal is received by the repeater circuit 700 in the automatic exchange 50, the tone unit 701 responds thereto effecting intermittent operation of the signal-in relay R870 in the repeater circuit 700 and the consequent intermittent operation of the supervisory relay R1040 is a manner substantially identical to that previously explained. Each time the supervisory relay R1040 operates and then restores, it completes and then interrupts, at the contacts 1044, the previously traced circuit for energizing the upper winding of the sleeve relay R1070 in parallel with the lower winding thereof; thereby intermittently to reduce the resistance in the ground path to the sleeve conductor C1385 of the trunk 1380; thereby to effect corresponding intermittent operation of the supervisory relay, not shown, in the cord circuit 1310; whereupon the supervisory relay mentioned effects corresponding flashing of the associated supervisory lamp, not shown, rendering to the operator at the first inward position at the manual dial toll board mentioned disconnect supervision. Also each time the supervisory relay R1040 operates and then restores, it completes and then interrupts, at the contacts 1042, the previously traced circuit for illuminating the supervisory lamp L1333 on the display panel 1330; thereby to effect flashing of the supervisory lamp L1333 in order to indicate to the operator at the first inward position mentioned the disconnect condition above noted.

Upon receiving the disconnect supervision, the operator at the first inward position at the manual dial toll board in the automatic exchange 50 may operate the associated talk key thereby to reconnect high resistance battery potential to the line conductors C1381 and C1382 of the trunk 1380; whereby the previously traced series circuit for energizing the winding of the re-ring relay R810 and the winding of the pad control relay R720 in the repeater circuit 700 is completed causing the pad control relay R720 to operate; however, the re-ring relay R810 does not operate as it is of the marginal type. Upon operating the pad control relay R720 effects the restoration shortly thereafter of the pad cutout relay R710; whereby the latter relay reinserts the windings 714, 715 and 716, 717 of the pad 795 into the connection between the repeater circuit 700 and the toll line 702; all in the manner previously explained.

Also at this time the operator at the first inward position at the manual dial toll board mentioned may operate the associated ring key in order to bring about re-signaling of the subscriber at the called subcriber substation T1 in the automatic office 380. More particularly when the associated ring key is thus operated direct battery potential is thus applied to the line conductor C1381 of the trunk 1380 completing a low resistance circuit substantially identical to that previously traced for energizing the winding of the re-ring relay R810 in series with the winding of the pad control relay R720 causing the marginal re-ring relay R810 to operate. Upon operating the re-ring relay R810 completes, at the contacts 812, a circuit including the armature RA1031, the contacts 762 and 872 for operating the supervisory start relay R850. Upon operating the supervisory start relay R850 effects operation of the series relay R1050, the prepare relay R750 and the send relay R730; the prepare relay R750 effects operation of the control relay R820; the control relay R820 effects operation of the cutoff relay R760; the cutoff relay R760 effects restoration of the supervisory start relay R850; the supervisory start relay R850 effects restoration of the series relay R1050, the prepare relay R750, the control relay R820, and the send relay R730; the control relay R820 effects restoration of the cutoff relay R760; and upon restoring the cutoff relay R760 effects reoperation of the supervisory start relay R850 in the event the re-ring relay R810 still occupies its operated position; all in the manner previously explained. Accordingly, the relays mentioned including the send relay R730 in the repeater circuit 700 execute one or more cycles of operation causing one or more splashes of 60 cycle modulated 1,000 cycle current to be transmitted from the tone unit 701 over the toll line 702, and constituting a re-ring signal. The operator at the first inward position at the manual dial toll board then restores the associated ring key; thereby to interrupt the application of low resistance battery potential upon the line conductor C1381 of the trunk 1380 bringing about the restoration of the re-ring relay R810 in the repeater circuit 700; whereby operation of the relays mentioned through the cycle previously described is arrested in order to arrest the transmission of the re-ring signal over the toll line 702.

This re-ring signal transmitted over the toll line 702 is received by the tone unit 601 in order to cause corresponding intermittent operation of the signal-in relay R620 in the repeater circuit 400. Upon operating the signal-in relay R620 completes, at the contacts 626, a circuit, including the contacts 655, 448, 458 and 595, for operating the ring control relay R560. Upon operating the ring control relay R560 completes, at the contacts 562, a circuit, including the contacts 473 and 450, for operating the ring control relay R550. The signal-in relay R620 restores interrupting, at the contacts 626, the previously traced circuit for operating the ring control relay R560 in order to cause the latter relay to restore shortly thereafter, it being of the slow-to-release type. Upon restoring the ring control relay R560 completes, at the contacts 563, a circuit, including the contacts 473, 450 and 552, for operating the ring control relay R540. Also the ring control relay R560 interrupts, at the contacts 562, the previously traced circuit for maintaining operated the ring control relay R550; thereby to cause the latter relay to restore shortly thereafter, it being of the slow-to-release type. Upon operating the ring control relay R540 completes, at the contacts 542, a circuit, including the contacts 474 and 455, for operating the ring relay R535. Also upon restoring the ring control relay R550 interrupts, at the contacts 552, the previously traced circuit for maintaining operated the ring control relay R540; thereby to cause the latter relay to restore shortly thereafter, it being of the slow-to-release type. Upon restoring the ring control relay R540 interrupts, at the contacts 542, the previously traced circuit for maintaining operated the ring relay R535 in order to cause the latter relay to restore shortly thereafter, it being of the slow-to-release type. Upon operating the ring relay R535 interrupts, at the contacts 536, the previously traced connection between the toll line 702 and the trunk 390; and completes, at the contacts 537, the previously traced path for applying battery potential by way of the resistor 536′ to the line conductor C392 of the trunk 390; thereby to initiate operation of the switch train 385 again to project ringing current over the subscriber line 386 to the called subscriber substation T1 in the automatic office 380 in order to re-signal the subscriber at the called subscriber substation T1. Also upon operating the ring relay R535 interrupts, at the contacts 538, the previously traced circuit for energizing the upper winding of the supervisory relay R610. The switch train 385 continues to project ringing current over the subscriber line 386 to the called subscriber substation T1 until the subscriber thereat again answers the call by removing the receiver of the telephone instrument thereat from its associated switchhook or until the operator at the first inward position at the manual dial toll board in the automatic exchange 50 releases the connection.

When the ring relay R535 then restores, it interrupts, at the contacts 537, the previously traced path for applying battery potential by way of the resistor 536′ to the line conductor C392 of the trunk 390; and recompletes, at the contacts 536, the previously traced connection between the trunk 390 and the toll line 702. Finally, the ring relay R535 recompletes, at the contacts 538, the previously traced connection between the upper winding of the supervisory relay R610 and the control conductor C394 of the trunk 390. At this time, in the event the subscriber at the called subscriber substation T1 in the automatic office 380 has not re-answered the call, as a consequence of receiving a re-ring signal, the repeater circuit 400 continues operation to send the disconnect signal over the toll line 702 and, consequently, to the tone unit 701 effecting intermittent operation of the signal-in relay R870 in the repeater circuit 700 in the manner previously explained. The intermittent operation of the signal-in relay R870 again effects flashing of the supervisory lamp L1333 on the display panel 1330 and flashing of the supervisory lamp, not shown, in the cord circuit 1310 in order to continue to render to the operator at the first inward position at the manual dial toll board in the automatic exchange 50 disconnect supervision.

When the subscriber at the called subscriber substation T1 in the automatic office 380 again answers the call by removing the receiver of the telephone instrument thereat from its associated switchhook, the switch train 385 again operates to interrupt the projection of ringing current over the subscriber line 386 extending thereto and to interrupt the application of ground potential upon the control conductor of the trunk line 342 and, consequently, the application of ground potential upon the control conductor C394 of the trunk 390; thereby to bring about the restoration of the supervisory relay R610 in the repeater circuit 400; whereby the supervisory relay R610 restores to arrest the cycle of operation of the relays previously mentioned in the repeater circuit 400 that are causing the transmission of the disconnect signal over the toll line 702 in the manner previously explained. When the disconnect signal is thus removed from the toll line 702, the tone unit 701 brings about the restoration of the signal-in relay R870 in the repeater circuit 700 and the consequent restoration of the supervisory relay R1040; thereby to extinguish the supervisory lamp L1333 and the supervisory lamp, not shown, in the cord circuit 1310; thereby again to render to the operator at the first inward position circuit at the manual dial toll board in the automatic exchange 50 answer supervision. At this time the operator at the first inward position at the manual dial toll board mentioned may converse with the subscriber at the called subscriber substation T1 in the automatic office 380.

When the operator at the first inward position at the manual dial toll board in the automatic exchange 50 receives disconnect supervision, she may effect the release of the established connection by withdrawing the call plug 1312 from the jack J1314 terminating the trunk 1380; thereby interrupting the previously traced circuit for maintaining operated the sleeve relay R1070 in the repeater circuit 700. Upon restoring the sleeve relay R1070 interrupts, at the contacts 1072, the previously mentioned circuit for maintaining operated the release pulse timer relay R1030 and the previously traced multiple circuit for maintaining operated the finder stop relay R980. Upon restoring the finder stop relay R980 completes, at the contacts 983, a circuit, including the contacts 1013 and 1071, for operating the supervisory start relay R850. Upon operating the supervisory start relay R850 effects operation of the send relay R730 and the prepare relay R750; whereby the relays mentioned upon operating initiate the transmission of 60 cycle modulated 1,000 cycle current over the toll line 702 from the tone unit 701; all in the manner previously explained. Also upon restoring the release pulse timer relay R1030 sets its armature RA1031 into vibration; whereby the previously traced holding circuit for maintaining operated the release pulse timer relay R1010 is alternately completed and interrupted at the contacts associated with the vibratory armature RA1031. However, after a time interval of approximately two seconds, the armature RA1031 of the release pulse timer relay R1030 settles down effecting complete interruption of the holding circuit for maintaining operated the release pulse timer relay R1010. Upon restoring the release pulse timer relay R1010 interrupts, at the contacts 1013, the previously traced circuit for maintaining operated the supervisory start relay R850 in order to cause the latter relay to restore shortly thereafter, it being of the slow-to-release type. Upon restoring the supervisory start relay R850 effects the restoration of the send relay R730 and the prepare relay R750; thereby disconnecting the tone unit 701 from the toll line 702 in order to terminate the long pulse of 60 cycle modulated 1,000 cycle current, constituting a release signal. Finally, the release pulse timer relay R1010 interrupts, at the contacts 1015, the previously mentioned path for applying ground potential to the busy conductor C1110; whereby there is interrupted the multiple holding circuits for maintaining operated the sequence relay R970, the answer relay R1020, the switch through relay R740 and the pad cutout relay R710. Accordingly, at this time only the incoming release relay R920 in the repeater circuit 700 occupies its operated position; whereby the repeater circuit 700 is completely released. Also at this time ground potential is applied by way of the previously traced path through the lower winding of the sleeve relay R1070 to the sleeve conductor C1385 of the trunk 1380; thereby marking the trunk 1380 and, consequently, the repeater circuit 700 as idle to the various operator positions at the manual dial toll board in the automatic exchange 50.

This release signal sent over the toll line 702 is received by the tone unit 601 and brings about continuous operation of the signal-in relay R620 in the repeater circuit 400 for a corresponding time interval of approximately two seconds; the release signal being in the form of a 60 cycle modulated 1000 cycle pulse of current of a time duration of approximately two seconds. Upon operating the signal-in relay R620 completes, at the contacts 622, a multiple circuit for maintaining operated the switch over relay R570, etc., and interrupts, at the contacts 624, a further point in the previously traced circuit for operating the supervisory pulse relay R660; thereby causing the latter relay to restore shortly thereafter in the special event that it is operating at this time as a consequence of intermittent operation of the supervisory relay R610 under the control of the switch train 385 when the subscriber at the called subscriber substation T1 in the automatic office 380 replaced the receiver of the telephone instrument thereat upon its associated switch hook. Accordingly, upon restoring the supervisory pulse relay R660 prevents further operation of the relays mentioned in the repeater circuit 400 to control operation of the tone unit 601 to return the disconnect signal over the toll line 702; all in the manner previously explained. Further, the signal-in relay R620 completes, at the contacts 623, a circuit, including the contacts 474 and 622, for operating shortly thereafter the inter-pulse timer relay R630; and completes, at the contacts 626, the previously traced circuit for operating the ring control relay R560. Also the signal-in relay R620 interrupts, at the contacts 625, the previously mentioned circuit for maintaining operated the incoming release relay R460; thereby to cause the latter relay to restore shortly thereafter since it is of the slow-to-release type. At this point it is again noted that the incoming release relay R460 is caused to restore at this time as a consequence of the signal-in relay R620 being maintained operated for approximately two seconds as a result of the tone unit 601 receiving the release signal over the toll line 702. Upon restoring the incoming release R460 interrupts, at the contacts 462, the previously traced holding circuit for energizing the selector seize relay R450 in order to cause the latter relay to restore. Upon restoring the selector seize relay R450 interrupts, at the contacts 455, the original path for maintaining operated the line supervisory relay R480, etc., whereby at this time the line supervisory relay R480, etc., are maintained operated only by virtue of the closed contacts 622 of the operated signal-in relay R620. Also upon restoring the selector seize relay R450 interrupts, at the contacts 451, the previously traced path for applying ground potential to the control conductor C393 of the trunk 390 in order to bring about the release of the incoming toll selector 320 and the outgoing toll selector 340 in the automatic exchange 30, and the release of the switch train 385 in the automatic office 380. When the switch train 385 is thus released, the subscriber line 386 extending to the called subscriber substation T1 in the automatic office 380 is marked as idle thereto, assuming that the subscriber at the called subscriber substation T1 has replaced the receiver of the telephone instrument thereat upon its associated switch hook at this time.

At the conclusion of the release signal, the signal-in relay R620 in the repeater circuit 400 restores interrupting, at the contacts 622, the alternative holding circuit for maintaining operated the line supervisory relay R480, etc.; whereby the latter relays restore. Also the following relays in the repeater circuit 400 restore when the contacts 622 are opened incident to the restoration of the signal-in relay R620: the sequence relay R680, the supervisory control relay R520, the switch over relay R570, the supervisory relay R530, and the pad cutout relay R600. Also upon restoring the selector seize relay R450 interrupts, at the contacts 452, the previously mentioned path for applying ground potential to the control conductor C398 of the trunk 395; and re-prepares, at the contacts 453, the previously traced path for applying battery potential by way of the upper winding of the release relay R420 to the control conductor C398 of the trunk 395. Finally, upon restoring the signal-in relay R620 recompletes, at the contacts 625, the previously traced circuit for operating the incoming release relay R460; whereby the latter relay upon operating completes, at the contacts 461, the previously traced path for applying battery potential by way of the upper winding of the release relay R420 to the control conductor C398 of the trunk 395; whereby the trunk 395 and, consequently, the repeater circuit 400 is marked as idle to the outgoing toll selector 345, etc., having access thereto. Also when the contacts 622 are opened, the previously traced circuit for illuminating the busy lamp L687 is interrupted; and when the busy lamp L687 is thus extinguished, it indicates that the repeater circuit 400 is idle at this time and available for further use.

At this time all of the apparatus involved in the established connection between the first inward operator position at the manual dial toll board in the automatic exchange 50 and the called subscriber substation T1 in the automatic office 380 is completely released and available for further use.

Reconsidering the established connection between the first inward position at the manual dial toll board in the automatic exchange 50 and the called subscriber substation T1 in the automatic office 380, while the call plug 1312 of the cord circuit 1310 at the first inward position mentioned occupies its position inserted into the jack J1314 terminating the trunk 1380, a circuit is completed for maintaining operated the sleeve relay R1070 in the repeater circuit 700, as previously explained. The operated sleeve relay R1070 retains completed, at the contacts 1072, the previously traced circuit for maintaining operated the release pulse timer relay R1030; and completes at the contacts 1072, a path including the contacts 1014, 745, 1041, 984, 1061, and the grounded busy conductor C1110, for short-circuiting the upper winding of the auxiliary relay R780. However, when the operator at the first inwardly position mentioned withdraws the call plug 1312 of the cord circuit 1310 from the jack J1314 terminating the trunk 1380, the previously traced circuit for maintaining operated the sleeve relay R1070 in the repeater circuit 700 is interrupted as previously explained. Upon restoring the sleeve relay R1070 interrupts, at the contacts 1072, the previously traced circuit for energizing directly the winding of the pulse timer relay R1030 and the previously traced path for short-circuiting the upper winding of the auxiliary relay R780; whereby an alternative circuit is completed for energizing the upper winding of the auxiliary relay R780 in series with the winding of the release pulse timer relay R1030 and the winding of the finder stop relay R980, provided the subscriber at the called subscriber substation T1 in the automatic office 380 has not replaced the receiver of the telephone instrument thereat upon its associated switchhook at this time. The above-mentioned circuit extends from the grounded busy conductor C1110 by way of the contacts 1061, 984, 1041 and 745, the upper winding of R780, the contacts 1014 and the winding of R1030 to battery; and also by way of the contacts 1014 and the contacts 746 and the winding of R980 to battery. When this series parallel circuit is completed, the release pulse timer relay R1030 and the finder stop relay R980 are retained in their operated positions and the auxiliary relay R780 is operated.

Upon operating the auxiliary relay R780 completes, at the contacts 786, a connection, including the contacts 774, 934 and 981', between the timer conductor C995 and the junction between the upper and lower windings of the time pulse relay R770. Ground potential is applied to the timer conductor C995 at the expiration of such predetermined time interval of approximately two and one-half seconds; whereby ground potential may be applied to the timer conductor C995 at any time within two and one-half seconds after the upper and lower windings of the time pulse relay R770 are connected thereto;

whereby when ground potential is applied to the timer conductor C995, a circuit substantially identical to that previously traced is completed for energizing the upper winding of the time pulse relay R770 and a substantially identical circuit also including the contacts 772 and the resistor 775′ for energizing in multiple the lower winding of the time pulse relay R770. When the upper and lower windings of the time pulse relay R770 are thus energized, the latter relay does not operate as it is of the differential type; subsequently, when ground potential is removed from the timer conductor C995, the previously traced circuits for energizing in multiple the upper and lower windings of the time pulse relay R770 are interrupted; whereby the magnetic flux in the upper winding of the time pulse relay R770 does not immediately decay by virtue of the shunt connection including the lower winding thereof and the contacts 772 extending also to battery potential; whereby the upper and lower windings of the time pulse relay R770 are effectively energized in series circuit relation during the decay of the magnetic flux therein causing the latter relay to operate in order to close the contacts 771, which are in turn connected by way of the contacts 783 to ground potential. Thus the upper and lower windings of the time pulse relay R770 are energized in series circuit relation causing the latter relay to operate fully in order to interrupt, at the contacts 772, the previously traced path for short-circuiting in series the upper and lower windings thereof. Also the time pulse relay R770 completes, at the contacts 773, a connection, including the contacts 981′, 934, 786, 744′ and 1024 between the timer conductor C995 and the supervisory relay R1040. At the conclusion of two and one-half seconds when ground potential is reapplied to the timer conductor C995, the supervisory relay R1040 is operated over the above traced circuit to interrupt, at the contacts 1041, the previously traced circuit for energizing the upper winding of the auxiliary relay R780 in series with the multiple connected windings of the release pulse timer relay R1030 and the finder stop relay R980; whereby the relays mentioned restore in order to initiate the normal release of the repeater circuit 700 and the connected repeater circuit 400 in the manner previously explained.

In view of the above description, it will be appreciated that prior to the time that the subscriber at the called subscriber substation T1 in the automatic office 380 replaces the receiver of the telephone instrument thereat upon its associated switchhook, the operator at the first inward position at the manual dial toll board in the automatic exchange 50 may withdraw the call plug 1312 of the cord circuit 1310 from the jack J1314 without effecting the release of the repeater circuit 700 until after the expiration of approximately two and one-half seconds. This arrangement permits the operator at the first inward position at the manual dial toll board to change cord circuits without effecting the release of the repeater circuit 700 and the connected repeater circuit 400. Specifically, after the call plug 1312 of the cord circuit 1310 is withdrawn from the jack J1314, the plug of another cord circuit at the first inward position at the manual dial toll board mentioned is immediately thereafter inserted into the jack J1314 in order again to effect operation of the sleeve relay R1070 in the repeater circuit 700 before the supervisory relay R1040 has had time enough to operate from the timer conductor C995 subsequent to operation of the time pulse relay R770. In this case, upon reoperating the sleeve relay R1070 again completes, at the contacts 1072, the holding circuits for maintaining operated the release pulse timer relay R1030 and the finder stop relay R980 and also the path previously traced for short-circuiting the upper winding of the auxiliary relay R780. The auxiliary relay R780 then restores to interrupt, at the contacts 783, the circuit previously traced for maintaining operated the time pulse relay R770; and interrupts, at the contacts 786, a further point in the previously traced connection between the timer conductor C995 and the supervisory relay R1040 in order positively to prevent operation of the latter relay from the timer conductor C995. At this time the connection to the called subscriber substation T1 in the automatic office 380 is again completed to the first inward position at the manual dial toll board in the automatic exchange 50 utilizing another cord circuit at the first inward position mentioned.

In view of the foregoing it will be understood that when the operator at the first inward position at the manual dial toll board in the automatic exchange 50 withdraws the call plug 1312 of the cord circuit 1310 from the jack J1314 the repeater circuit 700 is either released immediately or at the expiration of approximately two and one-half seconds depending respectively upon the restored or operated position of the supervisory relay R1040 therein. The relay R1040 occupies its operated position in the event the subscriber at the called subscriber substation T1 in the automatic office 380 has replaced the receiver of the telephone instrument thereat upon its associated switchhook effecting the transmission of the disconnect signal from the repeater circuit 400 to the repeater circuit 700 and the consequent operation of the supervisory relay R1040 in the repeater circuit 700; all in the manner previously explained. On the other hand, during the maintenance of the established connection between the first inward operator position at the manual dial toll board in the automatic exchange 50 and the called subscriber substation T1 in the automatic office 380 the supervisory relay R1040 in the repeater circuit 700 occupies its restored position.

In view of the foregoing description of the repeater circuit 700 it will be understood that the impedance network including the condenser 723 and the resistor 722 is normally connected across the line conductors of the toll line 702 when the repeater circuit 700 is idle; that this impedance network is connected in series between the toll line 702 and the sending conductors C701 and C702 extending to the tone unit 701 when the tone unit 701 is in sending condition; and that this impedance network mentioned is disconnected from across the line conductors of the toll line 702 when the connection is established thereover.

*A call from Rio de Janeiro to Jundiahy*

Assuming that a call has been extended to the first inward operator position at the manual dial toll board in the automatic exchange 50 in Rio de Janeiro that is to be extended to a subscriber substation in the manual exchange 300 in Jundiahy, the call may have been answered at the first inward operator position mentioned utilizing the cord circuit 1310 thereat; whereupon the operator mentioned may insert the call plug 1312 into the jack J1314 terminating the trunk 1300 extending to the repeater circuit 700, assuming that the trunk 1380 and the repeater circuit 700 are idle at this time. The repeater circuit 700 effects seizure of the repeater circuit 400 over the toll line 702 in the manner previously explained; whereupon the operator mentioned dials a first digit 1 and a second digit 9 indicating that the call is to be routed to the manual dial toll board 301 in the manual exchange 300 in Jundiahy. At this time the repeater circuit 400 has seized the incoming toll selector 320 over the trunk 390 and an idle register sender is connected by the associated finder circuit to the cable 1090 extending to the repeater circuit 700, for example, the register sender 1402 may be connected by the associated finder circuit 1401 to the cable 1090; whereby the digits 1 and 9 are registered in the register sender 1402; all in the manner previously explained. The register sender 1402 controls the repeater circuit 700; whereby the tone unit 701 is governed to transmit dialing signals corresponding to the digits 1 and 9 over the toll line 702; whereby the tone unit 601 responds in order to cause the repeater circuit 400 to repeat the digits 1 and 9 over the trunk 390; all in the manner previously explained. The incoming toll selector 320 responds to the first digit 1 to select the group of outgoing toll selectors, including the outgoing toll selector 335, and then an idle outgoing toll selector therein. For example, the incoming toll selector 320 may select the trunk 336 extending to the outgoing toll selector 335. The outgoing toll selector 335 then responds to the second digit 9 to select the group of toll lines, including the toll line 302 extending between the automatic exchange 30 in Sao Paulo and the manual exchange 300 in Jundiahy, and then an idle toll line therein. For example, the outgoing toll selector 335 may select the incoming trunk 337 extending to the toll trunk circuit 310 terminating the toll line 302 extending between the automatic exchange 30 and the manual exchange 300.

When the outgoing toll selector 335 operates to select the incoming trunk 337 extending to the toll trunk circuit 310, the loop circuit extending back over the trunk 336, the incoming toll selector 320 and the trunk 390 to the upper winding of the loop test relay R500 in the repeater circuit 400 is dried and no ground potential is applied to the control conductor of the trunk 336, and, consequently, to the control conductor 394 of the trunk 390. Accordingly, the loop test relay R500 in the repeater circuit 400 restores; however the supervisory relay R610 does not operate since there is no ground potential applied to the control conductor C394 of the trunk 390. Upon restoring the loop test relay R500 effects the restoration of the control relay R590 and the ring control relay R560; all in the manner previously explained. Upon restoring the ring control relay R560 effects operation of the ring control relay R540 and subsequent restoration of the ring control relay R550; upon operating the ring control relay R540 effects operation of the ring relay R535; upon restoring the ring control relay R550 effects subsequent restoration of the ring control relay R540; and upon restoring the ring control relay R540 effects subsequent restoration of the ring relay R535; all in the manner previously explained. When the ring relay R535 occupies its operated position, there is completed, at the contacts 537, the previously traced path for applying battery potential by way of the resistor 536' to the line conductor C392 of the trunk 390, which application of battery potential to the line conductor C392 of the trunk 390 is forwarded by way of the incoming toll selector 320, the trunk 336, the outgoing toll selector 335 and the corresponding line conductor of the incoming trunk 337 to the toll trunk circuit 310; whereby the toll trunk circuit 310 operates to transmit a ring-down signal over the toll line 302 to the manual toll board 301 in the manual exchange 30 in order to indicate to the operator at the manual toll board 301 that a call is waiting to be answered on the toll line 302.

Incident to operation of the ring control relay R540 and prior to restoration of the ring control relay R550, as explained above, the ring control relay R540 completes, at the contacts 542, a circuit, including the contacts 576, 551, 474 and 455, for energizing the lower winding of the supervisory relay R610; thereby to cause the latter relay to operate and complete, at the contacts 612, a substantially identical holding circuit for energizing the lower winding thereof, and including the contacts 542, 474 and 455. Accordingly, in the present case, the supervisory relay R610 restores incident to the switch through of the outgoing toll selector 335 and then reoperates incident to operation of the ring control relays R550 and R540, as explained above; and thereafter when the ring control relay R540 restores, it interrupts, at the contacts 542, the above traced holding circuit for energizing the lower winding of the supervisory relay R610 in order to cause the latter relay again to restore. Thus the supervisory relay R610 restores and then reoperates and then restores again incident to the ring-down of the toll line 302 by the toll trunk circuit 310 as explained above. Each time the supervisory relay R610 restores, it completes, at the contacts 614, the previously traced circuit for energizing the supervisory pulse relay R660; whereby the latter relay is operated and then restored twice in succession. Each time the supervisory pulse relay R660 operates, it brings about a cycle of operation of the relays mentioned in the repeater circuit 400 and including the send relay R675; whereby the tone unit 601 is controlled to transmit over the toll line 702 two short splashes of 60 cycle modulated 1000 cycle current and respectively constituting an end-of-dialing signal and a completion supervisory signal. The transmission from the repeater circuit 400 over the toll line 702 of both an end-of-dialing signal and a completion supervisory signal at this time is necessary by virtue of the fact that no separate control is brought about in the repeater circuit 400 when the operator at the manual toll board 301 in the manual exchange 300 actually answers the call.

The tone unit 701 responds to the end-of-dialing signal and the completion supervisory signal following shortly thereafter that are transmitted over the toll line 702 in order to control the repeater circuit 700 in the manner previously explained; whereby the supervisory relay R1040 in the repeater circuit 700 is first operated and then restored in order to transmit end-of-dialing supervision and then completion supervision to the first inward operator position at the manual dial toll board in the automatic exchange 50; all in the manner previously explained.

The operator at the manual toll board 301 in the manual exchange 300 then answers the call completing a connection to the toll line 302 and therefrom by way of the toll trunk circuit 310, the incoming trunk 337, the outgoing toll selector 335, the trunk 336, the incoming toll selector 320 and the trunk 390 to the repeater circuit 400; which repeater circuit 400 is connected by way of the toll line 702 to the repeater circuit 700; and thence by way of the trunk 1380, the jack J1314, and the call plug 1312 of the cord circuit 1310 to the position equipment at the first inward operator position mentioned. At this time the operator at the first inward position at the manual dial toll board in the automatic exchange 50 advises the operator at the manual toll board 301 in the manual excahnge 300 concerning the extension of the call to the called subscriber substation in the manual exchange 300. The operator at the manual toll board in the manual exchange 300 then completes the connection to the called subscriber substation in the manual exchange 300 and then disconnects from the established connection. The operator at the first inward position at the manual dial toll board in the automatic exchange 50 also disconnects from the established connection. At this time, an established connection is completed between the incoming circuit to the automatic exchange 50 and the called subscribed substation in the manual exchange 300.

At the conclusion of the established connection the operator at the manual toll board 301 in the manual exchange 300 takes down the connection to the called subscriber substation therein and operates her ring key in order to cause ringing current to be projected over the toll line 302 to the toll trunk circuit 310. The toll trunk circuit 310 responds to the ringing current projected over the toll line 302 in order to apply ground potential to the control conductor of the incoming trunk 337 and, consequently, to the control conductor C394 of the trunk 390; thereby to complete the previously traced circuit for energizing the upper winding of the supervisory relay R610 in order to cause the latter relay to operate. Upon operating the supervisory relay R610 effects operation of the supervisory pulse relay R660, which latter relay brings about operation of the relays mentioned, including the send relay R675, in the repeater circuit 400; whereby the relays mentioned operate continuously through a plurality of cycles; all in the manner previously explained. Each time the relays mentioned, including the send relay R675, in the repeater circuit 400 operate through a cycle, a splash of 60 cycle modulated 1000 cycle current is transmitted over the toll line 702; whereby a series of 60 cycle modulated 1000 cycle pulses of current, constituting a disconnect signal, are transmitted from the repeater circuit 400 over the toll line 702 at this time; all in the manner previously explained. The tone unit 701 responds to the disconnect signal received over the toll line 702 in order to cause corresponding intermittent operation of the signal-in relay R870 in the repeater circuit 700 and the consequent intermittent operation of the supervisory relay R1040; whereby the flashing disconnect signal is transmitted to the operator at the first inward position at the manual dial toll board in the automatic exchange 50; all in the manner previously explained.

At this time, the operator at the first inward position at the manual dial toll board in the automatic exchange 50 may effect the release of the repeater circuit 400, and the repeater circuit 700 by withdrawing the call plug 1312 of the cord circuit 1310 from the jack J1314 terminating the trunk 1380; all in the manner previously explained; whereby the incoming toll selector 320 is released effecting the release of the outgoing toll selector 335. When the outgoing toll selector 335 is thus released, the toll trunk circuit 310 is released, marking the toll line 302 extending between the automatic exchange 30 and the manual exchange 300 as idle.

At this time all of the apparatus involved in the established connection between the first inward operator position at the manual dial toll board in the automatic exchange 50 and the manual toll board 301 in the manual exchange 30 is completely released and available for further use.

*A call from Campinas to Rio de Janeiro*

Assuming that a call has been extended to the Strowger dial toll board 379 in the automatic exchange 370 in Campinas, that is to be extended to a subscriber substation in the automatic exchange 50 in Rio de Janeiro, the operator at the Strowger dial toll board 379 dials the automatic switching and control equipment 377 in order to effect operation thereof in order to select the outgoing branch of an idle trunk extending to a repeater circuit, such for example, as the outgoing branch of the trunk 376 extending to the repeater circuit 375. When the connection is thus extended to the repeater circuit 375 terminating the toll line 351 extending between the automatic exchange 370 in Campinas and the automatic exchange 30 in Sao Paulo, the repeater circuit 375 operates in order to send from the associated tone unit 378 a seizing signal over the toll line 351 which is repeated by the voice current repeaters 352 included in the toll line 351 to the repeater circuit 350. The tone unit 353 associated with the repeater circuit 350 responds to the seizing signal and governs operation of the repeater circuit 350; whereby it is operatively connected to the trunk 326 extending to the incoming toll selector 325; whereby the incoming toll selector 325 is seized and conditioned to be responsive to a digit transmitted thereto. The operator at the Strowger dial toll board 379 in the automatic exchange 370 then dials the first digit 4; whereby the repeater circuit 375 is governed to cause the tone unit 378 to send a corresponding dialing signal over the toll line 351. The tone unit 353 responds to this dialing signal and governs the repeater circuit 350; whereby a corresponding digit is transmitted over the trunk 326 to the incoming toll selector 325 in order to effect operation thereof to select an idle outgoing toll selector, such for example, as the outgoing toll selector 345. Specifically, the incoming toll selector 325 selects the trunk 346 extending to the outgoing toll selector 345; whereby the outgoing toll selector 345 is conditioned to be responsive to the next digit. The operator as the Strowger dial toll board 379 in the automatic exchange 370 then dials the second digit 6 in order to effect operation of the repeater circuits 375 and 350 in the manner explained above; whereby the repeater circuit 350 is controlled to transmit the second digit 6 to the outgoing toll selector 345 in order to effect operation thereof to select a trunk extending to an idle repeater circuit in the group, including the repeater circuit 400. Assuming that the outgoing toll selector 345 selects the trunk 395 extending to the repeater circuit 400, the repeater circuit 400 operates to transmit a seizing signal over the toll line 702 in order to bring about operation of the repeater circuit 700; whereby the repeater circuit 700 is operatively connected to the cable 1410 extending to the preselector 1403 and therefrom to an idle coder. For example, the preselector 1403 may have previously selected the cable 1420 extending to the coder 1404; whereby the coder 1404 is operatively connected to the repeater circuit 700 and is conditioned to register the first digit transmitted over the toll line 702 to the repeater circuit 700.

Incident to operation of the repeater circuit 400 in conjunction with the tone unit 601 to transmit the seizing signal over the toll line 702 in the manner previously explained, the control relay R505 operates to complete, at the contacts 506, the previously traced path, including the contacts 491 and 485, for applying battery potential by way of the upper winding of the tandem test relay R470 to the control conductor C399 of the trunk 395; whereby the tandem test relay R470 in the repeater circuit 400 performs a test to determine whether another repeater circuit is included in the connection extending thereto; which situation is the present case, since the repeater circuit 350 terminating the toll line 351 is connected by way of the trunk 326, the incoming toll selector 325, the trunk 346, the outgoing toll selector 345 and the trunk 395 to the repeater circuit 400. Accordingly at this time, ground potential in the repeater circuit 350 is applied by way of a path analogous to the following path to the control conductor of the trunk 326 by way of the lower winding of the tandem test relay therein; the analogous path in the repeater circuit 400 extending from ground by way of the contacts 455, the lower winding of the tandem test relay R470, the contacts 593 and 538 to the control conductor C394 of the trunk 390 extending to the incoming toll selector 320. Hence at this time, a series circuit is completed for energizing the lower winding of the tandem test relay in the repeater circuit 350 and the upper winding of the tandem test relay R470 in the repeater circuit 400; whereby the tandem test relays mentioned operate respectively to cut out repeating functions in the repeater circuits 350 and 400, as explained more fully hereinafter. This operation is necessary since the terminating repeater circuit 375 and 700 respectively disposed in the automatic exchanges 370 and 50 cooperate with each other in order to transmit the required supervisory signals between the Strowger dial toll board 379 in the automatic exchange 370 and the called subscriber substation in the automatic exchange 50.

Specifically, upon operating the tandem test relay R470 in the repeater circuit 400, completes, at the contacts 471, a holding circuit including the control conductor C399 of the trunk 395 for maintaining it operated; and completes, at the contacts 475, a circuit including the contacts 625 and 655 for operating the ring control relay R540. Upon operating the ring control relay R540 completes, at the contacts 543, an alternative holding circuit for maintaining operated the incoming release relay R460; and completes, at the contacts 541, a circuit, including the contacts 511 and 441, for energizing the upper winding of the switch-through relay R640 in order to cause the latter relay to operate. Upon operating the switch-through relay R640 completes, at the contacts 646, a holding circuit, including the contacts 441, for energizing the upper winding thereof. Further, the tandem test relay R470 interrupts, at the contacts 477, the previously traced circuit for energizing in multiple the upper and lower windings of the supervisory control relay R520 in order to prevent the latter relay for operating as a consequence of subsequent operation of the signal-in relay R620. Further, the tandem test relay R470 interrupts. at the contacts 474, the previously traced path for applying ground potential to the contacts 623 of the signal-in relay R620; thereby to prevent the subsequent operation of the signal-in relay R620 from effecting operation of the inter-pulse timer relay R630. Hence, subsequent operation of the signal-in relay R620 is ineffective to control operation of the supervisory control relay R520 and the inter-pulse timer relay R630. Also upon operating the switch-through relay R640 interrupts, at the contacts 644, the previously traced path, including the contacts 677, for bridging the resistor 693 and the condenser 692 across the line conductors of the toll line 702; and completes, at the contacts 645, the previously traced circuit for energizing in series the upper and lower windings of the line supervisory relay R480 in order to cause the latter relay to operate. Upon operating the line supervisory relay R480 interrupts, at the contacts 481 and 483, the previously traced loop circuit including the line conductors C396 and C397 of the trunk 395 and the upper and lower windings of the line relay R430 in order to cause the latter relay to restore. Also the line supervisory relay R480 completes, at the contacts 482 and 484, the previously traced connection between the line conductors C396 and C397 of the trunk 395 and the line conductors of the toll line 702.

During the progress of the connection when the operator at the Strowger dial toll board 379 in the automatic exchange 370 dials the digits comprising the directory number of the called subscribed substation in the automatic exchange 50, the repeater circuit 375 operates in conjunction with the tone unit 378 to transmit corresponding dialing signals over the toll line 351 to the repeater circuit 350; and therethrough by way of the trunk 326, the incoming toll selector 325, the trunk 346, the outgoing toll selector 345 and the trunk 395 into the repeater circuit 400; and therethrough over the toll line 702 into the repeater circuit 700; whereby the tone unit 701 associated with the repeater circuit 700 responds in order to cause the repeater circuit 700 to transmit corresponding ground inpulse digits over the pulse conductor C1413 in the cable 1410 and thence over the preselector 1403 and the pulse conductor C1421 in the cable 1420 into the coder 1404; whereby the digits mentioned are registered in the coder 1404; all in a manner substantially identical to that previously explained.

In view of the foregoing, it will be understood that the ordinary signals transmitted over the toll line 351 through the repeater circuit 350 cause the tone unit 353 to respond; which tone unit 353 controls operation of the signal-in relay in the repeater circuit 350; however, without effect since the tandem test relay in the repeater circuit 350 occupies its operated position at this time. Similarly the ordinary signals transmitted over the trunk 395 through the repeater circuit 400 cause the tone unit 601 to respond; which tone unit 601 controls operation of the signal-in relay R620 in the repeater circuit 400; however, without effect since the tandem rest relay R470 in the repeater circuit 400 occupies its operated position at this time.

The operation of the coder 1404 to govern the automatic switch train 1300 to extend the connection to the called subscriber substation in the automatic exchange 50 is the same as previously described. Also the supervision of the established connection between the Strowger dial toll board 379 in the automatic exchange 370 and the called subscriber substation in the automatic exchange 50 is the same as previously explained.

Subsequently, when the established connection between the Strowger dial toll board 379 in the automatic exchange 370 and the called subscriber substation in the automatic exchange 50 is released, the operator at the Strowger dial toll board 379 in the automatic exchange 370 operates her release call key in order to bring about the release of the automatic switching apparatus and control equipment 377. When the automatic switching apparatus and control equipment 377 is thus released, it effects the release of the repeater circuit 375 in a manner substantially identical to that previously explained; whereby the repeater circuit 375 incident to release transmits the release signal over the toll line 351, bringing about the release of the repeater circuit 350, the incoming toll selector 325, the outgoing toll selector 345, the repeater circuit 400, the repeater circuit 700 and the automatic switch train 1300; all in a manner substantially identical to that previously explained. In this conjunction it is noted that the repeater circuits 350 and 400 are released as a consequence of the transmission of the release signal over the connection, just as is the repeater circuit 700, as previously explained.

Specifically, in conjunction with the release of the repeater circuit 400, it is pointed out that the tone unit 601 responds to the release signal effecting operation of the signal-in relay R620 in the repeater circuit 400 for a time interval of approximately two seconds. Upon operating the signal-in relay R620 interrupts, at the contacts 625, the previously traced circuit for maintaining operated the ring control relay R540; whereby the latter relay restores shortly thereafter, it being of the slow-to-release type. Upon restoring the ring control relay R540 interrupts, at the contacts 543, the alternative holding circuit for maintaining operated the incoming release relay R460; whereby the latter relay restores shortly thereafter, it being of the slow-to-release type. Thus the incoming release relay R460 restores as a result of the tone unit 601 receiving the release signal for a time duration of approximately two seconds. Upon restoring the incoming release relay R460 interrupts, at the contacts 461, the previously traced holding circuit for energizing in series the upper and lower windings of the release relay R420 causing the latter relay to restore. Upon restoring the release relay R420 completes, at the contacts 420, the previously traced circuit for operating the supervisory pulse relay R660; and interrupts, at the contacts 426, the previously mentioned circuit for maintaining operated the release pulse relay R435. Upon operating the supervisory pulse relay R660 effects operation of the control relay R505, the send relay R675 and the prepare relay R670; whereby the relays mentioned initiate the transmission from the tone unit 601 over the toll line 702 of 60 cycle modulated 1000 cycle current; all in the manner previously explained. Upon restoring the release pulse-timer relay R435 effects the restoration of the release pulse-timer relay R440 after a considerable time interval, in the manner previously explained. Upon restoring the release pulse-timer relay R440 interrupts, at the contacts 444, the previously traced circuit for maintaining operated the supervisory pulse relay R660 in order to cause the latter relay to restore and bring about the restoration of the prepare relay R670, the send relay R675 and the control relay R505. When the send relay R675 is thus restored, it disconnects the tone unit 601 from the toll line 702; thereby terminating the long pulse of 60 cycle modulated 1,000 cycle current, constituting a release signal. Finally the release pulse-timer relay R440 interrupts, at the contacts 441, the multiple holding circuits for maintaining operated the line supervisory relay R480, etc.; whereby the repeater circuit 400 is completely released at this time. Accordingly at this time only the incoming release relay R460 in the repeater circuit 400 occupies its operated position; and negative potential battery is applied by way of the previously traced path, including the upper winding of the release relay R420, to the control conductor C398 of the trunk 395; thereby marking the trunk 395 and, consequently, the repeater circuit 400 as idle to the outgoing toll selectors 345, etc., having access thereto.

Recapitulating, it is pointed out that incident to the release of the established connection between the Strowger dial toll board 379 in the automatic exchange 370 and the called subscriber substation in the automatic exshange 50 that the repeater circuit 375 operates in order to transmit the release signal over the connection in order to bring about the release of all of the apparatus involved therein. However, in order positively to insure that the repeater circuit 700 is released at this time, the repeater circuit 400, incident to release, transmits again the release signal over the toll line 702 to the tone unit 701 associated with the repeater circuit 700. Accordingly, the tone unit 701 receives the release signal twice successively; first from the repeater circuit 375 and then from the repeater circuit 400.

The release of the repeater circuit 700 incident to the reception of either of the release signals mentioned, proceeds in the manner previously explained; and in passing it is pointed out that in the event the repeater circuit 700 was released incident to the reception of the first release signal, the reception of the second release signal is without effect as the reception of the second release signal merely insures the complete release of the repeater circuit 700.

At this time the established connection between the Strowger dial toll board 379 in the automatic exchange 370 and the called subscriber substation in the automatic exchange 50 is released and all of the apparatus involved is completely reelased and available for further use.

*A call from Rio de Janeiro to Campinas*

Assuming that a call has been extended to the manual dial toll board in the automatic exchange 50 in Rio de Janeiro, that is to be extended to a subscriber substation in the automatic exchange in Campinas, the call may have been answered at the first inward operator position at the manual dial toll board mentioned utilizing the cord circuit 1310 thereat. The operator at the first inward position at the manual dial toll board mentioned may insert the call plug 1312 of the cord circuit 1310 into the jack J1314 terminating the trunk 1380 extending to the repeater circuit 700, assuming that the trunk 1380 and the repeater circuit 700 are idle at this time. When the connection is thus extended to the repeater circuit 700 terminating the toll line 702 extending between the automatic exchange 50 in Rio de Janeiro and the automatic exchange 30 in Sao Paulo, the repeater circuit 700 operates in order to send from the associated tone unit 701 a seizing signal over the toll line 702 which is repeated by the voice current repeaters 703, included in the toll line 702 to the repeater circuit 400. The tone unit 601 associated with the repeater circuit 400 responds to the seizing signal and governs operation of the repeater circuit 400; whereby it is operatively connected to the trunk 390 extending to the incoming toll selector 320; whereby the incoming toll selector 320 is seized and conditioned to be responsive to a digit transmitted thereto. The operator at the first inward position at the manual dial toll board in the automatic exchange 50 then operates the associated digit keys in accordance with the first digit 4, the second digit 9 and the remainder of the digits comprising the directory number of the called subscriber substation in the automatic exchange 370; whereby the digits mentioned are registered in the register sender associated with the repeater circuit 700. For example, the finder circuit 1401 may have associated the register sender 1402 with the cable 1090 extending to the repeater circuit 700; whereby the digits mentioned are registered in the register sender 1402. The register sender 1402 then operates to govern the repeater circuit 700 in order to cause the tone unit 701 to send a dialing signal corresponding to the first digit 4 over the toll line 702. The tone unit 601 responds to this dialing signal and governs the repeater circuit 400; whereby a corresponding digit is transmitted over the trunk 390 to the incoming toll selector 320 in order to effect operation thereof to select an idle outgoing toll selector, such for example, as the outgoing toll selector 345. Specifically, the incoming toll selector 320 selects the trunk 346 extending to the outgoing toll selector 345; whereby the outgoing toll selector 345 is conditioned to be responsive to the next digit. The register sender 1402 then operates to govern the repeater circuit 700 in order to cause the tone unit 701 to send a dialing signal corresponding to the second digit 9 over the toll line 702 in order to effect operation of the repeater circuit 400 in the manner previously explained above; whereby the repeater circuit 400 is controlled to transmit the second digit 9 to the outgoing toll selector 345 in order to effect operation thereof to select a trunk extending to an idle repeater circuit in the group, including the repeater circuit 350. Assuming that the outgoing toll selector 345 selects the trunk 396 extending to the repeater circuit 350, the repeater circuit 350 operates to transmit a seizing signal over the toll line 351 in order to bring about operation of the repeater circuit 375; whereby the repeater circuit 375 is operatively connected by way of the outgoing branch of the trunk 376 to the automatic switching and control equipment 377; whereby the automatic switching control equipment 377 is conditioned to respond to the first digit transmitted over the toll line 351 to the repeater circuit 375.

Incident to operation of the repeater circuit 350 in conjunction with the tone unit 353 to transmit the seizing signal over the toll line 351, in the manner previously explained, a control relay therein operates to complete a path for applying battery potential by way of the upper winding of the tandem test relay therein to the control conductor of the trunk 396; whereby the tandem test relay in the repeater circuit 350 performs a test to determine whether another repeater circuit is included in the connection extending thereto; which situation is the present case since the repeater circuit 400 terminating the toll line 702 is connected by way of the trunk 390, the incoming toll selector 320, the trunk 346, the outgoing toll selector 345 and the trunk 396 to the repeater circuit 350. Accordingly, at this time ground potential in the repeater circuit 400 is applied by way of a path including the contacts 455, the lower winding of the tandem test relay R470, the contacts 593 and 538 to the control conductor C394 of the trunk 390 extending to the incoming toll selector 320. Also at this time, battery potential in the repeater circuit 350 is applied by way of a path analogous to the following path to the control conductor of the trunk 396 by way of the upper winding of the tandem test relay therein; the analogous path in the repeater circuit 400 extending from battery by way of the upper winding of the tandem test relay R470, the contacts 506, 491 and 485 to the control conductor C399 of the trunk 395. Hence, at this time, a series circuit is completed for energizing the upper winding of the tandem test relay in the repeater circuit 350 and the lower winding of the tandem test relay R470 in the repeater circuit 400; whereby the tandem test relays mentioned operate respectively to cut out repeating functions in the repeater circuits 350 and 400 as explained more fully hereinafter. This operation is necessary since the terminating repeater circuits 700 and 375 respectively disposed in the automatic exchanges 50 and 370 cooperate with each other in order to transmit the required supervisory signals between the inward operator position at the manual dial toll board in the automatic exchange 50 and the called subscriber substation in the automatic exchange 370.

Specifically, upon operating the tandem test relay R470 in the repeater circuit 400 completes, at the contacts 472, a circuit, including the contacts 450, for energizing the lower winding of the switch-over relay R570 in series with the lower winding of the loop test relay R500; thereby to effect operation of the switch-over relay R570 and to retain operated the loop test relay R500. Also the tandem test relay R470 completes, at the contacts 475, a circuit, including the contacts 625 and 655, for operating the ring control relay R540. Upon operating the ring control relay R540 completes, at the contacts 543, an alternative holding circuit for maintaining operated the incoming release relay R460; and completes, at the contacts 541, a circuit, including the contacts 511 and 455, for energizing the upper winding of the switch-through relay R640 in order to cause the latter relay to operate. Upon operating the switch-through relay R640 completes, at the contacts 646, a holding circuit, including the contacts 455, for energizing the upper winding thereof. Further, the tandem test relay R470 interrupts, at the contacts 477, the previously traced circuit for energizing in multiple the upper and lower windings of the supervisory control relay R520 in order to prevent the latter relay from operating as a consequence of subsequent operation of the signal-in relay R620. Further, the tandem test relay R470 interrupts, at the contacts 474, the previously traced path for applying ground potential to the contacts 623 of the signal-in relay R620; thereby to prevent the subsequent operation of the signal-in relay R620 from effecting operation of the inter-pulse timer relay R630. Hence, sbsequent operation of the signal-in relay R620 is ineffective to control operation of the supervisory control relay R520 and the inter-pulse timer relay R630. Also upon operating the switch-through relay R640 interrupts, at the contacts 644, the previously traced path, including the contacts 677, for bridging the resistor 693 and the condenser 692 across the line conductors of the toll line 702; and completes, at the contacts 645, the previously traced circuit for energizing in series the upper and lower windings of the line supervisory relay R480 in order to cause the latter relay to operate.

During the progress of the connection, the register sender 1402 operates to govern the repeater circuit 700 in order to cause the tone unit 701 to send dialing signals corresponding to the digits constituting the directory number of the called subscriber substation in the automatic exchange 370 over the toll line 702 to the repeater circuit 400; and therethrough by way of the trunk 390, the incoming toll selector 320, the trunk 346, the outgoing toll selector 345 and the trunk 396 into the repeater circuit 350; and therethrough over the toll line 351 into the repeater circuit 375; whereby the tone unit 378 associated with the repeater circuit 375 responds in order to cause the repeater circuit 375 to transmit corresponding loop impulses over the outgoing branch of the trunk 376 to the automatic switching and control equipment 377; whereby the automatic switching and control equipment 377 operates to select the subscriber line extending to the called subscriber substation. The subsequent operation of the automatic switching and control equipment 377 depends upon the idle or busy condition of the called subscriber substation in the automatic exchange 370 and proceeds in a conventional manner.

In view of the foregoing, it will be understood that the ordinary signals transmitted over the toll line 702 through the repeater circuit 400 cause the tone unit 601 to respond; which tone unit 601 controls operation of the signal-in relay R620 in the repeater circuit 400; however, without effect since the tandem test relay R470 in the repeater circuit 400 occupies its operated position at this time. Similarly the ordinary signals transmitted over the trunk 390 through the repeater circuit 350 cause the tone unit 353 to respond; which tone unit 353 controls operation of the signal-in relay in the repeater circuit 350; however, without effect since the tandem test relay in the repeater circuit 350 occupies its operated position at this time.

The supervision of the established connection between the first inward operator position at the manual dial toll board in the automatic exchange 50 and the called subscriber substation in the automatic exchange 370 is the same as previously explained. Subsequently, when the established connection between the first inward operator position at the manual dial toll board in the automatic exchange 50 and the called subscriber substation in the automatic exchange 370 is released, the operator at the first inward position mentioned withdraws the call plug 1312 of the cord circuit 1310 from the jack J1314 terminating the trunk 1380 in order to effect the release of the repeater circuit 700 in the manner previously explained; whereby the repeater circuit 700 incident to release transmits the release signal over the toll line 702, bringing about the release of the repeater circuit 400, the incoming toll selector 320, the outgoing toll selector 345, the repeater circuit 350 the repeater circuit 375 and the automatic switching and control equipment 377; all in a manner substantially identical to that previously explained. In this conjunction it is noted that the repeater circuits 400 and 350 are released as a consequence of the transmission of the release signal over the connection just as is the repeater circuit 375 as previously explained.

Specially, in conjunction with the release of the repeater circuit 400, it is pointed out that the tone unit 601 responds to the release signal effecting operation of the signal-in relay R620 in the repeater circuit 400 for a time interval of approximately two seconds. Upon operating the signal-in relay R620 interrupts, at the contacts 625, the previously traced circuit for maintaining operated the ring control relay R540; whereby the latter relay restores shortly thereafter, it being of the slow-to-release type. Upon restoring the ring control relay R540 interrupts, at the contacts 543, the alternative holding circuit for maintaining operated the incoming release relay R460; whereby the latter relay restores shortly thereafter, it being of the slow-to-release type. Thus, the incoming release relay R460 restores as a result of the tone unit 601 receiving the release signal for a time duration of approximately two seconds. Upon restoring the incoming release relay R460 interrupts, at the contacts 462, the previously traced holding circuit for energizing in series the upper and lower windings of the selector seize relay R450 causing the latter relay to restore. Upon restoring the selector seize relay R450 interrupts, at the contacts 450, the previously traced holding circuit for energizing the lower winding of the switch-over relay R570 and the lower winding of the loop test relay R500; whereby the loop test relay R500 restores at this time. Also the selector seize relay R450 interrupts, at the contacts 455, the mutliple circuits for maintaining operated the line supervisory relay R480, the switch-over relay R470, etc.; whereby the repeater circuit 400 is completely released at this time. Also at this time, the incoming release relay R460 is reoperated incident to the restoration of the tandem test relay R470 and the signal-in relay R620; and battery potential is applied by way of the previously traced path including the upper winding of the release relay R420 to the control conductor C398 of the trunk 395; thereby marking the trunk 395 and, consequently, the repeater circuit 400 as idle to the outgoing toll selectors 345, etc., having access thereto. Specifically, when the selector seize relay R450 in the repeater circuit 400 is restored in the manner previously explained, it interrupts, at the contacts 451, the previously traced path for applying ground potential to the control conductor C393 of the trunk 390 in order to bring about the release of the incoming toll selector 320 and the outgoing toll selector 345 as previously noted.

Also, incident to release the repeater circuit 350 transmits again over the toll line 351 the release signal; whereby the release signal is first transmitted over the toll line 351 from the tone unit 701 associated with the repeater circuit 700 and then transmitted over the toll line 351 by the tone unit 353 associated with the repeater circuit 350. This arrangement positively insures that the repeater circuit 375 is released at this time since the tone unit 378 receives twice successively the release signal over the toll line 351. The release of the repeater circuit 375 incident to the reception of either of the release signals mentioned proceeds in a manner substantially identical to that previously explained; and in passing it is pointed out that in the event the repeater circuit 375 was released incident to the reception of the first release signal that the reception of the second release signal is without effect as the reception of the second release signal merely insures the complete release of the repeater circuit 375.

At this time the established connection between the first inward operator position at the manual dial toll board in the automatic exchange 50 and the called subscriber substation in the automatic exchange 370 is released and all of the apparatus involved in completely released and available for further use.

*Lock out of the repeater circuit 400*

Again assuming that a call has been initiated at the first operator position circuit 316 at the Strowger dial toll board in the automatic exchange 30 in Sao Paulo, and that the connection has been extended therefrom via the selector of the finder-selector link 315, the trunk 346, the outgoing toll selector 345 and the trunk 395 into the repeater circuit 400, but that the operator mentioned is unable to extend the connection by virtue of failure of the repeater circuit 400 to function properly or by virtue of the toll line 702 extending between the automatic exchange 30 and the automatic exchange 50 being out of order, the operator at the first position circuit 316 mentioned locks the repeater circuit 400 out of service. In order to accomplish this end the operator at the first position 316 mentioned momentarily operates the associated guard key; thereby to cause battery potential to be applied to the line conductor C396 of the trunk 395; whereupon there is completed a circuit, including the contacts 482 and the resistor 656, for energizing in series the lower winding of the guard relay R650 and the winding of the pad control relay R690 in the repeater circuit 400 in order to cause the guard relay R650 to operate, the pad control relay R690 already being in its operated position. Upon operating the guard relay R650 completes, at the contacts 654, a holding circuit, including the conductor C658, for energizing the upper winding thereof; the conductor C658 extending to ground potential through an out-of-order lamp at a test panel, not shown. Accordingly, the guard relay R650 is retained in its operated position and the out-of-order lamp at the test panel mentioned is illuminated in order to indicate to the maintenance man that the repeater circuit 400 is defective and should be repaired. The operator at the first position circuit 316 then releases the selector of the finder-selector link 315 in order to bring about the release of the outgoing toll selector 345; and then attempts to extend the connection, utilizing another repeater circuit in the group including the repeater circuit 400.

Upon operating the guard relay R650 in the repeater circuit 400 completes, at the contacts 651 and 652 obvious paths for applying ground potential to the line conductors extending to the pad 695 and thence to the line conductors of the toll line 702; thereby to reduce noise that might be induced onto adjacent circuits. Further, the guard relay R650 completes, at the contacts 653, an obvious path for applying ground potential to the control conductor C398 of the trunk 395; thereby to mark the trunk 395 and, consequently, the repeater circuit 400 as busy to the outgoing toll selector 345, etc., having access thereto. Further, the guard relay R650 interrupts, at the contacts 655, the previously traced circuit for maintaining operated the incoming release relay R460 in order to cause the latter relay to restore shortly thereafter, it being of the slow-to-release type. Upon restoring the incoming release relay R460 interrupts, at the contacts 461, the previously traced path for applying battery potential by way of the upper winding of the release relay R420 to the control conductor C398 of the trunk 395; and interrupts, at the contacts 462, a further point in the previously traced holding circuit for energizing in series the upper and lower windings of the selector seize relay R450. At this time the repeater circuit 400 is locked out of service and marked against use for extending calls in either direction therethrough.

Also, it is noted that the repeater circuit 400 may be locked out of service from the test panel, not shown, previously mentioned by causing ground potential thereat to be applied momentarily to the conductor C657 in order to complete an obvious circuit for energizing the upper winding of the guard relay R650; whereby the latter relay operates completing, at the contacts 654, the previously mentioned holding circuit, including the conductor C658, for energizing the upper winding thereof in series with the out-of-order lamp at the test panel mentioned.

After the service man has repaired the repeater circuit 400 or the connected toll line 702, the repeater circuit 400 may be again placed in service by interrupting, at the test panel mentioned, the holding circuit, including the conductor C658, for energizing the upper winding of the guard relay R650 in the repeater circuit 400. Upon restoring the guard relay R650 interrupts, at the contacts 651 and 652, the paths for grounding the line conductors extending to the pad 695; and interrupts, at the contacts 653, the previously traced path for applying ground potential to the control conductor C398 of the trunk 395. Finally, the guard relay R650 recompletes, at the contacts 655, the previously traced circuit for operating the incoming release relay R460; whereby the repeater circuit 400 is restored to its normal idle condition.

*An automatic timed clearout of the repeater circuit 400*

In case a surge of current is received over the toll line 702 that in effect constitutes a seizing pulse or signal causing the tone unit 601 to respond and to bring about operation of the signal-in relay R620 in the repeater circuit 400, the signal-in relay R620 causes operation, through its first step, of the selector seize relay R450, and full operation of the inter-pulse timer relay R630 and the series relay R410; all in the manner previously explained. At the conclusion of the seizing pulse the tone unit 601 brings about restoration of the signal-in relay R620; whereby the selector seize relay R450 is operated through its second step in order to cause operation of the loop test relay R500 and the consequent operation of the control relay whereby the repeater circuit 400 is operatively connected to the incoming toll selector 390; all previously explained. Upon operating the control relay R590 completes, at the contacts 597, the previously traced connection between the false seizure conductor C517 and the junction between the upper and lower windings of the answer supervisory relay R490. Shortly thereafter, ground potential is applied to the false seizure conductor C517, since ground potential is applied intermittently thereto at the expiration of approximately each 30 seconds. When ground potential is applied to the false seizure conductor 517, the upper and lower windings of the answer supervisory relay R490 are energized over the previously traced circuit; however the latter relay does not operate since it is of the differential type. Subsequently, when the ground potential is removed from the false seizure conductor C517, the previously traced circuit for energizing in multiple the upper and lower windings of the answer supervisory relay R490 is interrupted. The magnetic flux in the upper winding of the answer supervisory relay R490 does not immediately decay by virtue of the shunt connection including the lower winding thereof and the contacts 496 extending also to battery potential; whereby the upper and lower windings of the answer supervisory relay R490 are effectively energized in series circuit relation during the decay of the magnetic flux therein, causing the latter relay to close its contacts 495 which, in turn, are connected by way of the contacts 474 and 455 to ground potential. Thus the upper and lower windings of the answer supervisory relay R490 are energized in series circuit relation causing the latter relay to operate in order to interrupt, at the contacts 496, the previously mentioned path for shirt-circuiting in series the upper and lower windings thereof. Also the answer supervisory relay R490 completes, at the contacts 493, a connection, including the contacts 597, 564, 477, 526 and 515, between the false seizure conductor C517 and the junction between the upper and lower windings of the supervisory control relay R520.

In the event the ring control relay R560 has not operated by the next time ground potential is connected to and then disconnected from the false seizure conductor C517, indicating normal operation of the repeater circuit 400 and the reception by the tone unit 601 of a dialing signal, the supervisory control relay R520 is operated, in the manner previously explained. Upon operating the supervisory control relay R520 transfers, at the contacts 525, the circuit including the false seizure conductor C517 to the junction between the upper and lower windings of the answer supervisory relay R510 and effects operation of the supervisory relay R530. In the event the ring control relay R560 has not operated, as noted above, by the time the next ground impulse is connected to and then disconnected from the false seizure conductor C517, the answer supervisory relay R510 is operated thereover. Upon operating the answer supervisory relay R510 completes, at the contacts 516, a circuit, including the contacts 450, 473, 599 and 425, for energizing the upper winding of the release relay R420 in order to cause the latter relay to operate. Upon operating the release relay R420 effects operation of the release pulse timer relay R435 which, in turn, effects operation of the release pulse timer relay R440. Upon operating the release pulse timer relay R440 interrupts, at the contacts 443, the previously traced holding circuit for energizing in series the upper and lower windings of the selector seize relay R450 in order to cause the latter relay to restore. Upon restoring the selector seize relay R450 interrupts, at the contacts 450, the previously traced circuit for maintaining operated the release relay R420, which latter relay effects restoration of the release pulse timer relay R435; whereby the armature RA436 is set into vibration in order to effect the restoration of the release pulse timer relay R440 approximately two seconds thereafter; all in the manner previously explained. Also upon restoring the release relay R420 effects operation of the supervisory pulse relay R660; whereby the latter relay effects operation of the relays mentioned, including the send relay R675, in the repeater circuit 400 in order to cause a long pulse of 60 cycle modulated 1000 cycle current to be transmitted from the tone unit 601 over the toll line 702, and constituting a release signal. The restoration of the remainder of the relays in the repeater circuit 400 following the restoration of the release pulse timer relay R440 is the same as that previously explained. At this time the repeater circuit 400 again occupies its normal idle position; whereby only the incoming release relay R460 therein occupies its operated position. Also the release signal transmitted from the tone unit 601 over the toll line 702 incident to the release of the repeater circuit 400 is received by the tone unit 701 in order to bring about the release of the repeater circuit 700 in the event it too has been operated; all in the manner previously explained.

*Automatic release of the repeater circuit 400*

Assume that a connection has been set up by way of the repeater circuit 400 in the automatic exchange 30, the toll line 702, and the repeater circuit 700 in the automatic exchange 50, that incident to the release of the connection the repeater circuit 400 was cleared out and released in the manner previously explained, that the repeater circuit 700 failed to be cleared out and released in the manner previously explained, and that the repeater circuit 700 continues its last operation in order to transmit a busy signal or a disconnect signal over the toll line 702. The first time the supervisory signal mentioned is received over the toll line 702, the tone unit 601 responds in order to bring about operation and then restoration of the signal-in relay R620 in the repeater circuit 400; whereby the signal-in relay R620 effects operation of the selector seize relay R450; all in the manner previously explained. The selector seize relay R450 effects operation of the loop test relay R500 and the consequent operation of the control relay R590; whereby the repeater circuit 400 is operatively connected to the incoming toll selector 320, all previously explained.

The second time the supervisory signal mentioned is received over the toll line 702 the signal-in relay R620 in the repeater circuit 400 is again operated and then restored in order to effect operation of the supervisory control relay R520; and the third time the supervisory signal mentioned is received over the toll line 702, the signal-in relay R620 operates and then restores in order to effect operation of the answer supervisory relay R510. Upon operating the answer supervisory relay R510 effects operation of the release relay R420; whereby the release pulse timer relays R535 and R540 are operated sequentially; the release pulse timer relay R440 effects restoration of the selector seize relay R450; upon restoring the selector seize relay R450 effects restoration of the release relay R420; which latter relay effects the sequential restoration of the release pulse timer relays R435 and R440; all in the manner previously explained. Also upon restoring the release relay R420 effects operation of the supervisory pulse relay R660; whereby the latter relay effects operation of the relays mentioned, including the send relay R675, in the repeater circuit 400 in order to cause the release signal to be sent over the toll line 702; all in the manner previously explained. The restoration of the remainder of the relays in the repeater circuit 400 following the restoration of the release pulse timer relay R440 is the same as that previously explained. At this time the repeater circuit 400 again occupies its normal idle position; and the release signal transmitted from the tone unit 601 over the toll line 702 incident to the release of the repeater circuit 400 is received by the tone unit 701 in order again to attempt the release of the repeater circuit 700.

*An automatic timed clearout of the repeater circuit 700*

In case a surge of current is received over the toll line 702 that in effect constitutes a seizing pulse or signal causing the tone unit 701 to respond and to bring about operation and subsequent restoration of the signal-in relay R870 in the repeater circuit 700, the signal-in relay R870 effects operation of certain of the relays in the repeater circuit 700 and including the selector seize relay R890; all in the manner previously explained. Upon operating the selector seize relay R890 effects operation of the loop test relay R860; which latter relay effects operation of the coder seizing relay R940 and the auxiliary relay R780; whereby the repeater circuit 700 is operatively connected to the cable 1410 and thence by the preselector 1403 to an idle coder, such for example, as the coder 1404 by way of the cable 1420 extending thereto; all previously explained. Upon operating the auxiliary relay R780 completes, at the contacts 786, a connection, including the contacts 774, 934, and 982′ between the false seizure conductor C996 and the junction between the upper and lower windings of the time pulse relay R770. Shortly thereafter ground potential is applied to the false seizure conductor C996 since ground potential is applied intermittently thereto at the expiration of approximately each 30 seconds. When ground potential is applied to the false seizure conductor C996, the upper and lower windings of the time pulse relay R770 are energized over the previously traced circuit; however the latter relay does not operate since it is of the differential type. Subsequently, when the ground potential is removed from the false seizure conductor C996, the previously traced circuit for energizing in multiple the upper and lower windings of the pulse relay R770 is interrupted. The magnetic flux in the upper winding of the time pulse relay R770 does not immediately decay by virtue of the shunt connection including the lower winding thereof and the contacts 772 extending also to battery potential; whereby the upper and lower windings of the time pulse relay R770 are effectively energized in series circuit relation during the decay of the magnetic flux therein, causing the latter relay to close its contacts 771 which, in turn, are connected by way of the contacts 783 to ground potential. Thus the upper and lower windings of the time pulse relay R770 are energized in series circuit relation causing the latter relay to operate fully in order to interrupt, at the contacts 772, the previously mentioned path for short-circuiting in series the upper and lower windings thereof. Also the time pulse relay R770 completes, at the contacts 773, a connection, including the contacts 745′, 786, 934 and 982′ between the false seizure conductor C996 and the junction between the upper and lower windings of the end-of-dial relay R830.

In the event the control relay R930 has not operated by the next time ground potential is connected to and then disconnected from the false seizure conductor C996, indicating normal operation of the repeater circuit 700 and the reception by the tone unit 701 of a dialing signal, the end-of-dial relay R830 is operated in the manner previously explained. Upon operating the end-of-dial relay R830 effects operation of the switch through relay R740 and the supervisory relay R1040 in the manner previously explained. Upon operating the switch through relay R740 completes, at the contacts 744′, a connection including the contacts 1025, 773, 786, 934 and 982′, between the false seizure conductor C996 and the junction between the upper and lower windings of the answer relay R1020. In the event the control relay R930 has not operated, as noted above, by the time the next ground impulse is connected to and then disconnected from the false seizure conductor C996 the answer relay R1020 is operated thereover. Upon operating the answer relay R1020 completes, at the contacts 1022, a holding circuit for energizing in series the upper and lower windings thereof; and interrupts, at the contacts 1021, the previously traced multiple circuits for maintaining operated the monitor relay R990 and the end-of-dial relay R830 and the multiple circuit for maintaining operated the supervisory relay R1040; whereby the latter relay restores shortly thereafter, it being of the slow-to-release type. Also the answer relay R1020 completes, at the contacts 1023, a circuit, including the contacts 891′ and 782, for operating the release pulse timer relay R1030; and a multiple circuit also including the contacts 747 for operating the start relay R1080. Upon operating the release pulse timer relay R1030 effects operation of the release pulse timer relay R1010; which latter relay interrupts, at the contacts 1018, the previously traced holding circuit for maintaining operated the selector seize relay R890 in order to cause the latter relay to restore. Upon restoring the selector seize relay R890 interrupts, at the contacts 891′, the previously traced circuit for maintaining operated the release pulse timer relay R1030 and the start relay R1080. Upon restoring the release pulse timer relay R1030 sets the armature RA1031 into vibration in order to effect the restoration of the release pulse timer relay R1010 approximately two seconds thereafter; all in the manner previously explained. Also upon operating the release pulse timer relay R1010 completes, at the contacts 1013, an alternative circuit, including the contacts 1071 and 983, for operating the supervisory start relay R850; whereby the latter relay effects operation of the relays mentioned, including the send relay R730, in the repeater circuit 700 in order to cause a long pulse of 60 cycle modulated 1000 cycle current to be transmitted from the tone unit 701 over the toll line 702, and constituting a release signal. The restoration of the remainder of the relays in the repeater circuit 700 following the restoration of the release pulse timer relay R1010 is the same as that previously explained. At this time the repeater circuit 700 again occupies its normal idle position; whereby only the incoming release relay R920 therein occupies its operated position. Also the release signal transmitted from the tone unit 701 over the toll line 702 incident to the release of the repeater circuit 700 is received by the tone unit 601 in order to bring about the release of the repeater circuit 400 in the event it too has been operated; all in the manner previously explained.

*Automatic release of the repeater circuit 700*

Assuming that a connection has been set up by way of the repeater circuit 700 in the automatic exchange 50, the toll line 702, and the repeater circuit 400 in the automatic exchange 30, that incident to the release of the connection the repeater circuit 700 was cleared out and released in the manner previously explained, that the repeater circuit 400 failed to be cleared out and released in the manner previously explained, and that the repeater circuit 400 continues its last operation in order to transmit a busy signal or a disconnect signal over the toll line 702. The first time the supervisory signal mentioned is received over the toll line 702, the tone unit 701 responds in order to bring about operation and then restoration of the signal-in relay R870 in the repeater circuit 800; whereby the signal-in relay R870 effects operation of the selector seize relay R890; all in the manner previously explained. The selector seize relay R890 effects operation of the loop test relay R860 and the consequent operation of the coder seizing relay R940 and the auxiliary relay R780; whereby the repeater circuit 700 is operatively connected to the cable 1410 and thence by the preselector 1403 to an idle coder, such for example, as the coder 1404 by way of the cable 1420 extending thereto; all previously explained.

The second time the supervisory signal mentioned is received over the toll line 702 the signal-in relay R870 in the repeater circuit 700 is again operated and then restored in order to complete and then interrupt, at the contacts 876, a circuit including the contacts 922, 1019, 898, 784 and 745', for operating the end-of-dial relay R830. Upon operating the end-of-dial relay R830 effects operation of the switch through relay R740 and the supervisory relay R1040; and the third time the supervisory signal mentioned is received over the toll line 702, the signal-in relay R870 operates and then restores in order to complete and then interrupt, at the contacts 876, a circuit, including the contacts 922, 1019, 898, 784, 744' and 1025, for operating the answer relay R1020. Upon operating the answer relay R1020 effects the restoration of the end-of-dial relay R830 and the supervisory relay R1040; and effects sequential operation of the release pulse timer relays R1030 and R1010 and operation of the start relay R1080; all in the manner previously explained. Upon operating the release pulse timer relay R1010 effects restoration of the selector seize relay R890, which latter relay effects sequential restoration of the release pulse timer relays R1030 and R1010 and restoration of the start relay R1080; all in the manner previously explained. Also upon operating the release pulse timer relay R1010 effects operation of the supervisory start relay R850; whereby the latter relay effects operation of the relays mentioned, including the send relay R730, in the repeater circuit 700 in order to cause the release signal to be sent over the toll line 702; all in the manner previously explained. The restoration of the remainder of the relays in the repeater circuit 700 following the restoration of the release pulse timer relay R1010 is the same as that previously explained. At this time the repeater circuit 700 again occupies its normal idle position; and the release signal transmitted from the toll line 702 incident to the release of the repeater circuit 700 is received by the tone unit 601 in order again to attempt the release of the repeater circuit 400.

*The display panel 1330*

As previously explained, the display panel 1330 is commonly associated with the manual dial toll board in the automatic exchange 50 and is individual to the repeater circuit 700 and the trunks 1370 and 1380 extending thereto.

Preferably, on the display panel 1330 the busy in-out lamp L1334 is red, and being connected directly to the busy conductor C1110, is illuminated each time the repeater circuit 700 is rendered busy on a call in either direction therethrough.

Preferably, on the display panel 1330 the incoming lamp L1331 is green and is connected to the lamp conductor C1107; whereby it is illuminated under the control of the selector seize relay R890 in the repeater circuit 700 so that the incoming lamp L1331 is illuminated only on incoming calls through the repeater circuit 700 routed either by way of the trunk 1370 to the automatic switch train 1300 in the automatic exchange 50 or by way of the trunk 1380 to the inward operator positions at the manual dial toll board mentioned.

Preferably, on the display panel 1330, the inward position lamp L1330 is yellow and is illuminated under the control of the transfer relay R1120 in the repeater circuit 700 so that the inward position lamp L1330 is illuminated only on incoming calls through the repeater circuit 700 routed over the trunk 1380 to the inward operator positions at the manual dial toll board mentioned.

Preferably, on the display panel 1330, the call-to-automatic-exchange lamp L1332 is white and is illuminated in multiple with the upper winding of the register sender supervisory relay R1140 in the repeater circuit 700 so that the call-to-automatic-exchange lamp L1332 is illuminated only on an incoming call through the repeater circuit 700 routed over the trunk 1370 to the automatic switch train 1300 and after the call mentioned has been extended by the automatic switch train 1300 to the called subscriber substation in the automatic exchange 50.

Preferably, on the display panel 1330, the supervisory lamp L1333 is white and is connected to the supervisory conductor C1109; whereby it is illuminated under the control of the supervisory relay R1040 in the repeater circuit 700 so that the supervisory lamp L1333 is illuminated on both outgoing calls routed by way of the trunk 1380 through the repeater circuit 700 and on incoming calls routed by way of the repeater circuit 700 either over the trunk 1370 to the automatic switch train 1300 in the automatic exchange 50 or over the trunk 1380 to the inward operator positions at the manual dial toll board mentioned.

*Conclusion*

In view of the foregoing, it is apparent that a telephone system has been provided that comprises improved toll switching and supervisory facilities; wherein the operating and supervisory controls transmitted over the toll lines inter-connecting the various pieces of automatic switching apparatus are in the form of audio signals; some of the signals being in the form of an unmodulated frequency in the audio range and other of the signals being in the form of a modulated carrier frequency in the audio range.

The circuit arrangements involving the switchboard in the automatic exchange 50 are disclosed and claimed in the copending divisional application of John Wicks and Otho D. Grandstaff, Serial No. 32,314, filed June 11, 1948, now Patent No. 2,517,517, granted August 1, 1950.

While there has been described what at present is considered to be the preferred embodiment of the invention, it will be understood that various modifications may be made therein, and it is intended to cover in the appended claims all such modifications as fall within the true spirit and scope of the invention.

What is claimed is:

1. In a telephone system including first and second trunk circuits, a two-conductor trunk interconnecting said trunk circuits, and first and second tone units respectively operatively associated with said first and second trunk circuits; each of said tone units including a receiving channel operative to receive a signal sent over the conductors of said trunk, and a sending channel operative to send a signal over the conductors of said trunk, the impedance of said receiving channel being high with respect to the impedance of said sending channel; each of said trunk circuits comprising an impedance element, the impedance of said impedance element being high with respect to the impedance of the sending channel in the associated tone unit, a relay having two positions, means for selectively operating said relay between its two positions, and switching means controlled in one position of said relay for connecting said impedance element and the receiving channel in the associated tone unit in parallel circuit relation with each other to provide a first balancing network and for connecting said first balancing network across the conductors of said trunk and for disconnecting the sending channel in the associated tone unit from across the conductors of said trunk and controlled in the other position of said relay for connecting said impedance element and the sending channel in the associated tone unit in series circuit relation with each other to provide a second balancing network and for connecting said second balancing network across the conductors of said trunk and for disconnecting the receiving channel in the associated tone unit from across the conductors of said trunk, the effective impedance of said first balancing network being substantially equal to the effective impedance of said second balancing network.

2. In a telephone system including first and second telephone stations, first and second trunk circuits, a two-conductor trunk interconnecting said trunk circuit, first and second tone unit respectively operatively associated with said first and second trunk circuits, and means for completing a connection between said first and second stations via said first and second trunk circuits and said trunk; each of said tone units including a receiving channel operative to receive a signal sent over the conductors of said trunk, and a sending channel operative to send a signal over the conductors of said trunk, the impedance of said receiving channel being high with respect to the impedance of said sending channel; each of said trunk circuits comprising an impedance element, the impedance of said impedance element being high with respect to the impedance of the sending channel in the associated tone unit, a relay having two positions, means for selectively operating said relay between its two positions, switching means controlled in one position of said relay for connecting said impedance element and the receiving channel in the associated tone unit in parallel circuit relation with each other to provide a first balancing network and for connecting said first balancing network across the conductors of said trunk and for disconnecting the sending channel in the associated tone unit from across the conductors of said trunk and controlled in the other position of said relay for connecting said impedance element and the sending channel in the associated tone unit in series circuit relation with each other to provide a second balancing network and for connecting said second balancing network across the conductors of said trunk and for disconnecting the receiving channel in the associated tone unit from across the conductors of said trunk, the effective impedance of said first balancing network being substantially equal to the effective impedance of said second balancing network, and additional means responsive to the completion of said connection between said first and second telephone stations for disconnecting both said first and second balancing networks and both the receiving and sending channels in the associated tone unit from across the conductors of said trunk.

3. In a telephone system including first and second telephone stations, first and second trunk circuits, a two-conductor trunk interconnecting said trunk circuit, first and second tone unit respectively operatively associated with said first and second trunk circuits, and means for selectively completing a connection between said first and second stations via said first and second trunk circuits and said trunk; each of said tone units including a receiving chanel operative to receive a signal sent over the conductors of said trunk, and a sending channel operative to send a signal over the conductors of said trunk, the impedance of said receiving channel being high with respect to the impedance of said sending channel; each of said trunk circuits comprising an impedance element, the impedance of said impedance element being high with respect to the impedance of the sending channel in the associated tone unit, a relay having two positions, means for selectively operating said relay between its two positions, switching means controlled in one position of said relay for connecting said impedance element and the receiving channel in the associated tone unit in parallel circuit relation with each other to provide a first balancing network and for connecting said first balancing network across the conductors of said trunk and for disconnecting the sending channel in the associated tone unit from across the conductors of said trunk and controlled in the other position of said relay for connecting said impedance element and the sending channel in the associated tone unit in series circuit relation with each other to provide a second balancing network and for connecting said second balancing network across the conductors of said trunk and for disconnecting the receiving channel in the associated tone unit from across the conductors of said trunk, the effective impedance of said first balancing network being substantially equal to the effective impedance of said second balancing network, additional means responsive to the completion of said connection between said first and second telephone stations for disconnecting both said first and second balancing networks and both the receiving and sending channels in the associated tone unit from across the conductors of said trunk, and further means responsive to the termination of said connection between said first and second stations for operating said relay into its one position.

4. The telephone system set forth in claim 3, wherein said trunk includes one or more vacuum tube repeaters that are subject to singing unless the effective impedance connected to said trunk in said first trunk circuit substantially matches the effective impedance connected to said trunk in said second trunk circuit.

JOHN WICKS.
OTHO D. GRANDSTAFF.

REFERENCES CITED

The following references are of record in the file of this patent:

UNITED STATES PATENTS

| Number | Name | Date |
|---|---|---|
| 1,475,201 | Toomey | Nov. 27, 1923 |
| 2,025,145 | Bascom | Dec. 24, 1934 |
| 2,119,239 | Meszar | May 21, 1938 |
| 2,155,176 | Wicks | Apr. 18, 1939 |
| 2,288,251 | Murphy | June 30, 1942 |
| 2,306,236 | Walsh | Dec. 22, 1942 |